(12) United States Patent
Sheffield et al.

(10) Patent No.: US 12,245,031 B2
(45) Date of Patent: Mar. 4, 2025

(54) BENEFIT DENIAL SYSTEM FOR UNLOCKING AN ELECTRONIC DEVICE

(71) Applicant: Lowe's Companies, Inc., Mooresville, NC (US)

(72) Inventors: Mason E. Sheffield, Woodinville, WA (US); Jonothon Frederick Douglas, Kirkland, WA (US); Paul Michael Sisneros, Kirkland, WA (US); Mehdi Sarkeshi, Seattle, WA (US)

(73) Assignee: Lowe's Companies, Inc., Mooresville, NC (US)

( * ) Notice: Subject to any disclaimer, the term of this patent is extended or adjusted under 35 U.S.C. 154(b) by 511 days.

(21) Appl. No.: 17/570,282

(22) Filed: Jan. 6, 2022

(65) Prior Publication Data

US 2022/0167161 A1    May 26, 2022

Related U.S. Application Data

(63) Continuation-in-part of application No. 16/894,591, filed on Jun. 5, 2020, now Pat. No. 11,381,553, and a continuation-in-part of application No. 16/880,692, filed on May 21, 2020, now Pat. No. 11,395,142, which is a continuation of application No. 16/779,225, filed on Jan. 31, 2020, now Pat. No.
(Continued)

(51) Int. Cl.
*H04W 12/06*    (2021.01)
(52) U.S. Cl.
CPC ................. *H04W 12/06* (2013.01)

(58) Field of Classification Search
CPC ... H04W 12/06; H04W 12/043; H04W 12/37; H04W 12/08
See application file for complete search history.

(56) References Cited

U.S. PATENT DOCUMENTS

| 4,907,117 A | 3/1990 | Pease et al. |
| 5,594,228 A | 1/1997 | Swartz et al. |

(Continued)

FOREIGN PATENT DOCUMENTS

| CN | 1809833 A | 7/2006 |
| CN | 105900398 A | 8/2016 |

(Continued)

OTHER PUBLICATIONS

U.S. Appl. No. 18/488,664, "Notice of Allowance", Jun. 11, 2024, 9 pages.
(Continued)

*Primary Examiner* — Huan V Doan
(74) *Attorney, Agent, or Firm* — Kilpatrick Townsend & Stockton LLP

(57) ABSTRACT

Techniques described herein are directed to a system and methods for issuing commands to an electronic device as well as techniques for transferring a device key to a user device associated with a user who has gained authorization to issue commands to the electronic device. In some embodiments, a device key may be conveyed directly from an access device to a user device. In some embodiments, the device key may be conveyed to a user device by a mobile application server which is in communication with the user device upon receiving an indication that an operator of the user device is authorized to issue commands to the electronic device.

19 Claims, 23 Drawing Sheets

Related U.S. Application Data 10,701,561, application No. 17/570,282 is a continuation-in-part of application No. 16/779,335, filed on Jan. 31, 2020, now abandoned, said application No. 16/894,591 is a continuation of application No. 16/779,431, filed on Jan. 31, 2020, now Pat. No. 10,721,224.

(56) References Cited

U.S. PATENT DOCUMENTS

| | | |
|---|---|---|
| 5,748,084 A | 5/1998 | Isikoff |
| 5,874,902 A | 2/1999 | Heinrich et al. |
| 6,130,602 A | 10/2000 | Otoole et al. |
| 6,255,958 B1 | 7/2001 | Haimovich et al. |
| 6,317,028 B1 | 11/2001 | Valiulis |
| 6,598,790 B1 | 7/2003 | Horst |
| 6,607,125 B1 | 8/2003 | Clouser et al. |
| 7,275,686 B2 | 10/2007 | Estakhri et al. |
| 7,391,326 B2 | 6/2008 | Puzio et al. |
| 7,530,489 B2 | 5/2009 | Stockton |
| 7,564,360 B2 | 7/2009 | Cote et al. |
| 7,619,528 B2 | 11/2009 | Kobres |
| 8,941,498 B2 | 1/2015 | Berg |
| 9,117,355 B2 | 8/2015 | Mohluddin et al. |
| 9,189,663 B2 | 11/2015 | Goren et al. |
| 9,193,330 B2 | 11/2015 | Abshire |
| 9,228,378 B1 | 1/2016 | Sarabi et al. |
| 9,298,954 B1 | 3/2016 | Ewing |
| 9,460,597 B1 | 10/2016 | Clark et al. |
| 9,700,997 B2 | 7/2017 | Schlegel et al. |
| 9,779,603 B1 | 10/2017 | Subramanian et al. |
| 9,852,596 B2 | 12/2017 | Alexis |
| 9,888,337 B1 | 2/2018 | Zalewski et al. |
| 10,097,353 B1 | 10/2018 | Carlson |
| 10,186,128 B2 | 1/2019 | Gao et al. |
| 10,332,117 B2 | 6/2019 | Krause et al. |
| 10,354,507 B1 | 7/2019 | Lercari |
| 10,438,470 B2 | 10/2019 | Wulff |
| 10,701,561 B1 | 6/2020 | Sheffield et al. |
| 10,721,224 B1 | 7/2020 | Sheffield et al. |
| 11,161,231 B2 | 11/2021 | Obermann et al. |
| 11,381,553 B2 | 7/2022 | Sheffield et al. |
| 11,395,142 B2 | 7/2022 | Sheffield et al. |
| 11,763,610 B2 | 9/2023 | Davis et al. |
| 11,831,636 B2 | 11/2023 | Sheffield et al. |
| 2002/0050928 A1 | 5/2002 | Olsen et al. |
| 2002/0059148 A1 | 5/2002 | Rosenhaft et al. |
| 2003/0042316 A1 | 3/2003 | Teraura |
| 2004/0145477 A1 | 7/2004 | Easter et al. |
| 2004/0230488 A1 | 11/2004 | Beenau et al. |
| 2004/0238621 A1 | 12/2004 | Beenau et al. |
| 2004/0263319 A1 | 12/2004 | Huomo |
| 2005/0128083 A1 | 6/2005 | Puzio et al. |
| 2005/0200485 A1 | 9/2005 | Connolly et al. |
| 2005/0289359 A1 | 12/2005 | Mori et al. |
| 2006/0071753 A1 | 4/2006 | Lamar |
| 2007/0011729 A1 | 1/2007 | White |
| 2007/0199988 A1 | 8/2007 | Labgold et al. |
| 2007/0200664 A1 | 8/2007 | Proska et al. |
| 2007/0296589 A1 | 12/2007 | Cullum |
| 2008/0238609 A1 | 10/2008 | Wiesner et al. |
| 2009/0043681 A1 | 2/2009 | Shoji et al. |
| 2009/0201125 A1 | 8/2009 | Ikeguchi et al. |
| 2010/0176919 A1 | 7/2010 | Vertner et al. |
| 2010/0289627 A1 | 11/2010 | McAllister et al. |
| 2011/0137797 A1 | 6/2011 | Stals et al. |
| 2011/0254687 A1 | 10/2011 | Arponen et al. |
| 2012/0111589 A1 | 5/2012 | Schmidt et al. |
| 2012/0124388 A1 | 5/2012 | Chng et al. |
| 2012/0150742 A1 | 6/2012 | Poon et al. |
| 2012/0271712 A1 | 10/2012 | Katzin et al. |
| 2012/0331292 A1 | 12/2012 | Haggerty et al. |
| 2013/0066918 A1 | 3/2013 | Nejat et al. |
| 2013/0227285 A1 | 8/2013 | Bracher et al. |
| 2014/0019241 A1 | 1/2014 | Treiser et al. |
| 2014/0158389 A1 | 6/2014 | Ito et al. |
| 2014/0176305 A1 | 6/2014 | Aljadeff |
| 2014/0207660 A1 | 7/2014 | Brink et al. |
| 2014/0240125 A1* | 8/2014 | Burch ............ B25H 3/02 340/539.13 |
| 2014/0372743 A1 | 12/2014 | Rogers et al. |
| 2014/0373184 A1 | 12/2014 | Mahaffey et al. |
| 2015/0022358 A1 | 1/2015 | Huang |
| 2016/0021116 A1 | 1/2016 | Maguire et al. |
| 2016/0042341 A1 | 2/2016 | Griffin et al. |
| 2016/0142402 A1 | 5/2016 | Kim |
| 2016/0253651 A1 | 9/2016 | Park et al. |
| 2016/0325391 A1 | 11/2016 | Stampfl et al. |
| 2016/0344740 A1 | 11/2016 | Choi |
| 2017/0053506 A1 | 2/2017 | Alexis |
| 2017/0076520 A1 | 3/2017 | Ho et al. |
| 2017/0186294 A1 | 6/2017 | Gotanda et al. |
| 2017/0269167 A1 | 9/2017 | Willey |
| 2017/0282859 A1 | 10/2017 | Grimm et al. |
| 2017/0286708 A1 | 10/2017 | Erhart et al. |
| 2017/0359169 A1 | 12/2017 | Benson et al. |
| 2018/0150832 A1 | 5/2018 | Badal-Badalian et al. |
| 2018/0165480 A1 | 6/2018 | Raju |
| 2018/0167394 A1 | 6/2018 | High et al. |
| 2018/0336359 A1 | 11/2018 | Lakhani et al. |
| 2018/0338241 A1 | 11/2018 | Li |
| 2018/0375665 A1 | 12/2018 | Contenti et al. |
| 2019/0114488 A1 | 4/2019 | Glazer et al. |
| 2019/0215394 A1 | 7/2019 | Torvinen et al. |
| 2019/0244451 A1 | 8/2019 | Favier et al. |
| 2019/0253254 A1 | 8/2019 | Brownlee et al. |
| 2019/0333304 A1 | 10/2019 | Flynn et al. |
| 2020/0059170 A1 | 2/2020 | Brotto et al. |
| 2020/0090175 A1* | 3/2020 | Davis ............ G06F 21/71 |
| 2020/0265283 A1 | 8/2020 | Brotto et al. |
| 2020/0342728 A1 | 10/2020 | Brotto et al. |
| 2021/0122024 A1 | 4/2021 | Obermann et al. |
| 2021/0152345 A1 | 5/2021 | Beloskur et al. |
| 2021/0166247 A1 | 6/2021 | Sirigiri et al. |
| 2022/0024014 A1 | 1/2022 | Obermann et al. |
| 2022/0156412 A1 | 5/2022 | Davis et al. |
| 2023/0410580 A1 | 12/2023 | Davis et al. |

FOREIGN PATENT DOCUMENTS

| | | |
|---|---|---|
| CN | 107209976 A | 9/2017 |
| CN | 107209983 A | 9/2017 |
| EP | 1125264 | 2/2004 |
| WO | 2015121833 | 8/2015 |
| WO | 2018228973 A1 | 12/2018 |

OTHER PUBLICATIONS

U.S. Appl. No. 16/894,591, Notice of Allowance, Mailed on Mar. 2, 2022, 10 pages.

"Bosch Toolbox App", Robert Bosch GmbH, Available Online at: bosch-professional.com, Feb. 18, 2018, 6 pages.

"DeWalt Tool Connect", Available online at: dewalt.com, Nov. 25, 2016, 6 pages.

"Hilti: Internet of Things Services", Available Online at: hilti.com, Sep. 18, 2018, 3 pages.

"Milwaukee One-Key", Available online at: onekey.milwaukeetool.com, 2020, 7 pages.

U.S. Appl. No. 16/779,225, Notice of Allowance, Mailed on Apr. 15, 2020, 15 pages.

U.S. Appl. No. 16/779,335, Final Office Action, Mailed on Aug. 14, 2020, 25 pages.

U.S. Appl. No. 16/779,335, Non-Final Office Action, Mailed on Apr. 1, 2020, 20 pages.

U.S. Appl. No. 16/779,431, Notice of Allowance, Mailed on Apr. 27, 2020, 15 pages.

U.S. Appl. No. 16/779,431, "Supplemental Notice of Allowability", Jun. 12, 2020, 3 pages.

U.S. Appl. No. 16/880,692, Non-Final Office Action, Mailed on Nov. 24, 2021, 26 pages.

(56) References Cited

OTHER PUBLICATIONS

U.S. Appl. No. 16/894,591, Non-Final Office Action, Mailed on Oct. 5, 2021, 8 pages.
Application No. PCT/US2020/062202, International Search Report and Written Opinion, Mailed on Feb. 24, 2021, 18 pages.
Application No. PCT/US2020/062709, International Search Report and Written Opinion, Maiiled on Feb. 25, 2021, 9 pages.
CA3,175,770 , "Office Action", Jan. 5, 2024, 5 pages.
EP20916796.4, "Extended European Search Report", Jan. 3, 2024, 5 pages.
CA3165067, "Notice of Allowance", Apr. 6, 2023, 1 page.
CA3165067, "Office Action", Nov. 23, 2022, 4 pages.
PCT/US2020/062202, "International Preliminary Report on Patentability", Aug. 11, 2022, 17 pages.
U.S. Appl. No. 17/846,447, "Supplemental Notice of Allowability", Oct. 31, 2023, 2 pages.
CN202080095101.5, "Office Action", Oct. 23, 2023, 22 pages.
U.S. Appl. No. 16/880,692, Notice of Allowance, Mailed on Mar. 31, 2022, 5 pages.
CN202080095101.5, "Office Action", Mar. 18, 2023, 26 pages.
CN202080095101.5, "Office Action", Mar. 12, 2024, 2 pages.
EP20916280.9, "Extended European Search Report", Jan. 29, 2024, 9 pages.
U.S. Appl. No. 17/846,447, "Notice of Allowance", Aug. 2, 2023, 9 pages.

\* cited by examiner

BENEFIT DENIAL SYSTEM FOR UNLOCKING AN ELECTRONIC DEVICE

CROSS-REFERENCES TO RELATED APPLICATIONS

This application is a continuation-in-part of U.S. patent application Ser. No. 16/880,692, filed May 21, 2020, which is a continuation of U.S. Pat. No. 10,701,561, filed Jan. 31, 2020, the entire contents of which are hereby incorporated in their entirety for all purposes.

This application is also a continuation-in-part of U.S. patent application Ser. No. 16/894,591, filed Jun. 5, 2020, which is a continuation of U.S. Pat. No. 10,721,224, filed Jan. 31, 2020, the entire contents of which are hereby incorporated in their entirety for all purposes.

This application is also a continuation-in-part of U.S. Non-Provisional application Ser. No. 16/779,335, filed Jan. 31, 2020, which is herein incorporated by reference in its entirety for all purposes.

BACKGROUND

One of the greatest costs to participants in the retail industry is shrinkage. Shrinkage refers to any reduction in inventory which is available for sale and is typically caused by theft (e.g., either shoplifting or employee theft), waste (e.g., breakage), supplier fraud, or errors (e.g., accounting errors). The average loss to shrinkage for a participant in the retail industry is about 2% of sales. According to the National Retail Security Survey on retail theft, losses due to shrinkage cost retailers more than $49 billion in 2016.

While security measures such as cameras and digitized tags that set off alarms have helped reduce losses due to shrinkage, retailers still struggle to further reduce losses. Some retailers have opted to reduce losses due to shrinkage by locking up high-dollar items, which are typically the targets of theft, so that the items need to be retrieved by a retail employee before they can be purchased by a consumer. However, this solution creates a significant strain on retail employees who may be too busy to retrieve the item. Additionally, this solution may cause consumers to become frustrated and leave without completing an intended purchase if they are unable to find an employee that can retrieve an item. Locking up of products tends to inhibit sales, and thereby tends to negatively impact revenue.

Embodiments of the invention address these and other problems, individually and collectively.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Techniques described herein are directed to a system and methods for issuing commands (e.g., lock/unlock commands) to an electronic device as well as techniques for transferring a device key to a user device associated with a user who has gained authorization to issue commands to the electronic device (e.g., by making a purchase of the electronic device). In some embodiments, a device key may be conveyed directly from an access device (e.g., a point-of-sale (POS) device) to a user device. In some embodiments, the device key may be conveyed to a user device by a mobile application server which is in communication with the user device upon receiving an indication that an operator of the user device is authorized to issue commands to (e.g., lock or unlock) the electronic device.

In accordance with embodiments of the system described herein, each electronic device that enters the inventory of a resource provider (e.g., a retailer or other merchant) may have included within it a circuit capable of restricting power to one or more components of the electronic device. At an intake stage, the resource provider may initialize each electronic device by providing a unique device key (e.g., a device key associated with only that electronic device), which is recorded by the resource provider. The electronic device is then placed into a locked state, which prevents the electronic device from being used. The only means of removing the electronic device from the locked state is to establish a communication session with the electronic device (e.g., via a separate user device) and issue an unlock command. However, this command will only be executed by the electronic device if accompanied by the device key. In the described system, mappings are maintained between each electronic device (e.g., via a device identifier) and its corresponding device key. Upon receiving an indication that an electronic device has been purchased, a record of purchase is recorded and the device key is conveyed to a user device. In some cases, the device key is conveyed to a user device operated by an agent of the resource provider, which then unlocks the electronic device before it leaves the store. In some cases, the device key is conveyed to a user device operated by a purchaser of the electronic device, which is then able to issue commands to the electronic device (e.g., lock/unlock command).

One embodiment of the disclosure is directed to a method performed by a mobile application server comprising receiving an indication of an update to an authorization status of an electronic device, the indication including at least an identifier for the electronic device, identifying a device key associated with the electronic device, the device key being associated with only the electronic device, determining a user device associated with the update to the authorization status of the electronic device, and transmitting the device key to the user device, the device key being usable by the user device to issue commands to the electronic device.

Another embodiment of the disclosure is directed to a mobile application server comprising a processor and a memory including instructions that, when executed with the processor, cause the mobile application server to, at least: receive an indication of an update to an authorization status of an electronic device, identify a device key associated with the electronic device, determine a user device associated with the update to the authorization status of the electronic device, and transmit the device key to the user device, the device key being usable by the user device to issue commands to the electronic device.

Yet another embodiment of the disclosure is directed to a user device comprising: a processor; and a memory including instructions that, when executed with the processor, cause the user device to, at least receive an indication of an electronic device identifier, receive a device key associated with the electronic device identifier and store the device key in the memory in association with the electronic device identifier, and establish a communication session with an electronic device associated with the electronic device identifier, and issue a command to the electronic device via the communication session, the command including at least the device key.

For a fuller understanding of the nature and advantages of the present invention, reference should be made to the ensuing detailed description and accompanying drawings.

BRIEF DESCRIPTION OF THE DRAWINGS

Various embodiments in accordance with the present disclosure will be described with reference to the drawings, in which.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
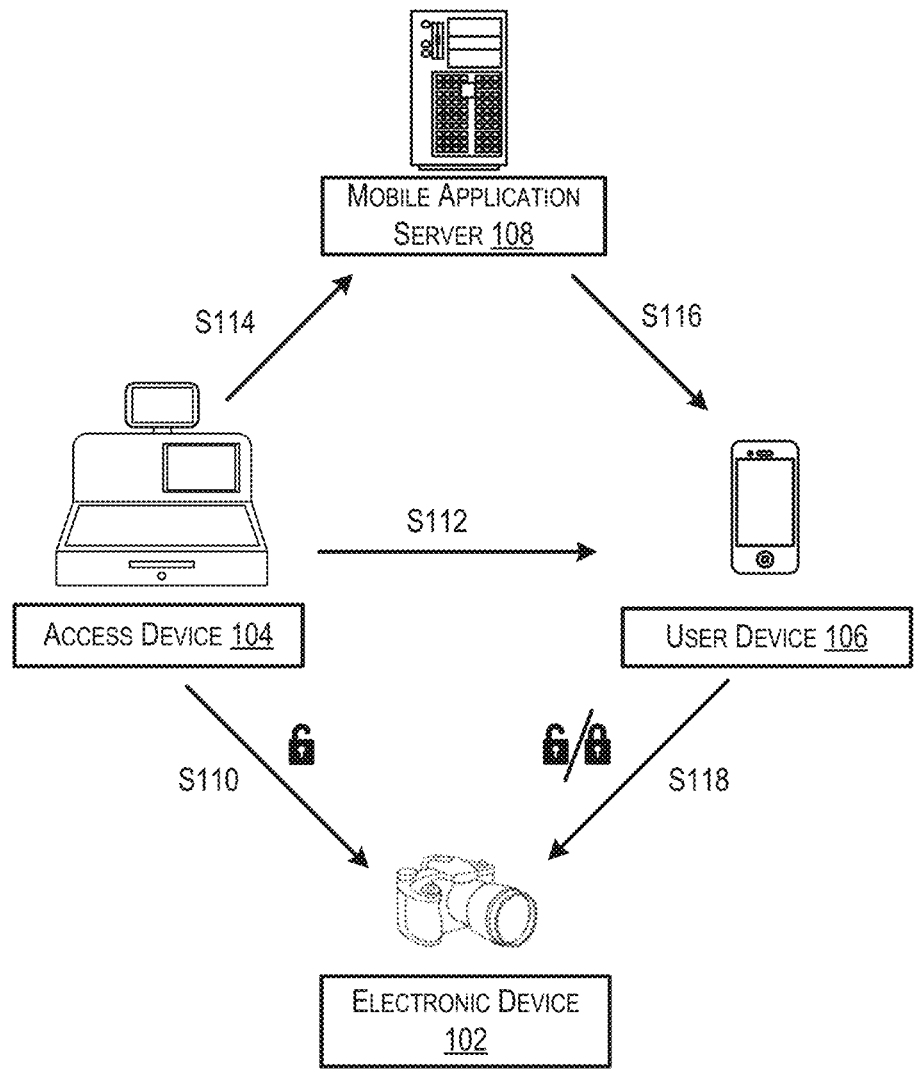
FIG. 1 depicts an illustrative overview of an example system in which an unlock operation can be accomplished in accordance with at least some embodiments.

FIG. 1 depicts an illustrative overview of an example system in which an unlock operation can be accomplished in accordance with at least some embodiments. In FIG. 1, an electronic device 102 may be capable of establishing communication (either via wireless connection or via physical connection) with an access device 104 as well as a user device 106. The access device 104 and/or the user device 106 further may be capable of establishing communication with a mobile application server 108.

The electronic device 102 may be any suitable device that accomplishes its purpose electronically. The electronic device 102 may have installed within it an electronic circuit which enables it to be locked and/or unlocked. In some embodiments, the electronic circuit may be installed between a power source and other components of the electronic device 102 configured to perform some function, such that the electronic circuit is able to restrict or disrupt power to those components. At least a portion of the electronic circuit may include a secure element which includes encrypted data that cannot readily be accessed outside of the secure element. One or more device keys may be stored within this secure element of the electronic circuit. As described herein, the electronic device may be a special purpose device having a primary function such as a device designed to accomplish a particular task. A special purpose device may include a system or device designed for restricted use in particular problem areas. The special purpose device may also be a computing device with specific programming which causes it to perform at least one specific task, thereby being a special purpose device. Examples of special purpose devices include power tools (e.g., corded or cordless screw drivers, routers, screw guns, drills, saws, staplers, compressors, impact wrenches and drivers, grinders, adhesive dispensers, etc.), battery chargers, drones, cameras, outdoor power equipment (e.g., corded or cordless hedge trimmers, string trimmers, edgers, leaf blowers, lawn mowers, generators, chain saws, etc.). These examples, among others, perform operations or tasks beyond merely calculating and processing information, and as such, accomplish substantially more than what can be accomplished using a mere general purpose computer.

One or more device keys may be stored within this secure element of the electronic circuit. The secure element may include a cryptoprocessor, which is a dedicated microprocessor designed to conduct cryptographic operations. Such a cryptoprocessor is typically embedded in a packaging having multiple physical security measures, which give it a degree of tamper resistance. The secure element may have stored upon it a cryptographic key (e.g., a private cryptographic key) that can be used to encrypt or decrypt sensitive data received by the cryptoprocessor. As would be recognized by one skilled in the art, after reading this disclosure, a data packet encrypted in a dual-key system using a public cryptographic key associated with the cryptoprocessor could only be decrypted using a private cryptographic key.

An electronic device 102 may be configured to perform multiple functions. In some embodiments, the electronic circuit may be configured to restrict or disrupt certain functions of the multiple functions performable by the electronic device 102, either individually or as a group. Some illustrative examples of an electronic device having an electronic circuit as described herein are described in greater detail with respect to U.S. patent application Ser. No. 16/779,335, entitled "BENEFIT DENIAL SYSTEM FOR SELECTIVELY PREVENTING OPERATION OF POWER TOOLS" which is herein incorporated by reference in its entirety for all purposes. In some embodiments, the electronic circuit may operate using a power source (hereinafter "independent power source") which is separate and/or distinct from the power source of the electronic device 102 itself, enabling an operation to be performed using the electronic circuit even if the electronic device 102 is unpowered (e.g., disconnected from its power source). If, for example, the electronic device 102 is a cordless drill with a removable and replaceable rechargeable battery adapted to power a drilling function, a power source (e.g., compact battery, such as a watch battery) separate and/distinct from the rechargeable battery can be included with the drill and used to power the electronic circuit while the rechargeable battery is removed from the drill. In some cases, the independent power source may be recharged by drawing power from the power source of the electronic device 102. In some embodiments, the electronic circuit may include an inductive coil which enables it to be powered remotely in order to perform an operation.

The access device 104 may be any suitable device capable of managing access to an electronic device 102. In some embodiments, the access device 104 may be a point-of-sale (POS) terminal operated by, or on behalf of, a resource provider (e.g., a merchant) in order to provide access to goods and/or services. In some embodiments, the access device 104 may include a communication interface configured to interact with other devices (e.g., electronic device 102, user device 106, and/or mobile application server 108). In some embodiments, the access device 104 may include specialized equipment capable of interacting with the electronic device 102. For example, the access device may include an inductive coil capable of remotely powering the electronic device 102 in order to allow the electronic device 102 (e.g., the electronic circuit of the electronic device 102) to perform an operation even if the power supply that ordinarily powers the electronic device 102 during operation is not electrically connected to the electronic device 102.

The user device 106 may be any electronic device capable of establishing a communication session with another device and transmitting/receiving data from that device. A user device 106 may include the ability to download and/or execute mobile applications. User devices may include mobile communication devices as well as personal computers and thin-user devices. By way of illustrative example, a user device may be a smart phone, a personal data assistant (PDA), or any other suitable handheld device.

In some embodiments, the user device 106 may include a communication interface configured to enable communication between the user device and another electronic device (e.g., mobile application server 108, access device 104, electronic device 102, and/or a wireless router that manages access to a network). Examples of a suitable communication interface may include radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. A second example of a suitable communication interface may include an optical input device capable of obtaining graphical input, such as a camera device or a barcode reader. In this second example, the user device 106 may be presented with a machine-readable code, which may be scanned using the optical input device in order to obtain data encoded into the machine-readable code. In some embodiments, the communication interface may include both long range and short range communication means. For example, the communication interface may include an antenna configured to connect to a cellular network in order to enable communication with various other components of the depicted architecture.

The mobile application server 108 may be any computing device configured to provide remote support for a user device 106. The mobile application server 108 may be associated with a set of computer executable instructions to be installed on, and executed from, the user device 106 (e.g., a mobile application). The mobile application server 108 may provide any suitable service and/or processing for the user device. For example, the mobile application server 108 may perform calculations on behalf of the user device. In some embodiments, the mobile application server may maintain an account for one or more users. The mobile application server 108 may also store any protocols and/or user preferences related to the operation of the user device.

The mobile application server 108 may be made up of any computer or cluster of computers. For example, the mobile application server 108 can be a large mainframe, a minicomputer cluster, or a group of servers functioning as a unit. In one example, the mobile application server 108 may be a database server coupled to a Web server. The mobile application server 108 may be coupled to a database and may include any hardware, software, other logic, or combination of the preceding for servicing the requests from one or more client computers (e.g., access device 104 and/or user device 106). The mobile application server 108 may comprise one or more computational apparatuses and may use any of a variety of computing structures, arrangements, and compilations for servicing the requests from one or more client computers.

In some embodiments, at least a portion of the functionality performed by a mobile application installed upon, and executed from, the user device 106 may be performed by a mobile application server 108 in communication with the mobile application. For example, upon execution of a mobile application, the user device 106 may establish a communication session with the mobile application server 108 in which at least some processing is performed by the mobile application server 108 on behalf of the mobile application. In some embodiments, the mobile application server 108 may maintain an account associated with the user device and/or its user. The account maintained by the mobile application server 108 may store a number of data elements related to the user. For example, the application server may store user data, information on item (e.g., electronic device) ownership, or any other suitable data. Additionally, the mobile application server 108 may maintain a mapping of device keys to electronic devices. The application server may, upon receiving an indication of a purchase of the electronic device 102 by a user, automatically (e.g., without human interaction) identify the device key associated with the electronic device 102 and associate that device key to an account for the user. The mobile application server may also automatically identify the user device 106 as being associated with the user (via the stored user data) and may transmit the device key to the user device 106 (e.g., via a push notification). In some embodiments, the device key, once received by the user device 106, may be used to interact with the electronic device 102 (e.g., to issue lock and/or unlock commands) over a communication channel (e.g., Bluetooth™). In some embodiments, the device key may be usable only by a mobile application installed upon the user device 106.

A device key may be any suitable string of characters capable of being used to authorize an operation (e.g., a lock or unlock operation) with respect to the electronic device 102. A device key may be unique to a particular electronic device. In other words, each electronic device may be associated with a different device key. In some embodiments, a device key may be a random or pseudo-random string of characters, such that the device key cannot be readily derived from information related to the electronic device. In some embodiments, a device key may be derivable from an identifier for the electronic device. In these embodiments, a device key may be independently generated by any entity that has the prerequisite information (e.g., an entity in possession of the electronic device) and access to an algorithm (which may be secret) for generating such a device key. For example, in some embodiments, a device key may be derived for a particular electronic device by applying a hash function to an identifier for that electronic device. In this example, the identifier for the electronic device may correspond to a Universal Product Code (UPC) and serial number or other identifier. Some electronic devices may include an indication of their respective identifiers (e.g., within a barcode or other machine-readable code associated with the electronic device). As further described herein below, a barcode or other machine-readable code indicative of a UPC can have an extended format to include, in addition to an indicator of the UPC, an indicator (e.g., a number) that distinguishes the particular item from other identical items associated with the same UPC. This additional indicator (beyond the UPC) can include, for example, at least a portion of the item's serial number or the entire serial number. For purposes if this disclosure, the term "extended UPC" refers to a UPC which is extended by the addition of such an indicator, and which can be represented by a bar code or other machine-readable code that represents both the UPC and the additional indicator. An extended UPC can be associated at the mobile application server 108 with the device key. In this way, the mobile application server 108 can receive the extended UPC during a transaction (e.g., during a sale, where the extended UPC can be received from the access device 104) and, based on the association, determine the device key to use for the transaction (e.g., to send to the access device 104 and/or the user device 106 upon reception of payment and prior to completion of the sale or after completion of the sale). Completion of the sale (or transaction) can be defined by any indication that the sale (or transaction) has been completed, such as printing of a receipt at a POS, displaying a "transaction complete" or similar message at the POS, and/or causing a receipt to be transmitted electronically to the user/purchaser (e.g., by email).

As further described herein below, in addition or in the alternative to using a device key, a dynamic data element can be used for the lock or unlock operation. The dynamic data element data can include an expiration time/date for a rental of the electronic device 102, and/or check data to authenticate an owner of the electronic device 102, such as a counter value which is incremented with each owner.

The lock or unlock operation uses unlocking information. In an example, the unlocking information includes a device key. In another example, the unlocking information includes a dynamic data element. In yet another example, the unlocking information includes both a device key and a dynamic data element. Generally, the unlocking information can include any information usable to the electronic device 102 to validate ownership or proper possession thereof. Based on the unlocking information, if the ownership or proper possession is validated, the electronic device 102 can unlock at least one of its functions such that this function is activated and becomes operational. Otherwise, the electronic device 102 can lock the at least one function or retain this function in a locked state (e.g., deactivated and/or inoperational).

Different techniques are available to generate unlocking information. In one example, the unlocking information includes the device key. In this example, the unlocking information can be generated remotely (e.g., at a mobile application server 108) and sent to or loaded at the electronic device 102. In this way, the electronic device 102 stores the unlocking information. As further described herein, the device key can also be mutable. For instance, the device key can change upon an ownership transfer and/or can be automatically updated (e.g., on a periodic basis). The electronic device 102 can receive, over time, copies of the device key, where each copy is received at a different time and can be different from another copy. Additionally or alternatively, the unlocking information includes a dynamic data element. In this example, the dynamic data element can be dynamically generated over time (e.g., at the mobile application server 108) such that this element can be mutable. Here also, the electronic device 102 can receive, over time, copies of the dynamic data element, where each copy is received at a different time and can be different from another copy. In yet another example, the unlocking information need not be stored at the electronic device 102. Instead, the electronic device 102 can receive the unlocking information (e.g., during an unlocking process) and verify the received information. For instance, the unlocking information is data encrypted with a public encryption key of the electronic device 102 and sent in an encrypted packet to the electronic device. If the electronic device 102 successfully decrypts an encrypted packet using its private encryption key, the electronic device 102 can extract the unlocking information therefrom. In this illustration, the unlocking information can be any random data or can be specific data (e.g., a serial number of the electronic device 102 or portion thereof). In another illustration, rather than using encryption, a hash function is used. In particular, the unlocking information includes random data or specific data. This data is hashed according to a first hashing function, resulting in first hashed data. The hashed data and the random data or specific data, as the case may be, are sent to the electronic device 102. Here, the electronic device 102 can use a second hashing function to hash the random data or specific data, as the case may be, resulting in second hashed data. The first hashed data and the second hashed data can be compared and would match if the two hashing functions are the same and the received random data or specific data is the same as the original data.

The validation of the ownership or proper possession can use different techniques that may depend on the type of unlocking information. Generally, the electronic device 102 determines first unlocking information (e.g., either unlocking information stored in its memory or generated on-the-fly) and compares it with second unlocking information (e.g., received from another device, such as an access device 104, a user device 106, or a beacon device as further illustrated in the next figures). If a correspondence exists between the two pieces of information, the electronic device determines that the ownership is valid or possession is proper. Otherwise, the electronic device 102 determines that the ownership is invalid or possession is improper. The correspondence can be an exact match, a fuzzy match, or an algorithmic association between the two pieces of information.

To illustrate, the electronic device 102 stores first unlocking information. At some point, the electronic device 102 receives second unlocking information from another device (e.g., an access device 104, a user device 106, or a beacon device as further illustrated in the next figures). The electronic device 102 compares the two pieces of information and completes the validation depending on whether the comparison indicates a match or correspondence between the first unlocking information and the second unlocking information.

In another illustration, the electronic device 102 need not store unlocking information and/or any unlocking information stored or generated by the electronic device 102 can be different from unlocking information that the electronic device 102 receives from another device during an unlock procedure. In this illustration, the electronic device receives second unlocking information from another device and, in response, generates first unlocking information for comparison with the second unlocking information to complete the validation. For instance, the second unlocking information can include an expiration time/date. The electronic device 102 can determine the current time/date as the first unlocking information. If the expiration time/date has not lapsed given the current time/date, the electronic device 102 determines that the ownership is valid or the possession is proper. Similarly, the second unlocking information includes an encrypted packet of the electronic device's 102 serial number. Here, the electronic device 102 decrypts the encrypted packet using its private encryption key to extract the serial number. The electronic device 102 compares this extracted serial number to its own serial number (which acts as the first unlocking information). If the two match, the electronic device 102 determines that the ownership is valid or the possession is proper. In yet another example, the second unlocking information includes a second hash and random data or specific data. The electronic device 102 generates a first hash of the random data or specific data and compares the first hash to the second hash. If the two hashes match (based on exact matching or fuzzy matching), the electronic device 102 determines that the ownership is valid or the possession is proper.

In the interest of clarity of explanation, various embodiments are described herein with the example of using a device key, where this device key is stored at an electronic device 102 and compared for an exact match to a received key. However, the embodiments are not limited as such and apply to any type of unlocking information, to storing or generating on-the-fly unlocking information, and to any type of comparison.

In some embodiments, a device key stored in an electronic device 102 may be altered or changed. For example, a purchaser of an electronic device 102 may, upon completing a purchase for the electronic device and receiving the device key, replace or overwrite the existing device key with a new device key. The replacement device key may be of his or her choosing or it may be random. Note that an operation to replace or overwrite an existing device key may require that the current device key be provided. In some embodiments, an electronic device 102 may include multiple device keys, each of which may be specific to the electronic device 102. For example, a single electronic device 102 may include two separate device keys, where a first device key may be provided to a purchaser of the electronic device 102 (and which may be replaced) and a second device key which may be stored by the resource provider and/or mobile application server 108 without being provided to the purchaser (i.e., a master key).

In some embodiments, the electronic device 102 may initially be in an unlocked state when no device key has been assigned to it. The electronic device may be configured to become locked upon receiving and storing an initial device key. In an exemplary system in which electronic devices are sold by a resource provider, the resource provider, upon receiving the electronic device 102 into inventory from a manufacturer, may select a device key to be associated with that electronic device. The resource provider may then provision the device key onto the electronic device 102 which may subsequently initiate a lock operation using the device key. The device key may then be provided to the mobile application server 108, where it may be stored in association with an identifier for the electronic device 102. In such a system, any electronic device 102 placed on a shelf or offered for sale by the resource provider may be in a locked state when it is exposed to potential purchasers. In this way, the electronic device may be made inoperable until an unlock operation is performed using the correct device key. Such a system derives potential thieves of any benefit that may be gained from the theft of the electronic device 102.

By way of illustrating interactions between various components of the system described herein, consider the following scenario. A user may enter a retail establishment in which at least one embodiment of the described system is implemented. In this scenario, the user may select the electronic device 102 for purchase and may bring the electronic device to a POS terminal (e.g., the access device 104) to complete the purchase. Upon receiving payment and/or completing the transaction (e.g., at the POS terminal), the device key may be used to unlock the electronic device 102. In one example, the electronic device 102 is unlocked after the payment is received and the transaction is completed. In another example, the electronic device 102 is unlocked after the payment is received and before the transaction is completed. In this example, the completion of the transaction can be conditioned on the electronic device 102 being successfully unlocked.

In one potential scenario, the access device 104 may provide the device key to the electronic device 102 directly at step S110. The access device 104 may have access to the device key associated with the electronic device 102 directly or it may need to perform a lookup operation. In some embodiments, this may involve transmitting a request to the mobile application server 108 in order to obtain the device key. In some embodiments, the access device 104 may include a short-range wireless communication means capable of conveying the device key and an unlock command to the electronic device 102. In some embodiments, the access device 104 may include an inductive coil which can temporarily and remotely (e.g., in a contact-less and/or wireless manner) power the electronic device 102 (e.g., the aforementioned electronic circuit thereof) so that the device key and unlock command can be provided to the electronic device 102 even if the power supply (e.g., a rechargeable battery) that normally powers operation of the electronic device 102 during use is not electrically connected to the electronic device 102. It should be noted that in some embodiments, step S110 may be performed even if other means are used to provide the device key to a user as described below.

In another potential scenario, the access device 104 may provide the device key to a user device 106 directly at step S112. In some embodiments, the device key may be transmitted directly to the user device 106 via a wireless transmission. In some embodiments, the device key may be encoded into a machine-readable code (e.g., a barcode or quick response (QR) code) which is printed onto a receipt produced by the access device 104. In this scenario, the user device 106 may obtain the device key upon scanning the machine-readable code using a camera or barcode reader. In some embodiments, the user device 106 may subsequently provide the device key (and an identifier for the electronic device 102) to the mobile application server 108 (e.g., via a mobile application executed from the user device 106) which may associate it with an account maintained for the user.

In yet another potential scenario, access device 104 may provide the device key to a mobile application server 108 at step S114, which may then provide the device key to the user device 106 at step S116. In some embodiments, the user may be prompted for a user identifier that may be used to identify and/or contact the user. In some embodiments, the user may present a loyalty identifier that may be used to identify a user account maintained by the mobile application server 108. Upon identifying an account associated with the user, the mobile application server 108 may associate an identifier for the electronic device 102 and its corresponding device key to the identified account. Additionally, the mobile application server 108 may identify one or more user devices 106 associated with the identified account and may push the device key to those user devices 106.

In some embodiments, the user may provide an email address, phone number, or other contact information that may be used to initiate contact with the user with the device key. For example, upon the user providing an email address, the user may be sent an email message by the mobile application server 108 that includes the device key or a link that may be used to gain access to the device key. In another example, upon the user providing a phone number, the user may be sent a short messaging service (SMS) message that includes the device key, which may be received on the user device 106.

Once the user device 106 has received the device key associated with the electronic device 102, an operation may be performed at step S118. To do this, a communication session may first be established between the user device 106 and the electronic device 102 (e.g., via a short-range wireless communication channel). Once established, the communication session may be used to convey a command from the user device 106 to the electronic device 102 along with the device key. In some embodiments, the device key may be encrypted or otherwise obscured during its transmission. Upon receiving the device key, the electronic device 102 may be further configured to compare the received device key to the device key stored in memory. If the device keys match, then the electronic device 102 may execute the received command. If the device keys do not match, then the electronic device 102 may fail to execute the received command. In some embodiments, the electronic device 102 may also return an error indication to the user device 106 via the communication channel if the received device key does not match the one stored in memory of the electronic device 102. In some embodiments, the user device 106 may be operated by a consumer or purchaser of the electronic device 102. In some embodiments, the user device 106 may be operated by an agent or employee of the resource provider, such that the agent is then able to unlock the electronic device 102 before it leaves a retail establishment.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

Figure 2:
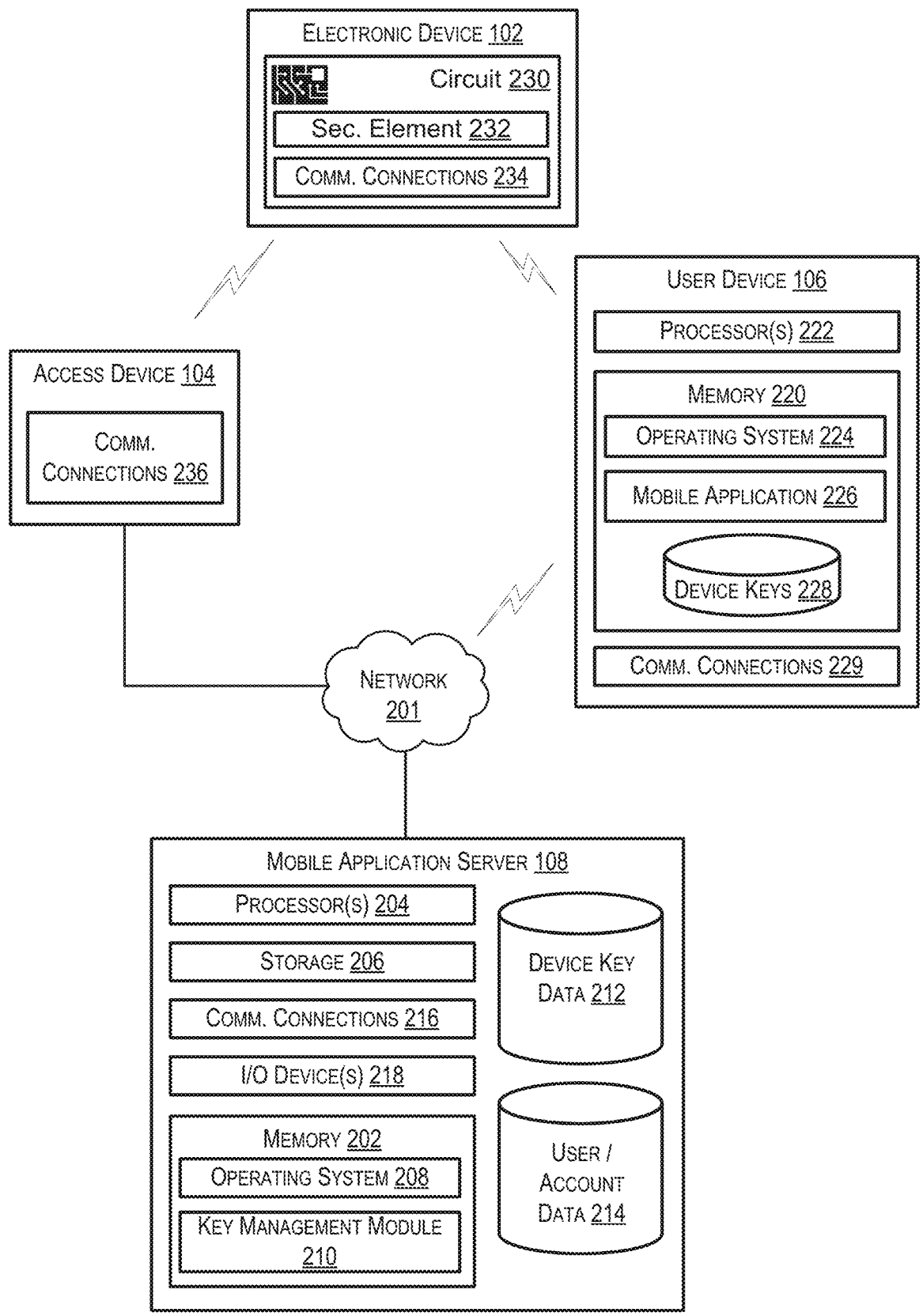
FIG. 2 depicts an example system architecture for a system that may be implemented to perform the functionality described in accordance with at least some embodiments.

FIG. 2 depicts an example system architecture for a system that may be implemented to perform the functionality described in accordance with at least some embodiments. As depicted in FIG. 2, an exemplary architecture may include an electronic device 102, an access device 104, a user device 106, and a mobile application server 108 as described with respect to FIG. 1 above. One or more of these components may communicate either directly or over a network 201.

The mobile application server 108 may be any type of computing device configured to perform at least a portion of the functionality described herein. In some embodiments, the mobile application server 108 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the mobile application server 108 may include at least one memory 202 and one or more processing units (or processor(s)) 204. The processor(s) 204 may be implemented as appropriate in hardware, computer-executable instructions, firmware or combinations thereof. Computer-executable instruction or firmware implementations of the processor(s) 204 may include computer-executable or machine executable instructions written in any suitable programming language to perform the various functions described. The mobile application server 108 may also include additional storage 206.

The memory 202 may store program instructions that are loadable and executable on the processor(s) 204, as well as data generated during the execution of these programs. Depending on the configuration and type of mobile application server 108, the memory 202 may be volatile (such as random access memory (RAM)) and/or non-volatile (such as read-only memory (ROM), flash memory, etc.). The mobile application server 108 may also include additional storage 214, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 202 may include multiple different types of memory, such as static random access memory (SRAM), dynamic random access memory (DRAM) or ROM. Turning to the contents of the memory 202 in more detail, the memory 202 may include an operating system 208 and one or more application programs or services for implementing the features disclosed herein including at least a module for maintaining mappings between device keys and accounts and distributing device keys to appropriate user devices (key management module 210). The memory 202 may also include device key data 212, which provides mappings of device keys to particular electronic devices, as well as user account data 214, which provides information related to users and user accounts (e.g., demographic data as well as user devices, associated electronic devices, etc.). In some embodiments, the device key data 212 and/or user account data 214 may be stored in a database.

The memory 202 and the additional storage 206, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are installed on and/or executed from the mobile application server 108. The mobile application server 108 may also contain communications connection(s) 216 that allow the mobile application server 108 to communicate with a stored database, another computing device or server, user terminals, and/or other components of the described system. The mobile application server 108 may also include input/output (I/O) device(s) and/or ports 218, such as for enabling connection with a keyboard, a mouse, a pen, a voice input device, a touch input device, a display, speakers, a printer, etc.

In some embodiments, the key management module 210 may be configured to, in conjunction with the processors 204, provide device keys to user devices which are determined to be associated with an electronic device. In some embodiments, the mobile application server 108 may receive an indication that a particular electronic device 102 is now associated with a particular user account (e.g., a purchase or registration notification). Upon receiving this indication, the key management module 210 may create an association between the electronic device and the account. The key management module 210 may also identify, from the user/account data 214, one or more user device 106 which is associated with the indicated user account. The key management module 210 may also identify, from the device key data 212, a device key associated with the indicated electronic device 102. The key management module 210 may then transmit the identified device key to the identified one or more user devices 106. In some embodiments, this may be done via a push notification.

In some embodiments, the user device 106 may comprise any portable electronic device capable of performing the functions disclosed herein as being attributed to the user device 106. The user device 106 may include a memory 220 (e.g., a computer-readable storage medium) storing instructions that, when executed by a processor 222 of the user device 106, enable the user device to perform its intended functions. Turning to the contents of the memory 220 in more detail, the memory 220 may include an operating system 224 that provides executable program instructions for the general administration and operation of the user device 106, and at least a mobile application 226 configured to cause the user device 106 to communicate with the mobile application server 108 in order to receive and utilize device keys. The memory 224 may include a number of device keys 228 associated with electronic devices. Additionally, the user device 106 may include a number of communication connections 229 which enable the user device 106 to communicate with other electronic devices. The communication connections 229 may include wireless or direct physical connections. Additionally, wireless connections may include any combination of short-range or long-range wireless protocols.

The mobile application 226 may be configured to, in conjunction with a processor 222, cause the user device 106 to issue commands to an electronic device 102 using a device key associated with that electronic device 102. In some embodiments, the mobile application 226 may include a graphical user interface (GUI) which enables a user to interact with the mobile application 226. The mobile application 226 may present to a user of the user device 106, via the GUI, one or more of a list of devices detected by the user device 106, a list of electronic devices associated with the user (e.g., electronic devices for which the user device 106 has received a device key), a current status of one or more electronic devices, and/or commands available for an electronic device. The mobile application 226 may be configured to receive user input via the GUI and issue commands to an electronic device based on the received user input. For example, the user may select an option to lock or unlock a particular electronic device via the GUI. In this example, the mobile application 226 may cause the user device 106 to transmit a corresponding lock or unlock command to the electronic device 106 that includes the device key for that electronic device. In some embodiments, the mobile application 226 may receive, in response to the transmitted command, a status update for the electronic device 102.

The electronic device 102 may be any suitable electronic device, such as described above, having installed within it an electronic circuit 230 as described herein. As described elsewhere, the electronic circuit 230 may be installed functionally between a power source and other components of the electronic device 102 which are configured to perform some function, such that the electronic circuit 230 is able to restrict or prevent the supply of power to those components in order to manage the ability of the electronic device 102 to perform the function (i.e., to selectively enable or disable the electronic device 102 or aspects of its functionality). At least a portion of the electronic circuit 230 may include a security element 232 which includes an encrypted memory. One or more device keys may be stored within the security element 232 of the electronic circuit 230. In some embodiments, processors within the electronic circuit 230 (and potentially within the security element 232) may be capable of decrypting device key information in order to process commands received from a user device 106. Additionally, the electronic device 102 may include a number of communication connections 234 which enable the electronic device 102 to communicate with other devices. The communication connections 234 may include wireless or direct physical connections. Additionally, wireless connections may include any combination of short-range or long-range wireless protocols.

The access device 104 may be any suitable device capable of managing access to an electronic device 102. More particularly, the access device 104 may manage access to device keys which can be used to issue commands to the electronic device 102. As described elsewhere, the access device 104 may be a point-of-sale (POS) terminal capable of conducting a transaction in relation to an electronic device. The access device 104 may include a number of communication connections 236 which enable the access device 104 to communicate with other devices. The communication connections 236 may include wireless or direct physical connections. Additionally, wireless connections may include any combination of short-range or long-range wireless protocols.

In some embodiments, the access device 104 may be configured to provide a device key directly to a user device upon reception of payment and before completion of a transaction, or upon completion of the transaction. This may first require that the access device communicate with the mobile application server 108 to retrieve the device key. To do this, the access device 104 may provide an identifier for the electronic device 102 to the mobile application server 108 with an indication that the electronic device 102 has been purchased. The access device 104 may then receive the device key in a response from the mobile application server 108. The access device 104 may then provide the device key to the user device 106. In some embodiments, this may involve encoding the device key into a machine-readable code and printing the machine-readable code onto a receipt. In some embodiments, this may involve establishing a wireless communication session between the access device 104 and the user device 106 and transmitting the device key to the user device 106 via that communication session.

In some embodiments, the access device 104 may be configured to cause the mobile application server 108 to provide a device key to a user device 106 upon reception of payment and before completion of a transaction, or upon completion of the transaction. To do this, the access device 104 may provide a user identifier to the mobile application server 108 along with an identifier for the electronic device 102. For example, the access device 104 may be configured to, in relation to a sale of an electronic device 102, collect a user identifier (e.g., an email address, loyalty identify, account identifier, phone number, credit card number, etc.) via user input. This may involve a user manually entering the identifier or bringing some identification device (e.g., a loyalty card or fob) into communicative contact (e.g., via radio frequency identifier (RFID) tag, reading magnetic media, or reading of a bar-code or QR code optically) with the access device 104. Once the access device has obtained an identifier for the user, the access device 104 may transmit that identifier, along with an identifier for the electronic device 102, to the mobile application server 108. Upon receiving the identifiers from the access device 104, the mobile application server 108 may identify an account associated with the user via the identifier, identify the device key associated with the electronic device 102, identify a user device 106 associated with the account, and transmit the device key to the user device 106.

In some embodiments, the communication network 201 may include any one or a combination of many different types of networks, such as cable networks, the Internet, wireless networks, cellular networks, and other private and/or public networks. In addition, the communication network 201 may comprise multiple different networks. For example, the user device 106 may utilize a 4/5G network to communicate with a wireless router, which may then route the communication over a public network (e.g., the Internet) to the mobile application server 108.

Figure 3:
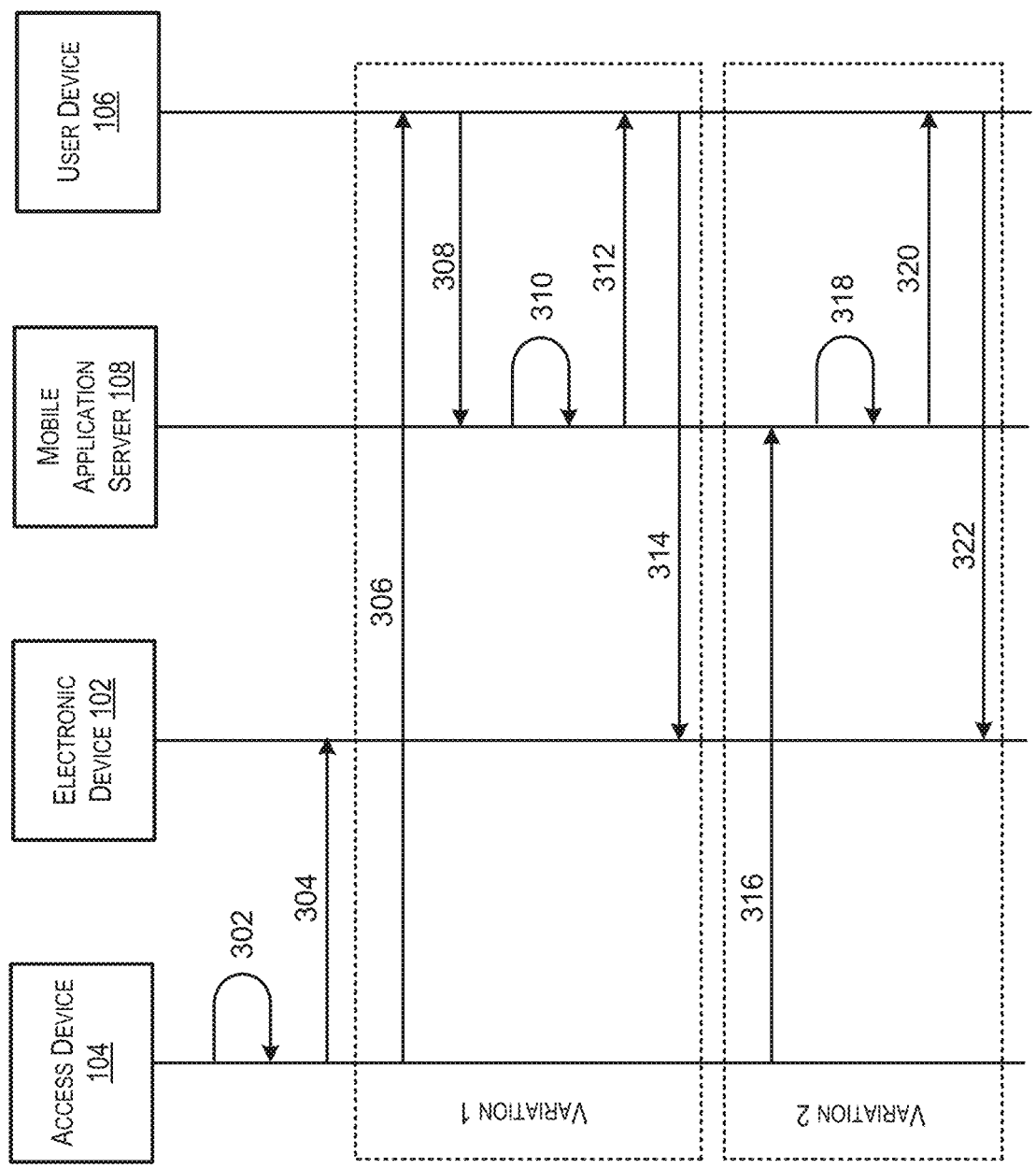
FIG. 3 depicts a process for transmitting and using a device key to issue commands to an electronic device in accordance with at least some embodiments.

FIG. 3 depicts a process for transmitting and using a device key to issue commands to an electronic device 102 in accordance with at least some embodiments. Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with embodiments of the disclosure, the process 300 of FIG. 3 may be performed by at least the access device 104, electronic device 102, mobile application server 108, and user device 106 shown in FIG. 2. The code may be stored on a computer-readable storage medium, for example, in the form of a computer program including a plurality of instructions executable by one or more processors. The computer-readable storage medium may be non-transitory. As depicted in FIG. 3, the process 300 may involve separate variations, of which two exemplary variations of the process 300 are described (variation 1 and variation 2). However, it should be noted that other variations of the process 300 being within the spirit of the disclosure would be apparent to one skilled in the art after reading this disclosure.

Process 300 may begin at 302, when an access device 104 receives an indication that an ownership interest in an electronic device 102 should be conveyed to a user. In some embodiments, this may result from the completion of a sale conducted at the access device 104 for that electronic device 102. In some embodiments, the access device 104 may obtain user information pertaining to the sale. For example, the access device 104 may collect a loyalty (or other account) identifier, a phone number, an email address, or some other suitable means of identifying a user.

In some embodiments, the access device 104 may be configured to transmit an unlock command to the electronic device 102 at 304. For example, upon receiving payment but before completion of the sale of an electronic device 102 or after the completion of the sale, the access device 104 may be configured to establish communication with a circuit within the electronic device 102 and provide an unlock command along with a device key for the electronic device 102 in order to cause it to unlock the electronic device 102. In some cases, this may further involve the access device 104 retrieving a device key for the electronic device 102 from a mobile application server 108.

In embodiments of a first variation of the process 300 (Variation 1), the access device 104 may convey registration information to the user device 106 which enables the user to obtain the device key for the electronic device at 306. The registration information may be conveyed to the user device 106 via a number of different techniques. In some embodiments, the registration information may be encoded into a machine-readable code which is presented to the user device 106 by the access device 104. In some embodiments, the access device 104 may establish a communication session with the user device 106 and may convey the registration information over that communication session. In some embodiments, the registration information may include the device key. In some embodiments, the registration information may include an identifier for the electronic device 102 or an identifier for the transaction conducted at 302.

Upon receiving the registration information, the user device 106 may convey at least a portion of that registration information to the mobile application server 108 at 308. Additionally, the user device 106 may convey a user identifier to the mobile application server 108 at 308.

Upon receiving the registration information and user identifier at the mobile application server 108, the mobile application server 108 may identify an account associated with the user device 106 based on the received user identifier at 310. At this step, the mobile application server 108 may also identify one or more electronic devices 102 to be associated with that account based on the received registration information. The mobile application server 108 may further make a determination as to whether the one or more electronic devices 102 were legitimately obtained (e.g., legitimately sold) at this point. In some embodiments, once the one or more electronic devices have been identified and the electronic devices 102 are confirmed to have been sold or otherwise obtained legitimately, the mobile application server 108 may link the electronic devices 102 to the identified account.

Once the device keys for the electronic devices 102 have been identified, the mobile application server 108 may transmit those device keys to the user device 106 at 312. A mobile application installed upon, and executed from, the user device 106 may then store the device keys in local memory of the user device 106 for future use. In some embodiments, the device keys may be encrypted prior to being stored. Each device key may subsequently be used to issue commands to the corresponding electronic device 102 at 314.

In embodiments of a second variation of the process 300 (Variation 2), the access device 104 may convey a user identifier (collected at 302) to the mobile application server 108 at 316. As described above, the user identifier may be any identifier capable of being used to identify a particular user, communication channel, and/or account. The user identifier may be provided to the mobile application server 108 along with an indication of an electronic device 102 and/or a completed transaction.

Upon receiving the user identifier, the mobile application server 108 may identify an account associated with the user identifier at 318. The mobile application server 108 may identify one or more electronic devices 102 to be associated with the identified account based on the indication of the electronic device 102 or completed transaction. The mobile application server 108 may also identify device keys corresponding to each of the identified electronic devices 102. Additionally, the mobile application server 108 may identify contact information for a user device 106 associated with the identified account. For example, the mobile application server 108 may retrieve a phone number on record for the account.

Once the device keys for the electronic devices 102 have been identified, the mobile application server 108 may transmit those device keys to the user device 106 at 320. In some embodiments, the mobile application server 108 may transmit the device keys via contact information identified at 318. A mobile application installed upon, and executed from, the user device 106 may then store the device keys in local memory of the user device 106 for future use. In some embodiments, the device keys may be encrypted prior to being stored. Each device key may subsequently be used to issue commands to the corresponding electronic device 102 at 322.

Figure 4:
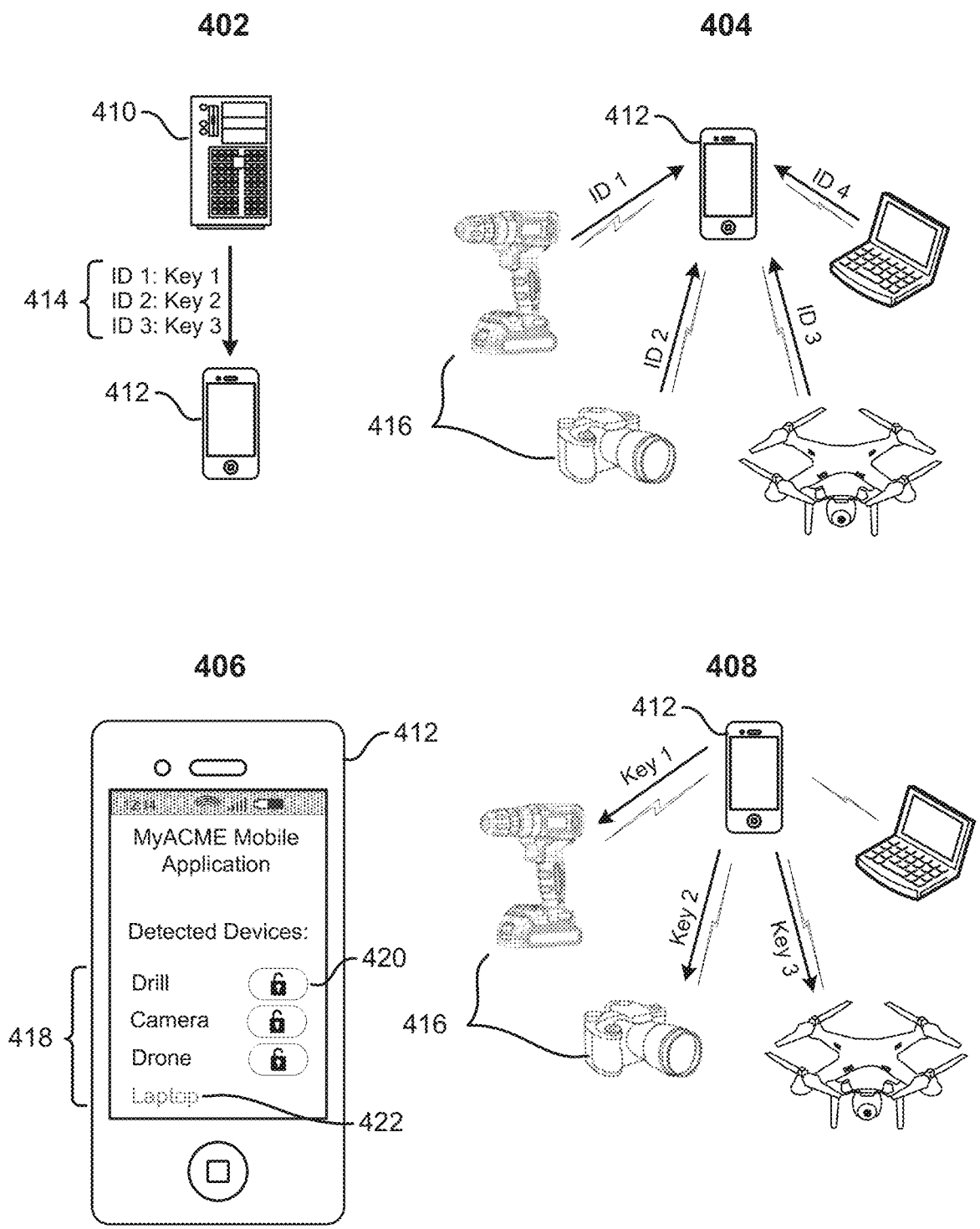
FIG. 4 depicts an illustrative example of an interaction that may occur using embodiments of the system described herein.

FIG. 4 depicts an illustrative example of an interaction that may occur using embodiments of the system described herein. The interaction of FIG. 4 is depicted during four different phases of the interaction, which are labeled 402, 404, 406, and 408. As depicted at 402, a mobile application server 410 may detect an update to an ownership or authorization status regarding an electronic device (e.g., as a result of a sale or rental) or other suitable indication that a device key is needed. In response, the mobile application server 410 may identify a device key 414 for the electronic device and transmit that device key 414 to a user device 412 determined to be authorized to access the electronic device. In some embodiments, the mobile application server 410 may transmit a number of device keys 414 to the user device 412. Each of these keys may be mapped to an identifier for an electronic device. It should be noted that the device keys 414 may be transmitted one at a time (e.g., as separate communications) or as a set of device keys 414. Once received by the user device 412, the device keys (along with their corresponding electronic device identifiers) may be stored in memory of the user device 412.

As depicted at 404, a user device 412 may connect with a number of electronic devices 416. In some cases, a short-range wireless communication means may be activated on the user device 412. Upon activation, the user device 412 may detect a number of electronic devices 416 in the vicinity of the user device 412 (e.g., within communication range of the short-range communication means). Each electronic device 416 may provide a corresponding identifier (ID) by which that electronic device can be identified. In some embodiments, a format or indicator within the identifier may be used to determine a type or category of the electronic device 416. It should be noted that in embodiments of the electronic device in which a circuit (e.g., circuit 230 of FIG. 2) is independently powered, the electronic devices 416 may be detected even if the electronic devices 416 themselves are not powered.

Upon receiving identifiers from the electronic devices within the vicinity of the user device 412, the user device 412 may determine for which electronic devices in its vicinity it has stored a corresponding device key. As depicted at 406, the user device 412 may compile a list 418 of detected devices 416 which may be presented to a user. In some embodiments, the list 418 of detected devices 416 may be accompanied by an indication 420 of one or more commands available to the user of the user device 412. In some embodiments, the list 418 of detected devices 416 may include all electronic devices detected in the vicinity of the user device 412, which includes electronic devices 422 for which no device key is available. In some embodiments, the list 418 of detected devices 416 may include only electronic devices for which a device key is currently stored in memory of the user device.

As depicted at 408, a user of the user device 412 may issue commands to one or more of the electronic devices 416. To do this, the user device 412 may be configured to transmit the command along with a device key corresponding to the electronic device 416. It should be noted that in embodiments of the electronic device in which a circuit (e.g., circuit 230 of FIG. 2) is independently powered, commands may be transmitted to the electronic devices 416 even if the electronic devices 416 themselves are not powered.

Figure 5:
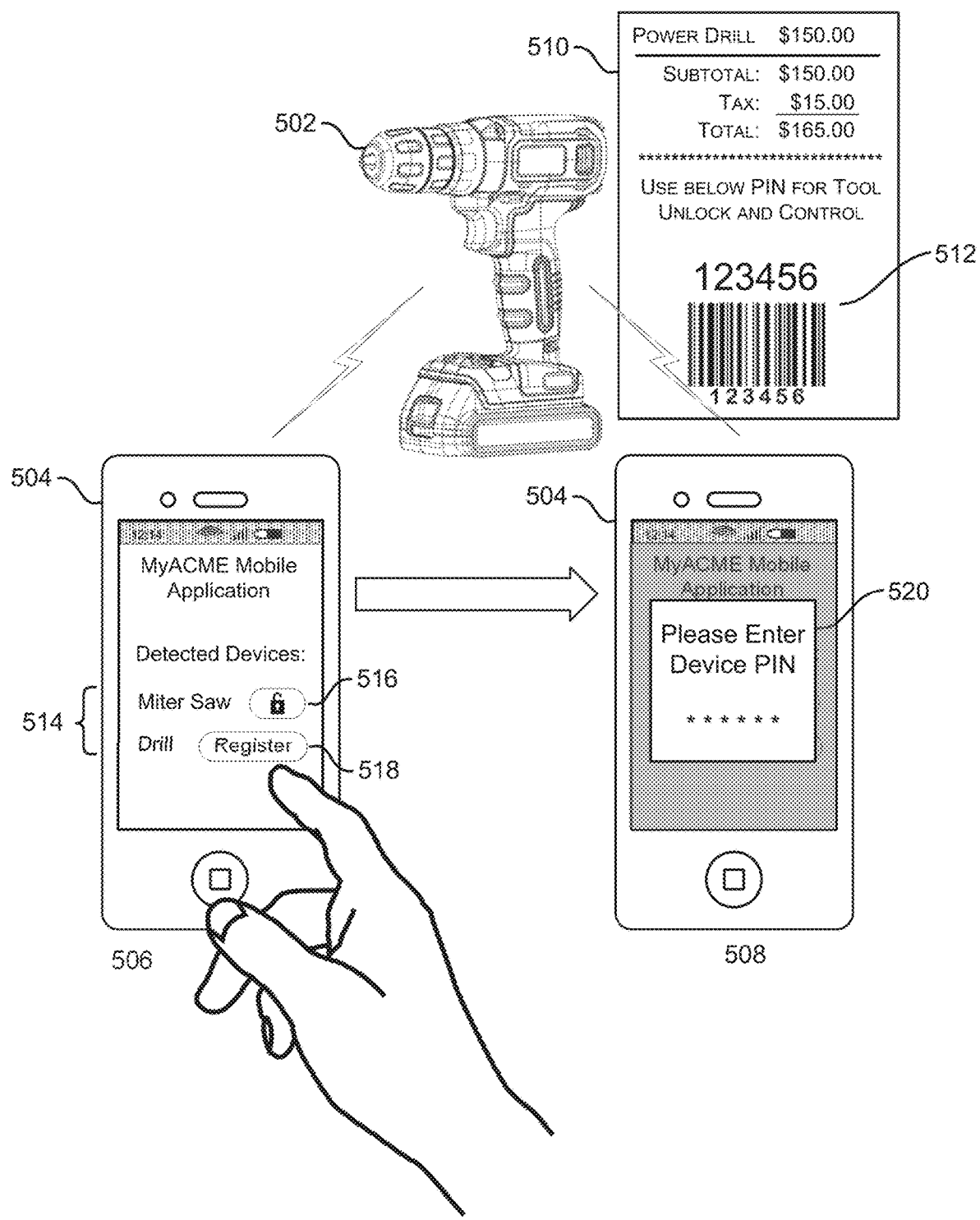
FIG. 5 depicts a first illustrative example of a user interaction enabled via a mobile application graphical user interface executed on a user device in accordance with at least some embodiments.

FIG. 5 depicts a first illustrative example of a user interaction enabled via a mobile application GUI executed on a user device in accordance with at least some embodiments. The illustrated user interaction results in enabling commands to be issued to the electronic device 502 via a user device 504. In FIG. 5, the interaction is illustrated via a mobile application GUI (executed from a user device) depicted during two different phases of the interaction, which are labeled 506 and 508. In some embodiments, the mobile application may be associated with an account maintained by a mobile application server (e.g., mobile application server 108 described with respect to FIG. 1). In order to use the mobile application, a user may be required to log into the account, which may involve authenticating the user via user-provided login credentials or some other authentication means (e.g., biometrics).

In accordance with at least some embodiments, a receipt 510 may be generated upon completion of a sale of an electronic device 502. A receipt 510 as described herein may be physical (e.g., printed) or virtual (e.g., digital) in nature and may include registration information 512 that may be used to authenticate an owner of the electronic device 502. In some embodiments, the registration information 512 may be formatted in a manner suitable to be read by a human user. In some embodiments, the registration information 512 may be formatted in a manner which can be read by a user device 504. For example, the registration information 512 may be encoded into a machine-readable code. In some embodiments, the registration information 512 may be provided in both formats.

As depicted at 506, the GUI may display a number of electronic devices detected within the vicinity of the user device 504. In some cases, a short-range wireless communication means may be activated on the user device 504. Upon activation, the user device 504 may detect a number of electronic devices 502 in the vicinity of the user device 504 (e.g., within communication range of the short-range communication means). Each electronic device 502 may provide a corresponding identifier (ID) by which that electronic device can be identified. Upon receiving identifiers from the electronic devices within the vicinity of the user device 504, the user device 504 may determine for which electronic devices in its vicinity it has stored a corresponding device key. As depicted at 506, the user device 504 may compile a list 514 of detected devices which may be presented to a user. In some embodiments, the list 514 of detected devices may be accompanied by an indication 516 of one or more commands available to the user of the user device 504 for electronic devices which do correspond to a device key stored in memory.

In some embodiments, upon determining that the user device 504 does not currently have a device key in memory for a detected electronic device 502, the mobile application may enable a user of the user device 504 to attempt to register the electronic device. In some cases, user device 504 may transmit a query to a mobile application server that includes an identifier for the electronic device 502 to determine that the electronic device 502 is not already registered as well as that the electronic device 502 has been legitimately sold. In some embodiments, registration information 512 may be generated upon a legitimate sale of an electronic device 502, such that it is only available for electronic devices which have been legitimately sold. Additionally, a mobile application server may maintain a record of sales of electronic devices which may be consulted to determine whether an electronic device 502 has been legitimately sold.

Upon receiving instructions from a user of the user device 504 to register an electronic device 502, the GUI may provide a prompt 520 to provide details from the registration information 512 in order to authenticate that the user is the legitimate purchaser of the electronic device 502. In some embodiments, the details may be manually input by a user (e.g., via a keypad). In some embodiments, the details may be input using a barcode scanner or other input device in communication with the user device 504. Upon receiving those details, the user device 504 may convey the details to a mobile application server, which may compare the entered details to those on record. Provided that the details match, the mobile application server may respond by retrieving the device key associated with the electronic device 502 and transmitting that device key to the user device 504. The list of detected devices 514 may then be updated to indicate that a command is available to be provided to the electronic device 502. The user device 504 may then be used to issue commands to the electronic device 502 using the received device key. It should be noted that in the illustrative interaction described with respect to FIG. 5, the electronic device need not be linked to an account. Additionally, in embodiments in which prior registration is not checked, any person in possession of the receipt may gain access to the device key. This enables the original owner of the electronic device 502 to sell the electronic device to a new owner and enable that new owner to obtain a device key on his or her own user device.

Figure 6:
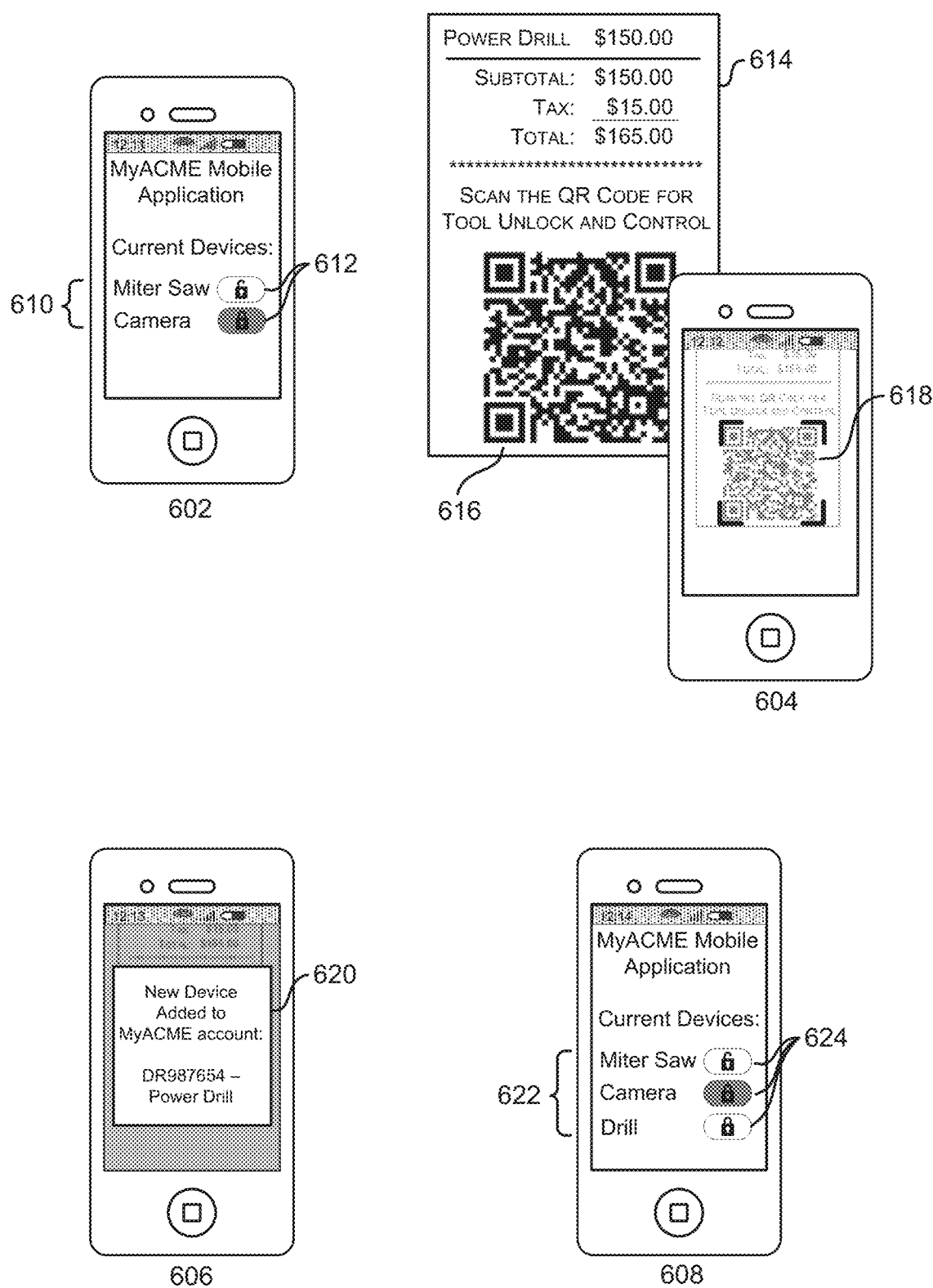
FIG. 6 depicts a second illustrative example of a user interaction enabled via a mobile application graphical user interface executed on a user device in accordance with at least some embodiments.

FIG. 6 depicts a second illustrative example of a user interaction enabled via a mobile application GUI executed on a user device in accordance with at least some embodiments. The illustrated user interaction results in linking an electronic device to an account as well as enabling commands to be issued to the electronic device via a user device. In FIG. 6, the interaction is illustrated via a mobile application GUI (executed from a user device) depicted during four different phases of the interaction, which are labeled 602, 604, 606, and 608. In some embodiments, the mobile application may be associated with an account maintained by a mobile application server (e.g., mobile application server 108 described with respect to FIG. 1). In order to use the mobile application, a user may be required to log into the account, which may involve authenticating the user via user-provided login credentials or some other authentication means (e.g., biometrics).

As depicted at 602, the mobile application GUI may display a list 610 of electronic devices currently associated with the account linked to the mobile application. In some embodiments, the mobile application may store the list 610 of electronic devices (and corresponding device keys) locally in the memory of the user device on which it is executed. In some embodiments, the list may be generated upon the mobile application causing the user device to communicate with a mobile application server in order to request the current list 610 of electronic devices. In some embodiments, the list 610 of electronic devices may include only those electronic devices detected as being within wireless communication range of the user device. In other embodiments, the list 610 of electronic devices may include all electronic devices currently linked with the account associated with the mobile application.

Along with the list 610 of electronic devices, the mobile application GUI may display additional information 612 for each electronic device in the list 610. For example, the mobile application GUI may display additional information 612 which includes a name (or nickname) of the electronic device, a status of the electronic device, available commands for the electronic device, an indication as to whether the electronic device is in range, etc. In some embodiments, the additional information 612 may be dynamically updated based on information about each electronic device. For example, if a current status of a tool is "locked" then "unlock" may be displayed as an available command, whereas "lock" may not be displayed as an available command. By way of a second example, a command may be greyed out on the GUI or made unavailable if the electronic device is not currently within wireless range of the user device. In some embodiments, the types of commands available for a particular electronic device may vary based on the type or category of that electronic device.

As depicted at 604, an additional electronic device may be linked to an account associated with a mobile application using a receipt 614 generated from a sale of the electronic device. In some embodiments, the receipt may include a machine-readable code 616 which has registration details encoded within it. In order to link the electronic device to an account associated with the mobile application, the user device may be used to scan the machine-readable code 616. For example, an image 618 of the machine-readable code 616 may be captured using a camera device installed on the user device and accessed by the mobile application. The mobile application may then decode the registration information encoded within the machine-readable code 616. In some embodiments, the mobile application may be caused to automatically (i.e., without human interaction) take an action regarding the registration information.

The registration information encoded into the machine-readable code 616 may include any suitable information that may be used to link one or more electronic devices to an account. In some embodiments, the registration information may include device identifiers, such as a serial numbers, for each of the electronic devices purchased in a transaction. In some embodiments, the registration information may include a transaction identifier that may be used to identify a particular completed transaction. In some embodiments, the registration information may include a link or location indicator which causes the mobile application to access a location in which various electronic device details are stored. In some embodiments, the registration information may include a code or PIN associated with the completed transaction which may be used to verify that the user of the user device is in physical possession of the receipt 614.

In some embodiments, the registration information may include one or more device keys to be associated with the electronic devices. In other embodiments, the registration information may not include those device keys, such that the device keys must be retrieved from a mobile application server. For example, upon completion of a transaction at a resource provider, that resource provider may independently provide a record of the transaction to a mobile application server. The mobile application server may then update a status associated with each electronic device involved in the transaction to indicate that the electronic device has been legitimately sold. Continuing with the above example, a mobile application that has obtained registration information associated with an electronic device (or electronic devices) from a machine-readable code 616 may communicate that registration information to the mobile application server. The mobile application server may then determine that the electronic devices identified in relation to the registration information have been legitimately sold and have not already been registered. Upon making this determination, the mobile application server may then link the electronic devices to the account associated with the mobile application, identify the corresponding device keys for each of the electronic devices, and transmit each of the corresponding device keys to the mobile application.

As depicted at 606, once an electronic device has been successfully linked to an account associated with the mobile application, a notification 620 may be displayed indicating that the electronic device has been successfully linked to the account. In some embodiments, the mobile application may receive a device key from the mobile application server upon the electronic device being successfully linked to the account. In some embodiments, the mobile application may receive a device key from the registration information encoded into the machine-readable code 616, which may then be stored in association with the electronic device by the mobile application.

As depicted at 608, the mobile application GUI may display an updated list 622 of electronic devices currently linked to the account associated with the mobile application once the electronic device has been linked to the account. The mobile application GUI may also display updated additional information 624 for each of the electronic devices in the list 622. Once the electronic device has been linked to the account, the mobile application GUI may be used to issue commands to the electronic device using the received device key.

Figure 7:
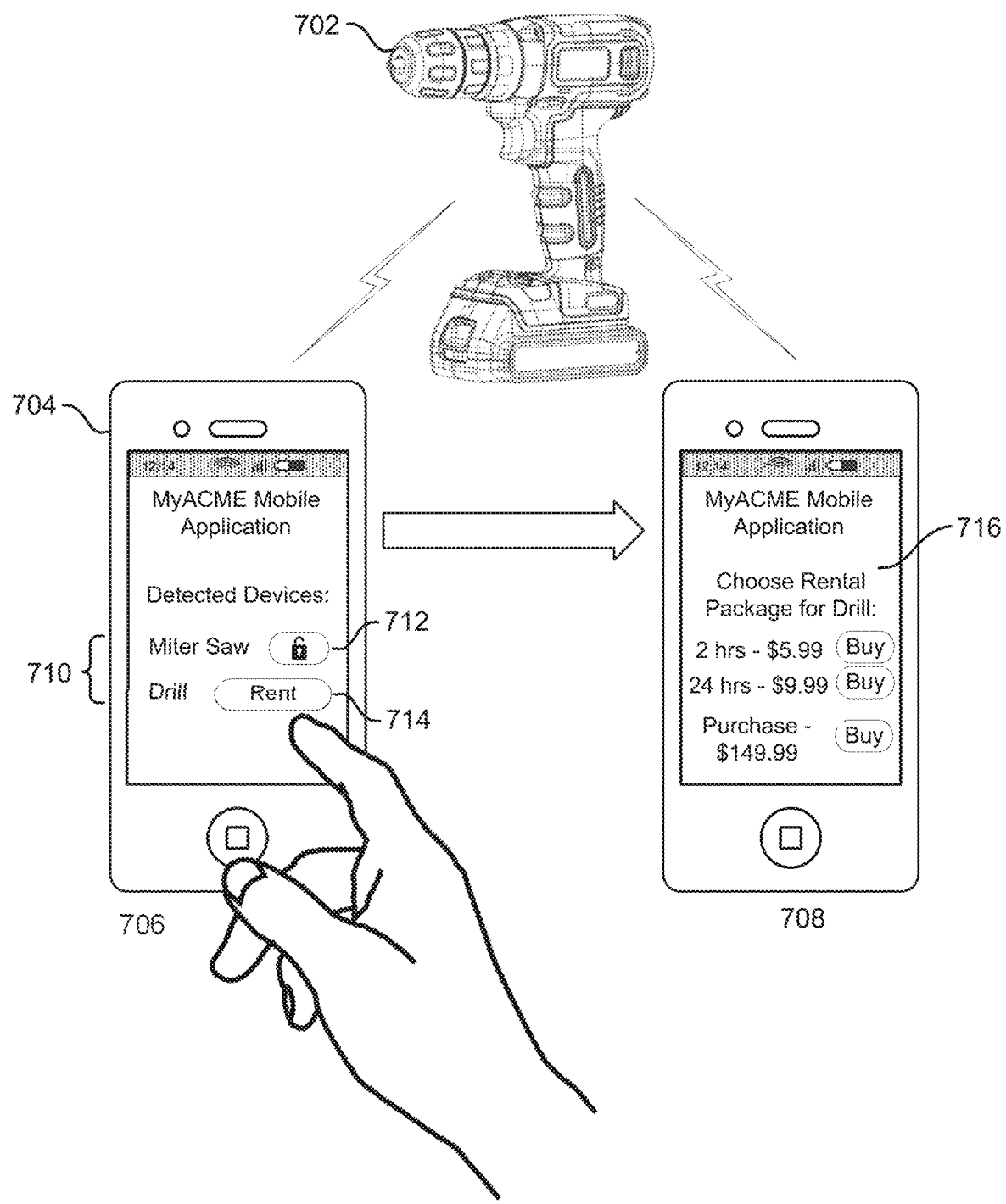
FIG. 7 depicts a third illustrative example of a user interaction enabled via a mobile application graphical user interface executed on a user device in accordance with at least some embodiments.

FIG. 7 depicts a third illustrative example of a user interaction enabled via a mobile application GUI executed on a user device in accordance with at least some embodiments. The illustrated user interaction results in enabling commands to be issued to the electronic device 702 via a user device 704 for a predetermined amount of time (e.g., as a rental). In FIG. 7, the interaction is illustrated via a mobile application GUI (executed from a user device) depicted during two different phases of the interaction, which are labeled 706 and 708.

As depicted at 706, the GUI may display a number of electronic devices detected within the vicinity of the user device 704. As depicted at 706, the user device 704 may compile a list 710 of detected devices which may be presented to a user. In some embodiments, the list 710 of detected devices may be accompanied by an indication 712 of one or more commands available to the user of the user device 704 for electronic devices which correspond to a device key stored in memory of the user device 704.

In some embodiments, upon determining that the user device 704 does not currently have a device key in memory for a detected electronic device 702, the mobile application may enable a user of the user device 704 to attempt to rent the electronic device (e.g., via button). In some cases, user device 704 may transmit a query to a mobile application server that includes an identifier for the electronic device 702 and the mobile application server may respond that the electronic device 702 is available for rent. In some embodiments, the mobile application server may also provide a link to a location (e.g., a uniform resource locator (URL)) which will enable the user of the user device to initiate a transaction to rent the electronic device. For example, upon selection of a button 714 to rent the electronic device 702, the mobile application GUI may load a webpage 716 hosted by the mobile application server. Upon reception of payment and before completion of a transaction by the user or upon completion of the transaction, the mobile application server may transmit a device key associated with the electronic device 702 to the user device 704, though the device key may be encrypted as described below. Information about the rental can be maintained by an ownership registry. In some embodiments, the ownership registry uses a blockchain ledger.

Each electronic device 702 may include a secure memory element having associated with it a cryptographic key. In some embodiments, the cryptographic key may be part of a cryptographic key pair that can be used to securely communicate with the secure memory element. In these embodiments, the mobile application server, upon reception of payment and completion of a transaction for rental of an electronic device 702 or upon completion of the transaction as described above, may generate a packet of data that includes at least an expiration date/time as well as the device key. The mobile application server may then encrypt that packet so that it may only be decrypted using the cryptographic key of the secure element. One skilled in the art would recognize that this would prevent the user device from capturing the device key despite having possession of the encrypted packet. The user device 704 is then able to issue a command to the electronic device 702 by providing the encrypted packet that includes the device key. In these embodiments, the commands would continue to be executed until the expiration date/time is reached, after which the electronic device 702 may no longer accept the encrypted packet. In some embodiments, the electronic device 702 may revert to a "locked" state upon reaching the indicated expiration date/time.

Figure 8:
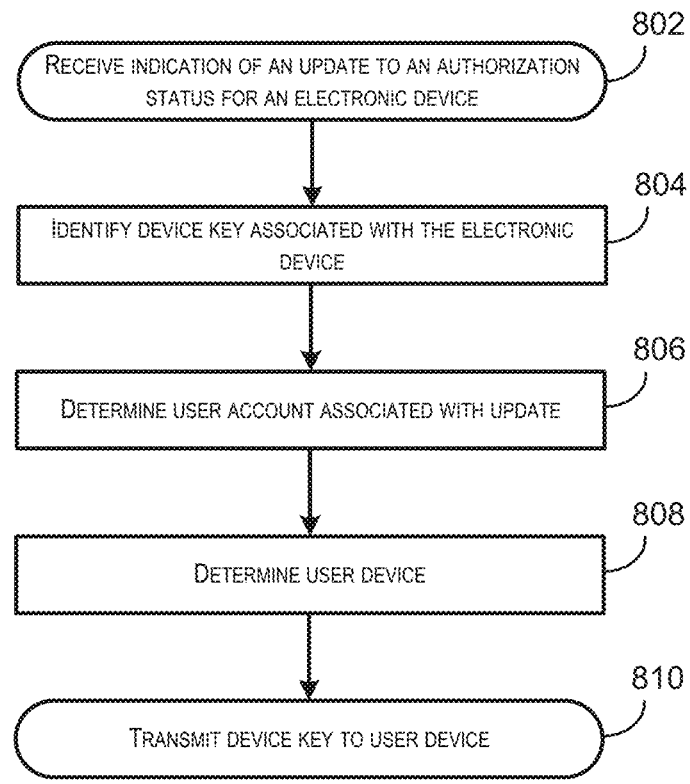
FIG. 8 depicts a flow diagram illustrating a process for updating an authorization status of an electronic device and providing a device key to a user device in accordance with at least some embodiments.

FIG. 8 depicts a flow diagram illustrating a process for updating an authorization status of an electronic device and providing a device key to a user device in accordance with at least some embodiments. In accordance with at least one embodiment, the process 800 of FIG. 8 may be performed by at least the mobile application server 108 shown in FIG. 2.

Process 800 may begin at 802 upon receiving an indication of an update to an authorization status of an electronic device. The indication may include at least an identifier for the electronic device. An authorization status for an electronic device may be any indication of which users are authorized to issue commands to the electronic device. In some embodiments, an update to the authorization status of the electronic device may be a sale of the electronic device. In some embodiments, an update to the authorization status of the electronic device may be caused by a rental or lending of the electronic device.

At 804, the process 800 may involve identifying a device key associated with the electronic device. The device key may be associated with only a single electronic device. In some embodiments, the device key may be identified by querying a database of mappings between electronic device identifiers and device keys stored in memory of the mobile application server (e.g., device key data 212 of FIG. 2).

At 806, the process 800 may involve determining an account associated with the update to the authorization status of the electronic device. The account may be determined based upon a received user identifier. For example, upon a sale of the electronic device, an access device (e.g., a point-of-sale terminal) may provide a user identifier to the mobile application server which may be used to identify the account. Such a user identifier may be at least one of a loyalty account number, credit card number, phone number, email address, or user name. In some embodiments, the process 800 may further involve associating the electronic device with the account.

At 808, the process 800 may involve determining a user device associated with the update to the authorization status of the electronic device. In some embodiments, the user device is determined by virtue of being associated with the determined account. In some embodiments, the process 800 may further involve receiving a request for the device key from the user device, and the user device may be determined by virtue of having provided the request. In these embodiments, the request may include a transaction identifier capable of being used to identify the update to the authorization status of the electronic device.

At 810, the process 800 may involve transmitting the device key to the user device. Once received, the device key is usable by the user device to issue commands to the electronic device. For example, the user device may issue at least a command to lock the electronic device or a command to unlock the electronic device. In some embodiments, the device key is transmitted to the user device via a push notification. In some embodiments, the user device is operated by an agent of a resource provider providing access to the electronic device. In some embodiments, the user device is operated by a purchaser of the electronic device.

Figure 9:
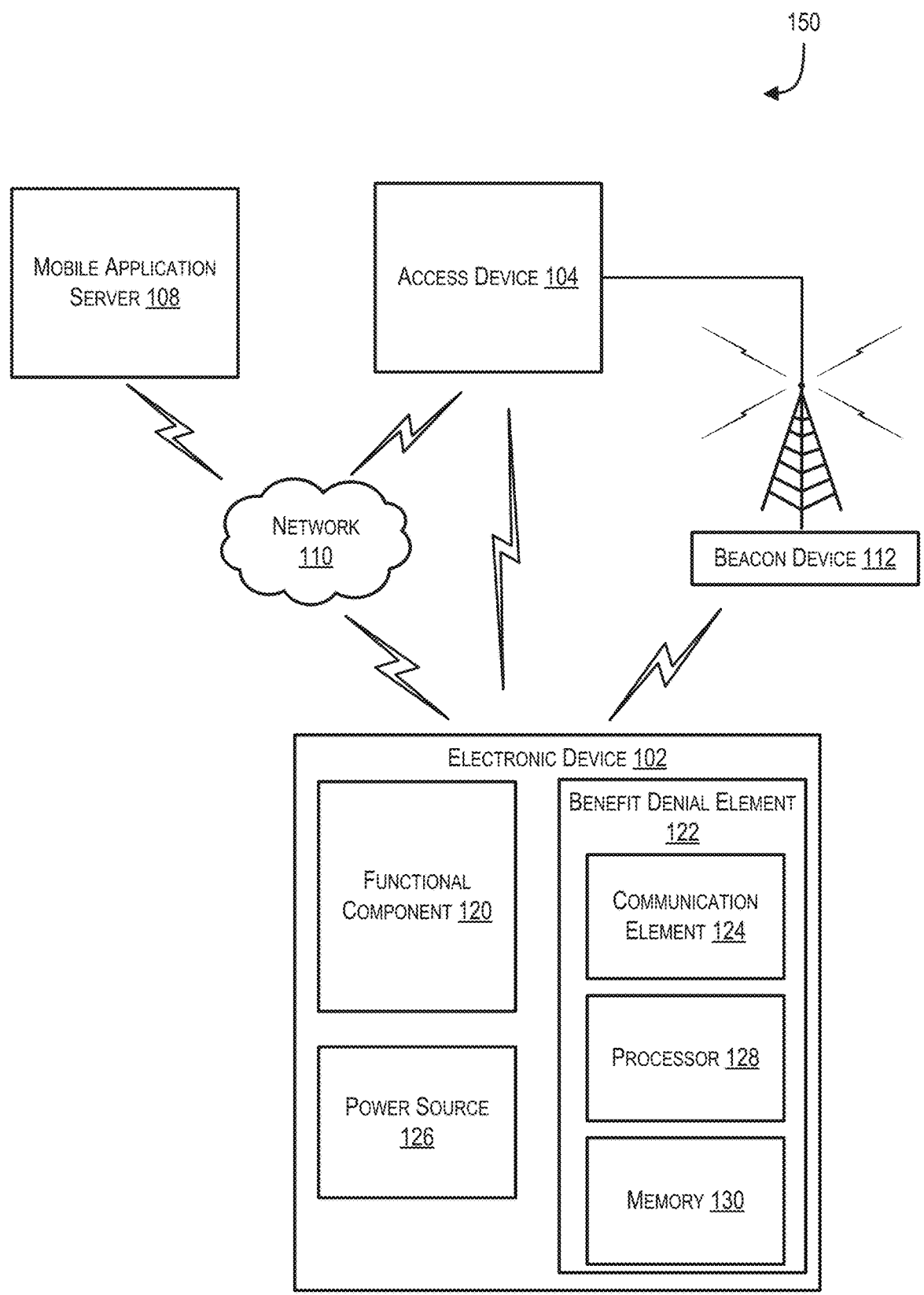
FIG. 9 depicts a simplified block diagram for a benefit denial system for an electronic device in accordance with at least some embodiments.

FIG. 9 depicts a simplified block diagram for a benefit denial system 150 for an electronic device 102 in accordance with at least some embodiments. The benefit denial system 150 includes an access device 104, a network 110, and an electronic device 102 outfitted with benefit denial components. For simplicity only the access device 104 is shown in FIG. 9. The access device 104 may be a POS system as described above, but may also encompass user devices 106, remote servers, or other elements of the system described above. The benefit denial components and the components of the electronic device 102 may all be contained within the housing of the electronic device 102. The benefit denial components include a benefit denial element 122, a communications element 124, a processor 128, and a memory 130. In addition, there will be a functional component 120 and a power source 126 within the electronic device 102 to perform the main functions of the electronic device. In some examples, some elements of the benefit denial system, such as the communications element 124 or the benefit denial element 122 may be exterior of and connected to the housing of the electronic device 102. In some embodiments, the power source 126 (e.g., a rechargeable battery pack) can be removably coupled to the electronic device 102.

The electronic device 102 and the access device 104 may communicate using any suitable communication protocol, either via a physical or wireless connection. As an example, the access device 104 and the electronic device 102, and in particular the communication element 124 of the electronic device 102, may communicate using BLUETOOTH™, BLUETOOTH™ LOW ENERGY (BLE), RFID, or other such wireless communications to transmit and receive information. In some embodiments, a communication between the access device 104 and the electronic device 102 may be indirect, in that the communication is transmitted over a network 110. For example, the electronic device may comprise an Internet-of-Things (IoT) device in communication with a network 110. Network 110 may include any suitable combination of wired, wireless, cellular, personal area, local area, enterprise, virtual, or other suitable network.

In some embodiments, the system may include a beacon device 112 capable of providing an unlock command to an electronic device 102. The beacon device 112 may generally be located within a store and interface with one or more other devices in the store or around the vicinity of the store, such as with one or more access devices 104 and one or more electronic devices 102, and with one or more devices remote from the store, such as one or more mobile application servers 108. The beacon 112 may also be integrated with another device located within the store, such as by being integrated in an access device 104 (in which case, if the store includes multiple access devices, multiple beacon devices 112 may therefore be also included). In embodiments, the beacon device 112 may be placed within a store near its entrance and/or exit. A beacon device 112 may be configured to monitor short-range communication channels for electronic devices that come within range. Each electronic device 102 may broadcast an identifier (e.g., a serial number), which may be detected by the beacon device 112. As a user approaches the beacon device 112 to exit the store, the beacon device 112 may detect any electronic device 102 that comes within communicative range of the beacon device 112. Note that in embodiments in which the benefit denial element 122 is independently powered via a dedicated power source, the electronic device 102 may be detected even if it is currently unpowered (e.g., in an off state or disconnected from the power source 126 that powers the functional component 120). Upon detecting an electronic device 102 within range, the beacon device 112 may be configured to communicate an identifier for the electronic device 102 to the access device 104 and/or the mobile application server 108, which may then check to see if the electronic device 102 has been legitimately sold or otherwise obtained legitimately. Provided that the electronic device 102 has been legitimately sold or otherwise obtained legitimately, the beacon device 112 may be provided with a device key for the electronic device 102, which it may then provide to the electronic device 102 along with a command to enter an unlocked state. In some embodiments, the command may be provided to the electronic device 102 by the beacon device 112 separately from the device key 102 (e.g., during a communication session established after having already transmitted the device key from the beacon device 112 to the electronic device 102 and having verified a device key match, or after having provided information to the electronic device 102 otherwise indicating that the beacon device 112 has access to the device key). If the electronic device 102 has not been legitimately sold or otherwise legitimately obtained, the beacon device 112 may be configured to refrain from sending any unlock commands to the electronic device 102 (or send a lock command to ensure that the electronic device 102 remains locked and that its functional component 120 remains partially or completely disabled/inoperable) and/or sound an alarm, log an event that includes the electronic device identifier (so that video of the event can be later retrieved), or notify an agent of the retailer.

The electronic device 102 may include any powered device that performs a function. A non-exhaustive list may include power tools, cameras, cellphones, computers, music players, vehicles, toys, televisions, clocks, vehicles, robots, communication devices, medical devices, appliances, and the like. The functional component 120 may include any number of circuits, motors, transistors, and various elements required to perform the function of any particular electronic device 102. As an example, a cordless drill includes a functional component that includes an electric motor, switch, and drill circuit board that control the drill. The electronic device 102 also includes a power source 126 that may be removable or permanently affixed. For example, the cordless drill may include a wired connection which electrically connects to a wall outlet or may have a removable battery that provides power to drive the electrical motor.

Figure 10:
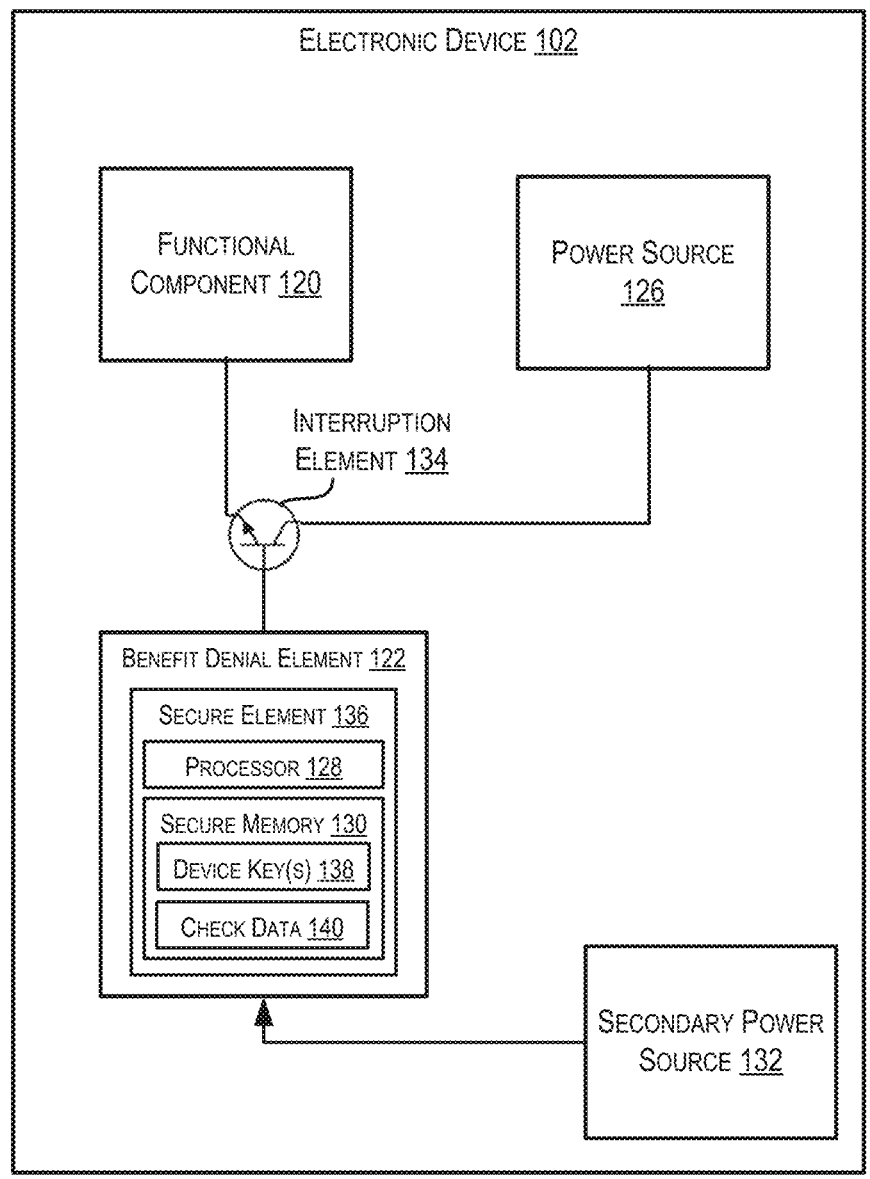
FIG. 10 depicts a simplified block diagram for an electronic device including a benefit denial chip in accordance with at least some embodiments.

The benefit denial element 122, communication element 124, processor 128 and memory 130 are electrically coupled together, in addition to the functional component 120 and the power source 126, for example as shown in FIG. 10, to provide the benefit denial features of the disclosure. The benefit denial element 122, communication element 124, processor 128, memory 130, and/or functional component 120 may be contained within a single device or chip or may alternatively be separate components within the electronic device 102. The power source 126 may include a single power source such as a removable battery that powers both the functional component 120 and the benefit denial components. In some examples, the power source 126 may include multiple batteries or sources of power, one for the functional component 120 and a separate power source for the benefit denial components.

The communication element 124 communicates over the network 110 with the access device 104, user device 106, or other system components described herein. The communication element may include an RFID chip, a BLUETOOTH™ chip, or other short-range wireless communication devices. The communication element 124 may both send and receive signals, though in some examples it may be limited to receiving signals only.

The processor 128 and memory 130 are in communication with the communication element 124 and are capable of performing the methods described below with respect to FIG. 11 as well as providing signals or instructions to the benefit denial element 122 based on signals received by the communication element. There may be multiple processors or memory devices associated with the system 150, though only one is shown in FIG. 9. The memory 130 may include one or more enclaves, which include protected information that cannot be read or altered by a process exterior of the enclave. The enclave within memory 130 may include decryption information such as a decryption key that may be used by the processor to decrypt encrypted communications from the access device 104. Generally, the processor 128 is configured to execute the computer-readable instructions, wherein execution of the computer-readable instructions by the processor, configures the benefit denial element 122 to perform one or more operations. these operations include, for instance, determining first unlocking information of the benefit denial element 122, and selectively disabling or enabling at least one function of the electronic device 102 in accordance with a received command upon determining that another electronic device has access to second unlocking information and that the second unlocking information corresponds to the first unlocking information.

The benefit denial element 122 may be a component capable of enabling or preventing the flow of electrons or power from the power source 126 to the functional component 120. The benefit denial element 122 may include physical switches in addition to transistors or electrically controlled switches and relays that selectively provide or restrict a conduit for power between the power source 126 and the functional component 120. In some examples, the benefit denial element 122 may include a transistor in communication with a capacitor which stores a state. An example of such a component may be a metal-oxide-semiconductor field-effect transistor (MOSFET) to provide an "on" or "off" state, corresponding to power being deliverable to the functional component 120 and not deliverable, respectively. In some examples, the benefit denial element 122 may include a relay, such as including an electromagnet that is activated by current from the power source 126 to open or close the circuit loop including the functional component 120. Additional electronic switches may include solid-state relays (based on the MOSFET) and latching relays which maintain a contact position indefinitely without power applied to the coil. Latching relays require power to switch between open and closed but do not require a maintenance current to keep the circuit open or closed. Accordingly, electronic switches and relays described above may be well suited for the benefit denial element 122 since only a small voltage is required to change the switch from "off" to "on" and as such there is little chance of the power source being depleted while stored, for example on the shelf of a retail store or in a distribution center as inventory.

In some examples, the benefit denial element 122 may include and/or be included with an integrated micro-controller of the electronic device 102. The integrated micro-controller may create or generate signals to convey to a functional component 120 of the electronic device 102. In such examples, when the code or device key is not received as described herein, the micro-controller will not send the commands or signals to the functional component 120. In some examples, the micro-controller may include software or other elements to perform the function of the benefit denial element 122. As such, any and all of the methods, structures, or systems described herein may be incorporated within integrated circuits or components of the electronic device 102, such as the micro-controller described above. In some examples, the benefit denial element 122 and the functional component 120 may be integrated on a same chip, such as by being components of a system-on-chip (SoC) or of a micro-controller chip, where the SoC or the micro-controller chip, as the case may be, also includes an interface between the benefit denial element 122 and the functional component 120.

In some examples, the benefit denial element 122 may include the thermal shutdown element of the electronic device 102. The thermal shutdown element may include a thermal regulation circuit installed within an electronic device 102. Such a thermal shutdown element is configured to detect overheating of regulators or elements, such as the functional component 120 and/or its power source 126, and automatically shuts down power to the functional component to prevent damage to the functional component 120 and/or its power supply 126 due to overheating. In some embodiments, the benefit denial element 122 may communicate or send a signal to the thermal shutdown element to cause the thermal shutdown element to prevent or allow power to flow to the functional component 120.

In some examples, the benefit denial element 122 may be powered by an induction coil rather than a battery or other such power source. For example, when a user purchases an electronic device, the POS system may include an electromagnetic field generator to power the benefit denial element 122, the communication element 124, and the processor 128. While the POS system temporarily provides power to these components, the POS system may simultaneously convey the "unlock" command and cause the benefit denial element 122 to close a circuit to the functional component 120 and allow power to flow to the functional component 120 when a user activates the electronic device 120 (e.g., by pressing an "on" button, switch, or trigger of the functional device 120) to carry out its function.

In some examples, the benefit denial element may include mechanical switches rather than transistors or relays. For example, the benefit denial element 122 may include a latching solenoid that uses an electrical pulse to actuate a solenoid between two stable positions, a magnetically actuated switch that changes between an open and a closed state based on a presence or change in a magnetic field, a motorized potentiometer that includes a motor driven by current from the power source to turn a motor to turn or change a potentiometer setting to increase or decrease a resistance to enable or prevent the flow of power to the functional component 120, a latching reed switch that includes flexible reeds with multiple coils and one reed biased by a permanent magnet to remain in either a closed or open state once switched by current through the coils, a motor-driven rotary switch which opens or closes with a motor driven action, or other such mechanical switches. These mechanical switches, and others like them, rely on an electrical current to switch between a closed and an open state but do not rely on a maintenance current to maintain either the closed or open state for the reasons described above.

In an example, electronic device 102 may be a cordless drill with functional component 120 including the drill motor. The power source 126 may be a removable battery of the cordless drill. A second (dedicated) power source may be a small battery within the housing of the cordless drill separate from the removable battery. Between the removable battery and the drill motor the benefit denial element 122, communication element 124, processor 128, and memory 130 may be contained on a single chip to which the second power source is connected. The removable battery may be electrically connected to the chip and the drill motor to the chip as well such that current may flow through the chip when the benefit denial element is closed.

Upon arrival at a retailer (distribution center or store), the cordless drill may be in an unlocked state, with the switch of the benefit denial element closed. On intake, the retailer may use an access device 104 to provide a lock command to the cordless drill. Upon receiving the lock command, and potentially after decrypting the command, the benefit denial element 122 is open such that no current may flow to the drill motor. The cordless drill may remain on the shelf until purchased by a consumer. While at the POS system completing their purchase, the POS system may act as an access device 104 and provide an unlock command to the cordless drill. This command may cause the processor to convey a signal to close the benefit denial element 122, allowing current to flow to the drill motor when the drill is coupled to its power source 126 and a user presses the activation trigger of the drill.

In some examples, as described herein, the electronic device 102 may be subsequently locked or unlocked by a consumer with a user device 106. This may include selectively locking or providing time limits on unlocked time for the electronic device 102, for example when a power tool is rented out or at a jobsite when work is limited to particular working hours.

FIG. 10 depicts a simplified circuit diagram for an electronic device 102 including a benefit denial element 122 in accordance with at least some embodiments. The benefit denial element 122 may include the communication element 124 (shown in FIG. 9) and a secure element 136. The secure element 136 may be a cryptographically protected or otherwise secure device or set of components including processor 128 which may be a cryptoprocessor as described above, and memory 130 of FIG. 9, which is a secure memory. Additionally, the secure memory may include device key data 138 and check data 140. In some embodiments, multiple device keys may be stored by the device key data 138 portion of the memory 130. For example, an electronic device 102 may be associated with a master key and one or more secondary keys. In this example, a retailer or manufacturer of the electronic device 102 may maintain a list of the master keys while a consumer is provided with a secondary key. In some cases, the consumer may be capable of changing or replacing a device key. By having a master device key, the system allows the consumer to have the benefit denial element 122 reset by the retailer or manufacturer if the consumer loses his or her secondary key (e.g., loses the device upon which the secondary key is stored).

In some embodiments, check data 140 may include data that may be used to authenticate a current owner. For example, the check data 140 may include a counter value which is incremented with each user. In these embodiments, the electronic device 102 may receive a command from a user device (e.g., user device 106 in FIG. 1) which is accompanied by an encrypted data packet. Upon receiving the command, the benefit denial element 122 may decrypt the data packet to retrieve a device key encoded within the data packet. The benefit denial element 122 may then determine if the retrieved device key is valid. Provided that the device key is valid, the benefit denial element 122 may also verify the check data 140. To do this, the benefit denial element 122 may retrieve a check value encoded within the encrypted data packet. For example, assume that the check value is a counter value. In this example, the benefit denial element 122 may compare the retrieved counter value to a counter value stored in the check value data 140. If the retrieved counter value is less than the counter value stored in the check value data 140, then the command may be declined. If the retrieved counter value is equal to the counter value stored in the check value data 140, then the command may be executed. If the retrieved counter value is greater than the counter value stored in the check value data 140, then the check value data 140 may be updated to reflect the retrieved counter value and the command may be executed.

Each of the elements shown in FIG. 10 may be included within the housing of the electronic device 102. The device key(s) 138 are stored on the secure memory 130 and can be used to verify or authenticate a device key received from an access device 104 as described herein. There may be one or more device key(s) which can be used to unlock/lock the electronic device 102, and there may be corresponding device key(s) 138 stored in the secure memory 130 corresponding to each of the multiple device key(s) for use by the access device 104. The benefit denial element 122 may communicate or convey a signal to interruption element 134, such as the switches, MOSFET, or other example elements described above in connection with the benefit denial element 122 of FIG. 9. The interruption element 134 serves to provide, enable, or prevent the flow of current to the functional component 120 based on the commands or signals from the benefit denial element 122. In this regard, the interruption element 134 is adapted to selectively enable or disable the electronic device 102 based on commands that are verified to have been received from an authorized source and also is adapted to refrain from complying with such commands if they are received from a device that is not verified (e.g., a device that fails to provide information indicating that it has access to a matching device key).

The functional component 120 includes the elements described above, and FIG. 10 shows the flow of power through the electronic device 102 as indicated by the arrows. In particular, a power source 126 as described above, and a secondary power source 132, provide power to the designated parts of the electronic device 102. The secondary power source 132 may be a separate (dedicated) power system to power only the benefit denial element 122 and functions thereof. As described above, in some examples, the secondary power source 132 may be the same as the power source 126, or it may be rechargeable by the power source 126 when the power source 126 is coupled to the electronic device 102 (and, in the case of a battery-based power source 126, when it is sufficiently charged). Alternatively, the second power source 132 can be a contactless and wirelessly powered source of electricity as described elsewhere in this disclosure (e.g., an inductively powered source of current). In some examples, the second power source 132 is integrated in or on of a housing of the electronic device 102 separate from the power source 126. Further, the second power source 132 may be configured to power the benefit denial element 122 even if the power source 126 is not coupled to the functional component 120 or is otherwise prevented from powering the functional component 120. In some examples, the functional component 120 may include more than one functional component capable of carrying out multiple functions. Some or all of these functional components may be restricted by the benefit denial element 122. In some cases, only a single functional component of the electronic device 102 may be restricted while others are unrestricted. In some cases, each functional component 120 may include a distinct interruption element 134 such that the benefit denial element 122 can provide access to some of the functional components 120 but not to all functional components 120 at the same time.

In some examples, the secondary power source 132 may include a second battery, a separate power line, or a device to provide power such as an inductive coil. The inductive coil can power the electronic circuit of the benefit denial element 122 to receive commands. For example, the inductive coil may be coupled to the beacon device and provide power to the benefit denial element 122 when in close proximity to each other. In some examples, the access device 104 may include a transmitter capable of providing a field to power the benefit denial element 122 through the inductive coil. As an illustrative example, the access device 104 may be a POS system where a customer purchases an electronic device from a retailer. The access device 104 may include a wireless field generator, such as a charging coil that produces a magnetic field (e.g., varying). The access device 104 may, during the process of checking out the customer and completing the purchase, provide power through the inductive coil to the benefit denial element 122 and simultaneously convey an unlock command and a device key to unlock the electronic device 102 as the customer leaves the store.

As shown in FIG. 10, the power source 126 provides power through the benefit denial element 122 to the functional component 120 when the power source 126 is coupled to the electronic device 102 and it is turned on (or activated to operate by the user). When the benefit denial element 122 receives a lock command from an access device 104 or user device 106 as described above, the benefit denial element 122 switches off the conduit providing power to the functional component 120, rendering the electronic device nonfunctional. This may be achieved through the use of switches or electrical components within the benefit denial chip as described above.

In embodiments, the secondary power source 132 is separate from the power source 126. When the electronic device 102 is in a locked state (e.g., is deactivated, or at least a function thereof is deactivated), the secondary power source 132 provides power to the benefit denial element 122 but not to the functional component 120. When the electronic device 102 is in an unlocked state (e.g., activated, or at least a function thereof is activated), one or both of the secondary power source 132 and the power source 126 can be used for the power. By way of a first example, the power source 126, rather than the secondary power source 132, provides power to the benefit denial element 122 and to the functional component 120. By way of a second example, the secondary power source 132 continues to provide power to the benefit denial element 122, whereas the power source 126 provides power to the functional component 120. In this second example, the power source 126 can recharge the secondary power source 132.

In these various examples, the benefit denial element 122 can include logic (e.g., program code stored in the secure memory 130 and executable by the processor 128) to select the power source 126 and/or the secondary power source 132 for the power draw and can include and/or interface with a set of switches (not illustrated in FIG. 10) controllable based on the logic to connect the benefit denial element 122 and/or the functional component 120 to the selected power source(s) 126 and/or 132. Referring back to the first example, the logic indicates that, in the locked state, the secondary power source 132 is to be selected to provide power to the benefit of denial element 122 only and that, in the unlocked state, the power source 126 is to be selected to provide power to the benefit of denial element 122 and the functional component 120. Accordingly, the set of switches is controlled such that, in the locked state, a first continuous power draw path exists between the secondary power source 132 and the benefit of denial element 122 and, in the unlocked state, this first power draw path is open and, instead, a second continuous power draw path exists between the power source 126 and the benefit of denial element 122 and a third power draw path exists between the power source 126 and the functional component 120. Referring back to the second example, the logic indicates that, in the locked state, the secondary power source 132 is to be selected to provide power to the benefit of denial element 122 only and that, in the unlocked state, the power source 126 is to be selected to provide power to the functional component 120 and the secondary power source 132. Accordingly, the set of switches is controlled such that, in the locked state, a first continuous power draw path exists between the secondary power source 132 and the benefit of denial element 122 and, in the unlocked state, this first power draw path is maintained, a second continuous power draw path exists between the power source 126 and the functional component 120, and a third power draw path exists between the power source 126 and the secondary power source 132.

In addition to or independent of the locked/unlocked state, the logic can control the set of switches to select the relevant power source(s) based on the availability of the power source 126. In particular, the power source 126 can be a removable, rechargeable power source. Accordingly, if the power source 126 is not connected to the electronic device or is connected but not charged (e.g., the amount of battery charge is less than a predefined threshold, such as one percent of the total batter capacity), the logic can control the set of switches, such that power is provided to the benefit denial element 122 from the secondary power source 132. In this illustration, if the electronic device 102 is in an unlocked state, the logic can further control the set of switches, such that power is also provided to the functional component 120 from the secondary power source 132. If the power source 126 is connected to the electronic device and is charged (e.g., the amount of battery charge is greater than the predefined threshold), the logic can control the set of switches, such that power is provided to the benefit denial element 122 from the power source 126. In this illustration, if the electronic device 102 is in an unlocked state, the logic can further control the set of switches, such that power is also provided to the functional component 120 from the power source 126.

As described herein above, the locking and unlocking states of the electronic device 102 can be controlled by the benefit denial element 122 by at least controlling the power flow to the functional component 120. Additional or alternative mechanisms may exist to control the locking and unlocking states. For example, a communication interface can exist between the benefit denial element 122 (e.g., the processor 128 thereof) and the functional component 120 (e.g., a controller or a processor thereof). The locked state is set as the default state if no data is exchanged over the communication interface between the benefit denial element 122 and the functional component 120. The unlocked state is set upon data being exchanged over the communication interface between the benefit denial element 122 and the functional component 120. In this illustration, the data exchange can be performed according to a communication rate. For instance, a heartbeat may be used, where a ping is sent periodically from the benefit denial element 122 to the functional component 120, or vice versa. If the heartbeat is no longer detected (e.g., by the functional component 120 and/or the benefit denial element 122), the locked state is reverted to. Additionally or alternatively, the data can be verifiable. For instance, the data includes a code and this code can change upon each data transmission (e.g., a counter value that is increased). A recipient (e.g., the functional component 120 and/or the benefit denial element 122) verifies the code (e.g., verifies that the counter value is correct). If verified, the unlocked state is maintained. Otherwise, the locked state is reverted to. Of course, the opposite implementation is possible, where the locked state is set if there is data exchanged, and the unlocked state is set if there is no data exchange.

Figure 11:
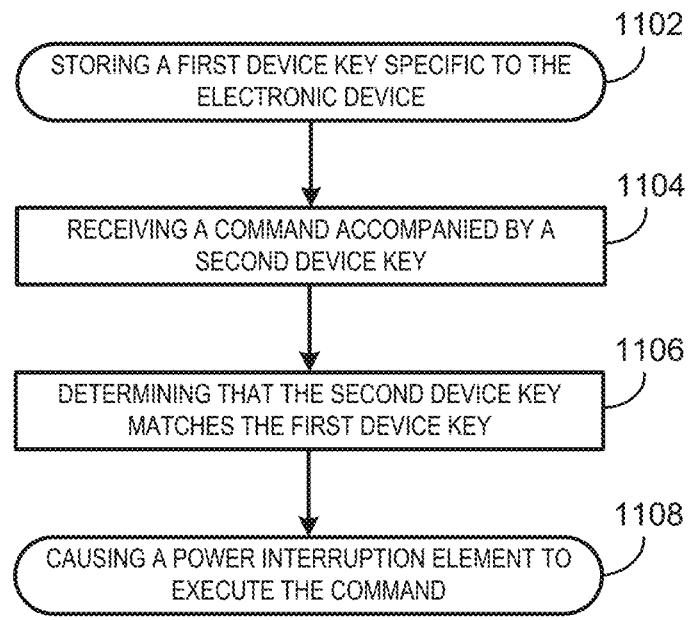
FIG. 11 depicts a flow diagram illustrating a process for selectively denying power to an electronic device in accordance with at least some embodiments.

FIG. 11 depicts a flow diagram illustrating a process for selectively supplying power to an electronic device in accordance with at least some embodiments. In accordance with at least one embodiment, the process 1100 of FIG. 11 may be performed by at least the processor 128 of FIG. 9.

Process 1100 may begin at 1102 with storing a first device key specific to the electronic device 102. The first device key may be stored in a secure memory of the electronic device 102. In some embodiments, the first device key may be stored on the memory 130 of the benefit denial element 122 described above. The first device key may be stored by a manufacturer or may be provided to the secure memory 130 by a retailer when received into inventory. The first device key may likewise be multiple device keys, for example a universal device key may be maintained for a manufacturer key while another device key may be distributed to accompany the electronic device when sent to a retailer for sale.

At 1104, the process 1100 may include receiving a command accompanied by a second device key. The command may include a lock or unlock command and may also include an identifier for the electronic device. The command and second device key may be received via a communication element of the electronic device, such as RFID or other methods described above. The command and second device key may be received as a packet of information from an access device. The packet may be encrypted for security and may also include additional device keys or other authorization data. The command may be conveyed by an access device, such as a POS system or a user device, for example when the electronic device is purchased or sold by a retailer or through a private sale. In some embodiments, the second device key may be received by the electronic device separately from the command(s). For example, the commands may be sent to the electronic device after a communication session is established with the electronic device and after the electronic device receives information, via the established communication session, indicating that the source (e.g., a user device or access device) has access to the second device key and that the second device key matches the first device key. The commands then may be sent separately via this communication session without having to resend the second device key with each command.

At 1104, the conveyance of the second device key with the command or separately from the command may include decrypting encrypted device key(s) or authorization information from an encrypted packet. For example, a packet conveyed to the electronic device may be encrypted and decrypted by the processor of the electronic device based on an enclave or secure portion of a memory including a decryption key, algorithm, or other such information that is stored on the memory of the electronic device and useful by the processor for decrypting the packet received at 1104.

At 1106, the process 1100 may involve determining whether the second device key matches the first device key. This may include comparing the second device key with the first device key. The comparison of the second device key with first device key stored in the secure memory of the benefit denial element 122 ensures the command is deemed valid and executed by the system only when the proper device key is used and authentication granted. This may also involve comparing user information, check data, or other data received in connection with the command against information stored on the secure memory. In some cases the secure memory may be updated based on the information. For example, a second device key may be transmitted that provides proper authentication and may also be included with user information that is subsequently updated on the secure memory. The user information may then be used as additional layers of authentication, for example by prohibiting access to previous users who have retained the device key.

At 1108, the process 1100 may include causing a power interruption element of the electronic device to execute the command. This may include providing or conveying a signal to the benefit denial element 122 and/or the interruption element 134 described above. For example, when the command to unlock the electronic device is issued and authenticated using a device key, the signal may instruct or cause the benefit denial element 122 to enable one or more functions of the electronic device (e.g., by allowing the supply of power through the power interruption element 134 to one or more functional components of the electronic device when the user turns "on" the electronic device or activates its function(s). In some examples this may include completing a circuit, changing the state of a switch, changing a state of a transistor, or redirecting the flow of power through a gateway in addition to the mechanisms described above for the power interruption element 134. Similarly, when the command to lock the electronic device is issued and authenticated using a device key, the signal may instruct or cause the benefit denial element 122 to disable one or more functions of the electronic device (e.g., by preventing the flow of power through the power interruption element 134 from the power supply to one or more functional components of the electronic device.

Embodiments of the disclosure provide for a number of technical advantages over conventional systems. For example, embodiments of the invention can enable owners of an electronic device to lock and unlock that electronic device in a manner which deprives any unauthorized user of the benefit of the electronic device. When such an electronic device is locked, it remains locked until it is unlocked using the secret device key. The result is that devices which are stolen while locked will be virtually worthless to any would-be thief. By reducing the value of the electronic device to a potential thief, the disclosed system discourages theft of electronic devices. In the case that thieves are aware that a particular resource provider locks all electronic devices until a legitimate purchase is made, those thieves are not likely to steal from that particular resource provider.

Additionally, the system enables new functionality to be implemented in existing electronic devices. Workers can lock or unlock their tools upon entering/exiting a job site, which can lead to fewer accidents caused by unintentional tool activations. Owners of a tool can rent out or lend out their tools knowing that the tool will lock upon expiration of the rental period, ensuring that a failure to return the tool will not benefit the lendee. One skilled in the art, after reading this disclosure, would recognize a number of additional benefits gained from the system described herein.

Figure 12:
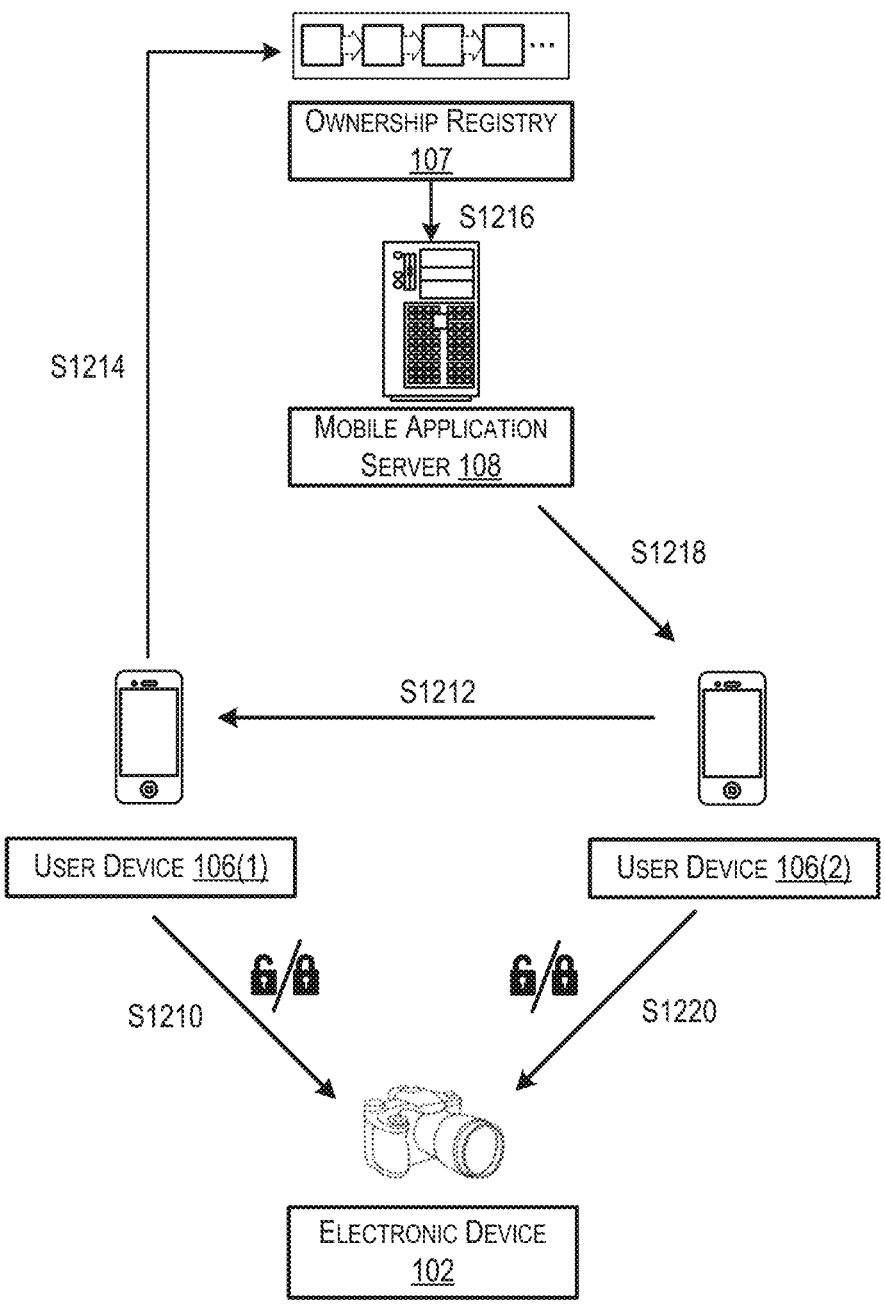
FIG. 12 depicts an illustrative overview of an example system in which a device key capable of being used to issue commands to an electronic device may be transmitted between user devices in accordance with at least some embodiments.

FIG. 12 depicts an illustrative overview of an example system in which a device key capable of being used to issue commands to an electronic device may be transmitted between user devices in accordance with at least some embodiments. In FIG. 12, an electronic device 102 is depicted as communicating with multiple user devices 106. An ownership registry 107 may maintain a record of a current ownership status for the electronic device 102. Each of the user devices 106 (1 and 2) may be associated with different accounts maintained by a mobile application server 108. The mobile application server 108 may maintain a mapping of an identifier for each electronic device 102 to a corresponding device key.

The electronic device 102 may be any suitable device that accomplishes its purpose electronically. The electronic device 102 may have installed within it an electronic circuit which enables it to be locked and/or unlocked, as described herein above. The user device 106 may be any electronic device capable of establishing a communication session with another device and transmitting/receiving data from that device. A user device 106 may include the ability to download and/or execute mobile applications, as described herein above. The mobile application server 108 may be any computing device configured to provide remote support for a user device 106, as described herein above.

In some embodiments, the user device 106 may include a communication interface configured to enable communication between the user device and another electronic device (e.g., mobile application server 108, an electronic device 102, another user device 106, and/or a wireless router that manages access to a network). Examples of a suitable communication interface may include radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. A second example of a suitable communication interface may include an optical input device capable of obtaining graphical input, such as a camera device or a barcode reader. In this second example, the user device 106 may be presented with a machine-readable code, which may be scanned using the optical input device in order to obtain data encoded into the machine-readable code. In some embodiments, the communication interface may include both long-range and short-range communication means. For example, the communication interface may include an antenna configured to connect to a cellular network in order to enable communication with various other components of the depicted architecture.

An ownership registry 107 may be any suitable data store which maintains records related to ownership of an electronic device 102. In some embodiments, the ownership registry 107 may be implemented on a blockchain network, which includes a distributed database that maintains a continuously-growing list of records secured from tampering and revision called a blockchain (or blockchain ww). A blockchain may include a number of blocks of transaction records for a number of users/electronic devices. Each block in the blockchain can also contain a timestamp and a link to a previous block of the blockchain. Stated differently, transaction records in a blockchain may be stored in an ownership registry as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a blockchain network. Any node within the blockchain network may subsequently use the blockchain to verify transactions. A node of the blockchain network may be any computing device which is included within the blockchain network. In some embodiments, a mobile application server 108 may also be a node of the blockchain network.

In some embodiments, a first user device 106(1) may acquire a device key for an electronic device from a retailer (or other resource provider) when the electronic device is initially purchased from the retailer. When a current owner of the electronic device 102 wishes to sell, or otherwise transfer ownership of the electronic device, the device key may be provided to the new owner using techniques described herein. This may involve removing the device key from user device 106(1) and providing the device key to a user device 106(2) associated with the new owner.

By way of illustrating interactions between various components of the system described herein, consider the following scenario. In the illustrated scenario, a first user having user device 106(1) may be capable of using a device key stored locally on user device 106(1) to interact with the electronic device 102 at S1210. This user may wish to transfer an ownership interest in (e.g., sell or give) the electronic device 102 to a second user having a second user device 106(2).

In this example, the first user may obtain information about the second user to be used in the transfer at S1212. For example, the second user may provide an identifier that may be used to uniquely identify an account associated with the second user. In some cases, the second user may also provide a public key (of a public-private cryptographic key pair) associated with the second user. In some cases, the information about the second user may be transmitted via a communication session opened between the first user device 106(1) and the second user device 106(2).

Upon receiving the information about the second user from the user device 106(2), the user device 106(1) may generate a transfer of ownership transaction record. The generated transaction record may be signed using a private key (of a cryptographic key pair) associated with the current owner, and may include an identifier for the electronic device 102 as well as at least a portion of the information associated with the second user. For example, the transaction record may include an identifier for the second user and/or a public key for the second user. As depicted at S1214, this transaction record may be written to an ownership registry 107. However, note that in some embodiments, the transaction record may be provided directly to the mobile application server 108.

Upon receiving the transaction record, and before the transaction record can be written to the ownership registry 107, a computing node of a network which maintains the ownership registry 107 may verify the authenticity of the transaction record as well as that the owner of the user device 106(1) is the current owner of the electronic device 102. To do this, the computing node may verify an electronic signature for the transaction record. To verify the electronic signature, the computing node may perform a cryptographic operation on the signed data and compared the result to an expected data. If the signed data matches the expected data, then the transaction record may be considered verified. This may also verify that the operator of the user device 106(1) is the current owner of the electronic device 102, since that user device 106(1) must be in possession of the private cryptographic key used to create the electronic signature. In some cases, the computing node may identify the latest transaction record stored in the ownership registry related to the electronic device 102. Upon retrieving that transaction record, the computing node may use a public key indicated in that transaction record to verify the current electronic signature. Once the transaction record (and current ownership status) has been verified, the transaction record is added to the ownership registry.

Upon verifying the authenticity and ownership of the transaction record and recording the transaction record to the ownership registry 107, the mobile application server 108 may receive an indication of the transaction at S1216. In some embodiments, the mobile application server 108 may be notified via a notification module which monitors transaction records recorded to the ownership registry 107. In some embodiments, upon receiving an indication of the transfer of ownership, the mobile application server 108 may identify an account associated with each of the user devices 106 as well as a device key associated with the electronic device 102. In some embodiments, this may involve performing a query on a device identifier associated with each of the user devices 106. The mobile application server 108 may then identify contact information for each of the devices stored in relation to the respective accounts. In some embodiments, one or both of the user devices 106 may not be associated with an account maintained by the mobile application server 108. In those embodiments, the mobile application server 108 may identify contact information for the user devices 106 from the transaction record recorded to the ownership registry 107.

Upon identifying the contact information for at least the user device 106(2), the mobile application server 108 may transmit the device key associated with the electronic device 102 to the user device 106(2) at S1218. In some embodiments, the device key may be transmitted to the user device 106(2) via a push notification (e.g., a push update). The device key may be stored in a secure memory of the user device 106(2). In some embodiments, the device key may be encrypted. In these embodiments, the device key may be encrypted by the mobile application server 108 prior to being provided to the user device 106(2) or the device key may be encrypted by the user device 106(2) prior to being stored in memory. Upon receiving the device key, the user device 106(2) may issue commands to the electronic device 102 using the device key at S1220. The electronic device 102 may include circuitry configured to allow compliance with such commands only if the device key associated with the electronic device 102 was received by the user device 106(2).

In some embodiments, the mobile application server 108 may also cause the device key to be removed from the memory of the user device 106(1), preventing it from being able to issue commands to the electronic device 102 in the future or preventing the electronic device 102 from complying with such commands. In some embodiments, this may involve the mobile application server 108 providing instructions to the user device 106(1) which cause the device key associated with the electronic device 102 to be deleted, or otherwise removed, from memory.

In some embodiments, there may be no need to remove the device key from the memory of the user device 106(1) in order to prevent the device key from being used to issue commands to the electronic device 102. For example, in some embodiments, the user device 106(2), upon receiving the device key and upon establishing a communication session with the electronic device 102, may cause the current device key to be replaced with a new device key. It is envisioned that to do this, one may need to be in possession of the current device key. Once the device key has been replaced with a new device key, that new device key may then be transmitted to the mobile application server 108, which may subsequently store the new device key for future reference. By way of a second example, in some embodiments, the mobile application server 108 may, when providing the device key to the user device 106(2), provide an encrypted data packet. This encrypted data packet may include the device key as well as a dynamic data element which can be used to validate the data packet. For example, the mobile application server 108 may compile a data packet which includes the device key along with a counter value (e.g., a value which is incremented or decremented upon each ownership transfer) which is encrypted in a manner such that it can only be decrypted by the electronic device 102. Upon receiving the encrypted data packet with the counter value, the electronic device 102 may verify that the counter value is greater than (or less than) the previously-used counter value and may update a current counter value stored in the electronic device to match that received in the latest encrypted data packet. In this example, only data packets which include a counter value greater than or equal to the currently-stored counter value may be validated when executing a command received with the data packet. By way of a third example, in some embodiments, the mobile application server 108 may generate a new device key and send at S1218 the new device key to the user device 106(2). The new device key can be different from the device key stored in the memory of the user device 106(1). As explained herein above, although various embodiments are described in connection with device keys, the present disclosure is not limited as such and, instead, equivalently applies to any type of unlocking information. Referring back to the second example of the current paragraph, the encrypted data packet represents a type of unlocking information. In this example, because a counter value is updated, the unlocking information is mutable because the encrypted data packet sent to the user device 106(2) includes a counter value that has been updated. Of course other examples exist, whereby unlocking information previously stored in the memory of the user device 106(1) is different from the new unlocking information used by the user device 106(2). As with the second example, the new unlocking information can be generated by the user device 106(2) and/or electronic device 102. As with the first and third examples, the new unlocking information can be also or alternatively generated by the mobile application server 108. In these different examples, the previous unlocking information need not be removed from the memory of the user device 106(1) at least in part because such information may no longer be usable to unlock or lock a function of the electronic device 102.

In some embodiments, the mobile application server 108 may compile a data packet which includes the device key along with an identifier for the user device 106(2). In this example, the electronic device 102 may be associated with its own cryptographic key pair (e.g., a private and public cryptographic key). The mobile application server 108 may then encrypt the data packet using the public cryptographic key associated with the electronic device 102. This would prevent the information in the data packet from being accessed by the user device 106(2) despite the encrypted packet being stored in memory of the user device 106(2) since that information can only be accessed by the electronic device 102 having possession of the private cryptographic key. In these embodiments, the user device 106(2) upon issuing a command to the electronic device 102 at S1220, would provide the encrypted data packet to the electronic device 102 along with the command to be executed. The electronic device 102 would then decrypt the encrypted packet using its private cryptographic key, verify the device key, verify that the device identifier for the user device 106(2) matches the device identifier associated with the user device 106(2) from which the command was issued, and execute the command upon verification. One skilled in the art, after reading this disclosure, would recognize that these embodiments of the system would prevent commands from being issued by user devices which have not been authorized by the mobile application server 108 even if those user devices gain possession of the encrypted data packet that includes the device key.

For clarity, a certain number of components are shown in FIG. 12. It is understood, however, that embodiments of the invention may include more than one of each component. In addition, some embodiments of the invention may include fewer than or greater than all of the components shown in FIG. 12. In addition, the components in FIG. 12 may communicate via any suitable communication medium (including the Internet), using any suitable communication protocol.

Figure 13:
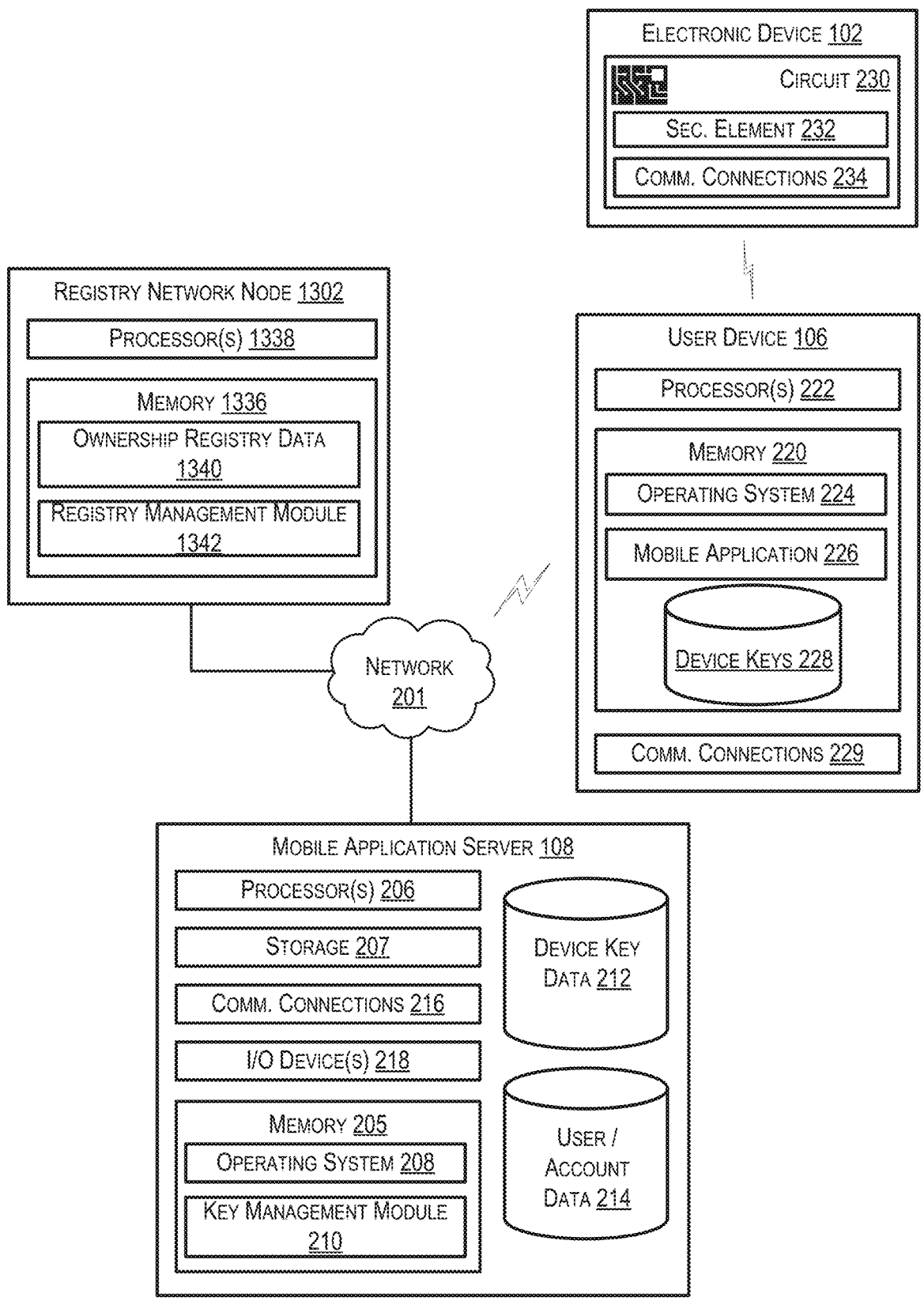
FIG. 13 depicts an example system architecture for a system that may be implemented to perform the functionality described in accordance with at least some embodiments.

FIG. 13 depicts an example system architecture for a system that may be implemented to perform the functionality described in accordance with at least some embodiments. As depicted in FIG. 13, an exemplary architecture may include an electronic device 102, one or more user devices 106, and a mobile application server 108 as described with respect to FIGS. 1 and 12 above. Components of the electronic device 102, one or more user devices 106, and mobile application server 108 are described in FIG. 2. The description of such components is not repeated herein. Additionally, the system may include a number of registry network nodes 1302, which form a registry network. One or more of these components may communicate either directly or over a network 201.

In some embodiments, the key management module 210 may be configured to receive a request for a transfer of ownership rights related to an electronic device 102. In these embodiments, the request may include a device identifier for the electronic device 102 as well as information about an operator of the user device 106. The key management module 210 may identify a current owner of the electronic device 102 as well as contact information for that current owner. The key management module 1310 may then communicate the received request to the current owner via the identified contact information. In some embodiments, the received request may include an offer for purchase and/or payment credentials to be used in completing a transaction. Note that the transfer of ownership rights may pertain to a temporary transfer of ownership rights (e.g., a rental) for the electronic device. Once the request has been received at the user device associated with the current owner, the transfer of ownership rights may be handled as described elsewhere.

In some embodiments, the key management module 210 may additionally identify a cryptographic key and/or dynamic data associated with the electronic device 102. The key management module 210 may be configured to compile a data packet which includes the device key for the electronic device 102 as well as dynamic data. For example, the key management module 210 may identify a current counter value associated with the electronic device 102. Additionally, the key management module 210 may include an identifier for the user device 106 into the data packet. The key management module 210 may then encrypt the data packet using the identified cryptographic key, such that the data packet may only be decrypted by the electronic device 102. The key management module 210 may then provide the encrypted data packet to the user device 106.

In some embodiments, the mobile application 226 may be configured to, in conjunction with a processor 222, facilitate a transfer of ownership of an electronic device to or from an operator of the user device 106. To facilitate a transfer of ownership of the electronic device 102 away from an operator of the user device 106 (e.g., whether a permanent transfer due to a sale of the electronic device 102 or a temporary transfer due to a rental of the electronic device 102), the mobile application 226 may be configured to receive information about the electronic device 102 (e.g., a device identifier) as well as information about the user to which ownership of the electronic device should be transferred. In some embodiments, at least a portion of this information may be manually input (e.g., via a GUI). In some embodiments, at least a portion of this information may be electronically input. For example, the user of the user device 106 may scan a barcode or other machine readable code that includes at least a portion of the information (e.g., a barcode for the electronic device or a barcode presented by the transferee). In some embodiments, the user device 106 may receive information about a transferee from the mobile application server 108 (e.g., upon receiving a request for a transfer of ownership from a potential transferee). Once the mobile application 226 has received the required information, it may complete an ownership transfer transaction. In some embodiments, this may involve generating a transaction record that includes the received information and causing that transaction record to be written to an ownership registry maintained on a registry network. The mobile application 226 may electronically sign the transaction record using a cryptographic key so that the transaction record can be verified. In some embodiments, each mobile application 226 may be associated with a separate pair of cryptographic keys (e.g., private and public cryptographic keys) which may be used to encrypt messages to the mobile application 226 as well as to sign transaction records by the mobile application 226. In some embodiments, the mobile application 226 may be configured to provide the transaction record to the ownership registry upon completion of a financial transaction, for example, upon receiving authorization of a payment transaction from the transferee. In some embodiments, the mobile application 226 may be configured to automatically (e.g., absent any further instruction) delete or otherwise remove a device key for an electronic device from the stored device keys 1328 upon completion of a transfer of ownership of the electronic device 102 away from the operator of the user device 106.

To facilitate a transfer of ownership of the electronic device to an operator of the user device 106 (e.g., whether a permanent transfer due to a purchase of the electronic device 102 by the operator or a temporary transfer due to a rental of the electronic device 102 by the operator), the mobile application 226 may be configured to convey information about the operator of the user device 106 to a user device currently associated with the electronic device 102. In some embodiments, the user device 106 of a user to whom an electronic device 102 will be transferred may detect the electronic device 102 within its vicinity (e.g., via a wireless connection) and such a user may request to purchase or rent the detected electronic device 102. In these embodiments, the mobile application 226 may communicate a request for a transfer of ownership rights (or rental) to the mobile application server 108, which may convey that request to a current owner of the electronic device 102. In some embodiments, the mobile application 226 may provide information to be used in a transfer of ownership for the electronic device directly to a current owner of the electronic device. For example, the mobile application 226 may cause the user device 106 to establish communication with a second user device 106 which is operated by a current owner of the electronic device 102. The mobile application 226 may further cause the user device 106 of the user requesting an ownership transfer to transmit information about the operator of the user device 106 to the second user device via that connection. In a second example, the mobile application 226 may cause the user device 106 of the user requesting an ownership transfer to compile a machine-readable code which includes information about the user, which can then be scanned using an optical reader installed within the second user device. In some embodiments, to facilitate the transfer of ownership of the electronic device 102 to an operator of the user device 106, the mobile application 226 may provide a public cryptographic key associated with an account maintained by an operator of the user device 106 to the second user device, so that the public cryptographic key can be included within a transaction record.

The registry network node 1302 may be any suitable computing system or component within a registry network. A registry network node 1302 may be configured to perform registry update/verification actions in accordance with embodiments described herein. In some embodiments, a registry network may be a blockchain network which includes a distributed environment implemented across number of registry network nodes 1302. In some embodiments, the mobile application server 108 may also be a registry network node. The registry network node 1302 may include a memory 1336 (e.g., a computer-readable storage medium) storing instructions that, when executed by a processor 1338 of the registry network node 1302, enable the registry network node 1302 to perform its intended functions. Turning to the contents of the memory 1336 in more detail, the memory 1336 may include a local copy of ownership registry data 1340 as well as a module for managing registry data (registry management module 1342).

In some embodiments, the registry management module 1342 may be configured to, in conjunction with a processor 1338, update ownership registry data 1340 to include received transaction records. In some embodiments, the registry management module 1342 (or ownership registry 107 or 1502 and/or registry network nodes 1608) may receive a transaction record from a manufacturer or supplier of the electronic device 102 indicating that ownership of the electronic device 102 has been transferred to a particular reseller of the electronic device 102 (e.g., a retailer). The registry management module 1342 (or ownership registry 107 or 1502 and/or registry network nodes 1608) may later receive a transaction record from the reseller (e.g., from a mobile application server 108 or 1606) indicating that the electronic device 102 was purchased by a customer of the reseller (e.g., during any of the previously described processes for purchasing and/or activating the electronic device 102). With this information, the ownership registry data 1340 (or ownership registry 107 or 1502 and/or registry network nodes 1608) can be updated to contain a record of these purchases (or other transfers, such as gift) so that the ownership registry data 1340 contains a "chain-of-title" record for the electronic device 102. During subsequent attempts to transfer ownership of the electronic device 102, a proposed new owner can query the ownership registry data 1340 (or ownership registry 107 or 1502 and/or registry network nodes 1608), for example using his or her electronic device 106 (or otherwise), to determine whether there is a break in the chain-of-title from the manufacturer/supplier to the person purporting to transfer ownership. A break in the chain-of-title serves as a warning that the electronic device 102 might have been stolen or is not authentic. To effectuate a query of the ownership registry data 1340, each electronic device 102 can be made to carry query information and/or an electronic device 102 identifier (e.g., a barcode, a QR code, or other information that can be read by a user device 106, e.g., wirelessly via BLUETOOTH, BLE, RFID technology or otherwise) that uniquely identifies the electronic device 102 and, when read by a user device 106, causes the user device 106 to initiate a query of the ownership registry data 1340 (or ownership registry 107 or 1502 and/or registry network nodes 1608) to determine whether the electronic device 102 is authentic or stolen (e.g., based on a break in the chain-of-title). In some embodiments, the mobile application server 108 or 1606 can be configured to receive reports from the retailer or other party that a particular electronic device 102 was stolen and communicate the stolen status of the electronic device 102 to the ownership registry 107 or 1502 and/or registry network nodes 1302 or 1608 so that the stolen status can be communicated to a proposed new owner (e.g., via his or her user device 106) in response to a query of the ownership registry 107 or 1502 and/or registry network nodes 1302 or 1608. For each transfer of ownership, the ownership registry 107 or 1502 and/or registry network nodes 1302 or 1608 can be updated with metadata that includes seller and buyer information (which can be anonymized if either party is a person, for privacy reasons), a product UPC, a product serial number, and or a time stamp for each transfer of an electronic device 102. The chain-of-title information also can be queried by retailers, when someone tries to return an item, to determine whether the retailer (and not another retailer) actually sold the item in the past. In some embodiments, the registry management module 1342 may receive a transaction record from a user device 106 that includes at least an electronic device identifier. The registry management module 1342 may, upon receiving that transaction record, verify that the originator of the transaction record is the current owner of the electronic device. This may involve identifying the latest transaction record currently in the ownership registry data 1340 and determining whether the information included within that transaction record matches information for the originator of the transaction record. In some embodiments, the received transaction record may include an electronic signature which includes data within the transaction record which has been obfuscated using a private key associated with the originator of the transaction record. To verify such an ownership registry, the registry management module 1342 may identify a public key associated with the originator of the transaction record and use it to restore the data within the transaction record. If the restored data matches the data within the transaction record, then it typically serves as evidence that the signer (e.g., the originator of the transaction record) is in possession of the private cryptographic key. In some embodiments, the registry management module 1342 may identify a public cryptographic key associated with the current owner from the latest transaction record currently in the ownership registry data 1340 and may use that public cryptographic key to verify the electronic signature. In these embodiments, a transaction record written to the ownership registry data 1340 may include a public cryptographic key associated with the intended transferee.

Additionally, the registry management module 1342 may be configured to provide a notification to a mobile application server 108 upon the successful addition of a transaction record to the ownership registry data 1340. In some cases, ownership registry data 1340 may generally pertain to ownership of electronic devices that span multiple mobile application servers 108. For example, an ownership registry may be manufacturer-specific (e.g., maintained for electronic devices manufactured by a particular manufacturer) and a number of mobile application servers 108 may each be associated with a different retailer that sells the electronic devices. In embodiments in which multiple mobile application servers are associated with the ownership registry data 1340, the registry management module 1342 may be configured to identify the mobile application server 108 associated with a particular electronic device 102. In some cases, the mobile application server 108 may be identified from a latest transaction record for an electronic device as being associated with (e.g., maintaining an account for) a current owner of the electronic device. Upon identifying an appropriate mobile application server 108 for a successfully added transaction record, the registry management module 1342 may be configured to provide a notification to that mobile application server 108 related to that transaction record.

Figure 14B:
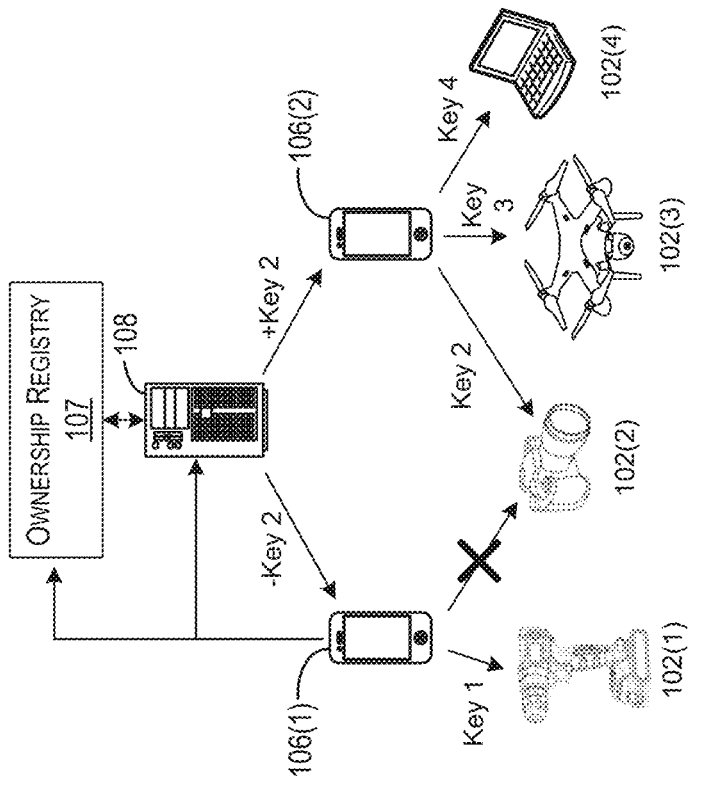
FIG. 14B depicts a state during and subsequent to the transfer of command execution authority for an electronic device.
Figure 14A:
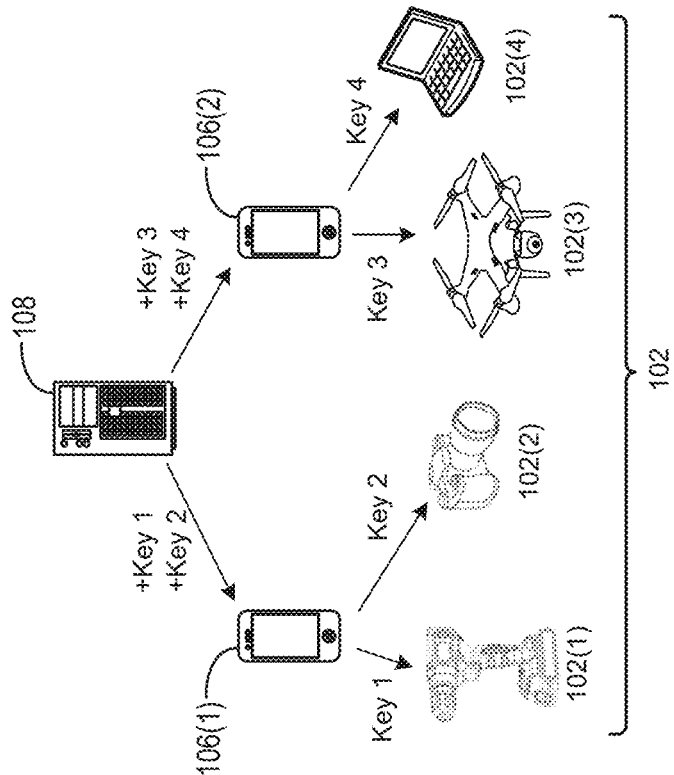
FIG. 14A depicts a state prior to the transfer of command execution authority for an electronic device.

An illustrative example in which command execution authority for an electronic device is transferred between accounts in accordance with at least some embodiments is depicted in two phases. FIG. 14A depicts a state prior to the transfer of command execution authority for an electronic device. FIG. 14B depicts a state during and subsequent to the transfer of command execution authority for an electronic device. In each of these respective states, a mobile application server 108 is depicted in communication with multiple user devices 106 (e.g., user devices 106(1-2)). The multiple user devices 106 are further depicted as being in communication with a number of electronic devices 102 (e.g., electronic devices 102(1-4)).

As depicted at 14A, the mobile application server 108 may provide device keys to each user device 106 based on which electronic devices are associated with that user device. For example, upon determining that the operator of the user device 106(1) is the current owner of both electronic device 102(1) and electronic device 102(2), the mobile application server 108 may provide corresponding device key 1 (key 1) and device key 2 (key 2) to the user device 106(1). Likewise, upon determining that the operator of the user device 106(2) is the current owner of both electronic device 102(3) and electronic device 102(4), the mobile application server 108 may provide corresponding device key 3 (key 3) and device key 4 (key 4) to the user device 106(2). Each user device 106 may store the respective keys within a mapping to a device identifier for a respective electronic device.

Each of the user devices 106 may be capable of detecting, and receiving an electronic device identifier from, each of the electronic devices 102. In some embodiments, each user device may automatically detect electronic devices 102 that are within a wireless communication range of the respective user device 106. However, regardless of whether the user device 106 is able to detect or communicate with each electronic device 102, that electronic device may be configured to only execute commands that: (1) include a valid device key or (2) are confirmed by the electronic device to have been sent by a user device 106 that has a valid device key. Accordingly, each user device 106 is only able to issue commands to an electronic device 102 for which it maintains a corresponding device key. Hence, in the depicted example, command execution authority for an electronic device is only available to a user device associated with a current owner of the respective electronic device.

As depicted at 14B, a user device 106(1) may transfer its command execution authority for an electronic device 102(2) to a second user device 106(2). As described elsewhere, this may involve communicating with either the mobile application server 108 or an ownership registry network 106. In embodiments in which the user device 106(1) communicates with the mobile application server 108, the mobile application server 108 may generate a transaction record which it may provide to the ownership registry network to be appended to a current ownership registry. In embodiments in which the user device 106(1) communicates with the ownership registry network 106, the user device 106(1) may generate a transaction record which it may provide to the ownership registry network 106 to be appended to a current ownership registry. The ownership registry network 106 may subsequently notify the mobile application server 108 of the transfer. As noted elsewhere, the transaction record may include a number of details related to the transferee (i.e., the user to whom command execution authority is being transferred) as well as an electronic signature. The electronic signature may be generated by the user device 106(1) using a private key associated with the user device 106(1) or it may be generated by the mobile application server 108 using a private key associated with the mobile application server 108 depending on which entity created the transaction record.

Once a transfer of command execution authority for an electronic device 102(2) to a second user device 106(2) has been completed, the mobile application server 108 may provide the device key corresponding to electronic device 102(2) (key 2) to the user device 106(2). In some embodiments, the mobile application server 108 may transmit instructions to the user device 106(1) which cause key 2 to be deleted from memory of the user device 106(1). In some cases, key 2 may be removed automatically from memory of the user device 106(1) upon completion of the transfer of command execution authority for the electronic device 102(2). In this way, user device 106(2) may be made capable of issuing commands to electronic device 102(2) and user device 106(2) may be made incapable of issuing commands to electronic device 102(2). In some embodiments, upon completion of the transfer of command execution authority for the electronic device 102(2), the user device 106(2) may cause key 2 to be replaced or changed within the memory of the electronic device 102(2).

Figure 15:
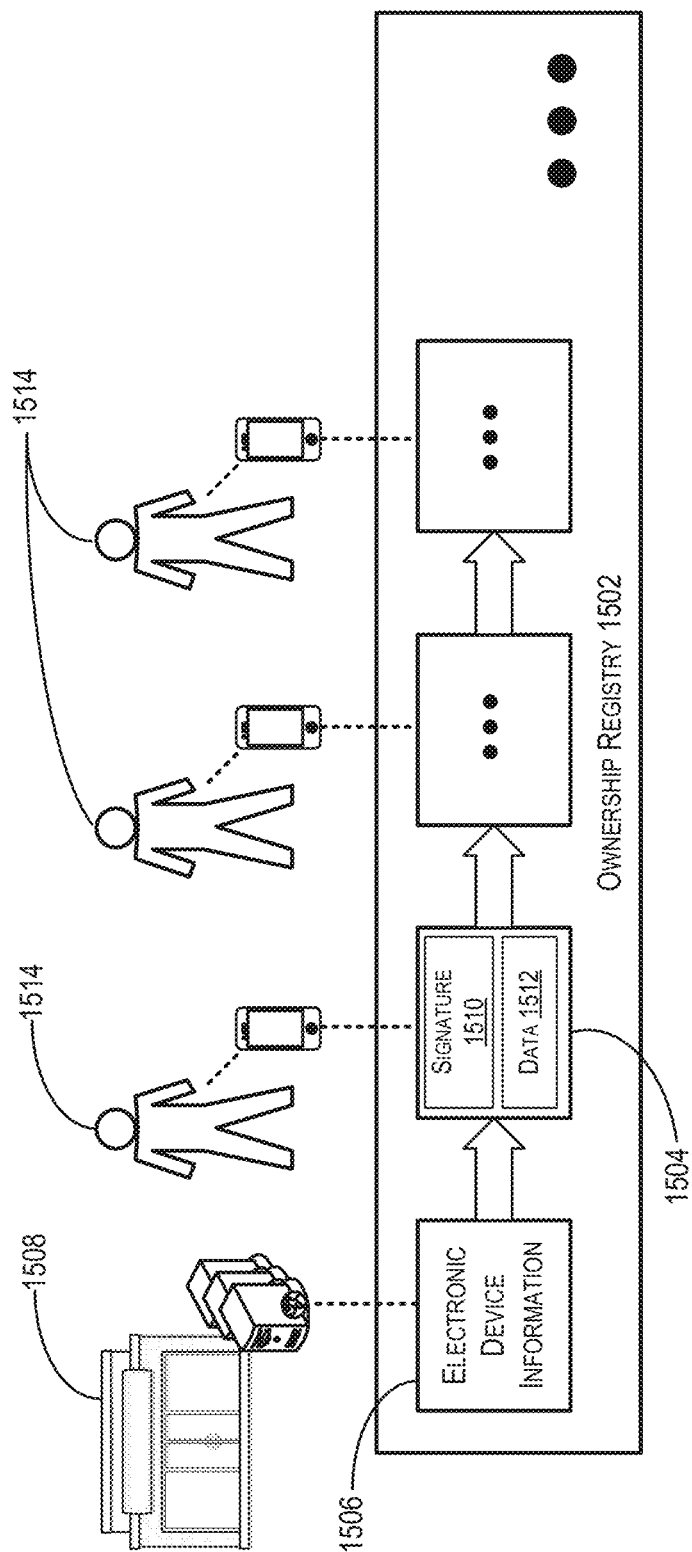
FIG. 15 depicts an example ownership registry that may be implemented in relation to an electronic device in accordance with at least some embodiments of the disclosure.

FIG. 15 depicts an example ownership registry that may be implemented in relation to an electronic device in accordance with at least some embodiments of the disclosure. In FIG. 15, an ownership registry 1502, may comprise a record of transaction records 1504 related to a particular item (e.g., an electronic device) which is distributed across a blockchain network. In some embodiments, the ownership registry 1502 may comprise a blockchain ledger, in which a number of transaction records related to various item transactions are processed in a "block," the record of which is then distributed to a number of computing nodes of the blockchain network.

As described above, a number of transaction records 1504 may be associated with an ownership registry 1502. The ownership registry 1502 may include electronic device information 1506, which may be formatted as having at least an electronic device identifier. In some embodiments, the electronic device identifier may be generated using electronic device information provided via a user device (e.g., one of the user devices 106 described herein) or during an electronic device enrollment process. In some embodiments, the electronic device identifier may be generated according to a specified format using information related to the electronic device (e.g., one of the electronic devices 102 described herein). For example, the electronic device identifier may be generated as some combination of item type and serial number. In some embodiments, the electronic device information 1506 included within the ownership registry 1502 may be generated by a resource provider 1508 that initially supplies, distributes, or sells (e.g., at retail) the electronic device (e.g., a merchant or manufacturer).

As users conduct transactions (e.g., purchases and/or rentals) with respect to various electronic devices, user devices associated with those users may generate requests and transmit them to the ownership registry network to be added to the ownership registry. Upon verification of a new transaction record, that new transaction record may be generated and appended to the ownership registry 1502. In some embodiments, each transaction record appended to the ownership registry 1502 may include an electronic signature 1510 that may be used to verify the authenticity of the transaction record. The transaction record 1504 may also include transaction data 1512. In some embodiments, the transaction data 1512 included in a transaction record 1504 may include information related to the transaction conducted, the user/users conducting the transaction, contact information for a user, a public cryptographic key associated with a user, or any other suitable information. In some embodiments, the electronic signature 1510 may include a portion of the data 1512 which has been obfuscated using a private cryptographic key associated with a user.

As transactions are conducted with respect to the ownership registry 1502, a transaction record is generated for that transaction and appended to the ownership registry, such that the ownership registry may constitute an unalterable history of the ownership interests for a number of electronic devices (e.g., permanent ownership interests such as in the case of purchases, or temporary ownership interests such as in the case of rentals). In some embodiments, the transaction record may be generated and signed by a user 1514 and provided to an ownership registry network node, which adds the transaction record to the ownership registry 1502. In some embodiments, transaction records may be generated by, and signed by, a mobile application server on behalf of users 1514. For example, in some embodiments of the system described herein, a first user may provide an indication that an ownership interest in an electronic device currently associated with his or her account should be conveyed to a second user. In this example, the mobile application server may, upon authenticating the first and second users (e.g., via login credentials) generate a transaction record to be appended to the ownership registry 1502.

As previously noted, each transaction record may be signed using a private key to create a signature 1510 for the transaction record. In some embodiments, the transaction record may be signed by a mobile application server or a registry network node of the ownership registry network using a private key associated with the mobile application server or ownership registry network. In this way, the transaction record may be verified using a public key associated with the mobile application server or ownership registry network. In some embodiments, a transaction record may be signed by one of the parties 1514 to a transaction (e.g., the current owner) using a private key associated with that party. In this way, the public key associated with the party may be obtained (e.g., from a repository of public keys or from a latest transaction record associated with the electronic device at issue) and used to verify the authenticity of the transaction record.

In embodiments, a transaction includes a rental of an electronic device (or a plurality of such devices). A proof of stake protocol (PoS) can be used for a transaction record in a PoS blockchain ledger. In PoS blockchains, a transaction can be algorithmically verified with computer hardware based on a token that is staked (or locked up via cryptographic keys and/or information verifiable as being authentic) in the network as a form of collateral for the transaction. The collateral can include a deposit for the rental in the form of a payment instrument and a deposit value to be applied to the payment instrument. In this way, a tool rental program can be provided, where this program leverages the disclosed blockchain functionality. A tool rental facility holds electronic devices that are disabled. Via a user device 106, a customer can select one or more of the electronic devices to rent, and pay a deposit for the rental. The deposit is then staked in the block-chain ledger. Thereafter, the user device 106 receives the device key (or, more generally, unlocking information) that allows the electronic device to be activated via the customer's user device 106. The device key (or, more generally, the unlocking information) can be sent from a mobile application server 108 upon an update by an ownership registry 107 to the blockchain ledger, where the update uses the PoS protocol. The stake can be released when the electronic device is brought back to the tool rental facility in a proper condition (e.g., a condition that justifies release of the deposit value). The release can involve the ownership registry 107 updating the blockchain ledger about the return of the electronic device and/or end of the rental. In addition, the release may, but need not, involve the mobile application server 108 instructing the customer's user device 106 and/or the electronic device to remove the device key (or, more generally the unlocking information) or instructing the electronic device to use a new device key (or, more generally new unlocking information). In embodiments where the unlocking information is automatically mutable, no such instructions of the mobile application server 108 may be needed. For example, and as described herein, the unlocking information can include an expiration date/time. Upon the lapse of the expiration date/time, the unlocking information may no longer be usable to operate the electronic device and, hence, the electronic device may automatically deactivated.

Figure 16:
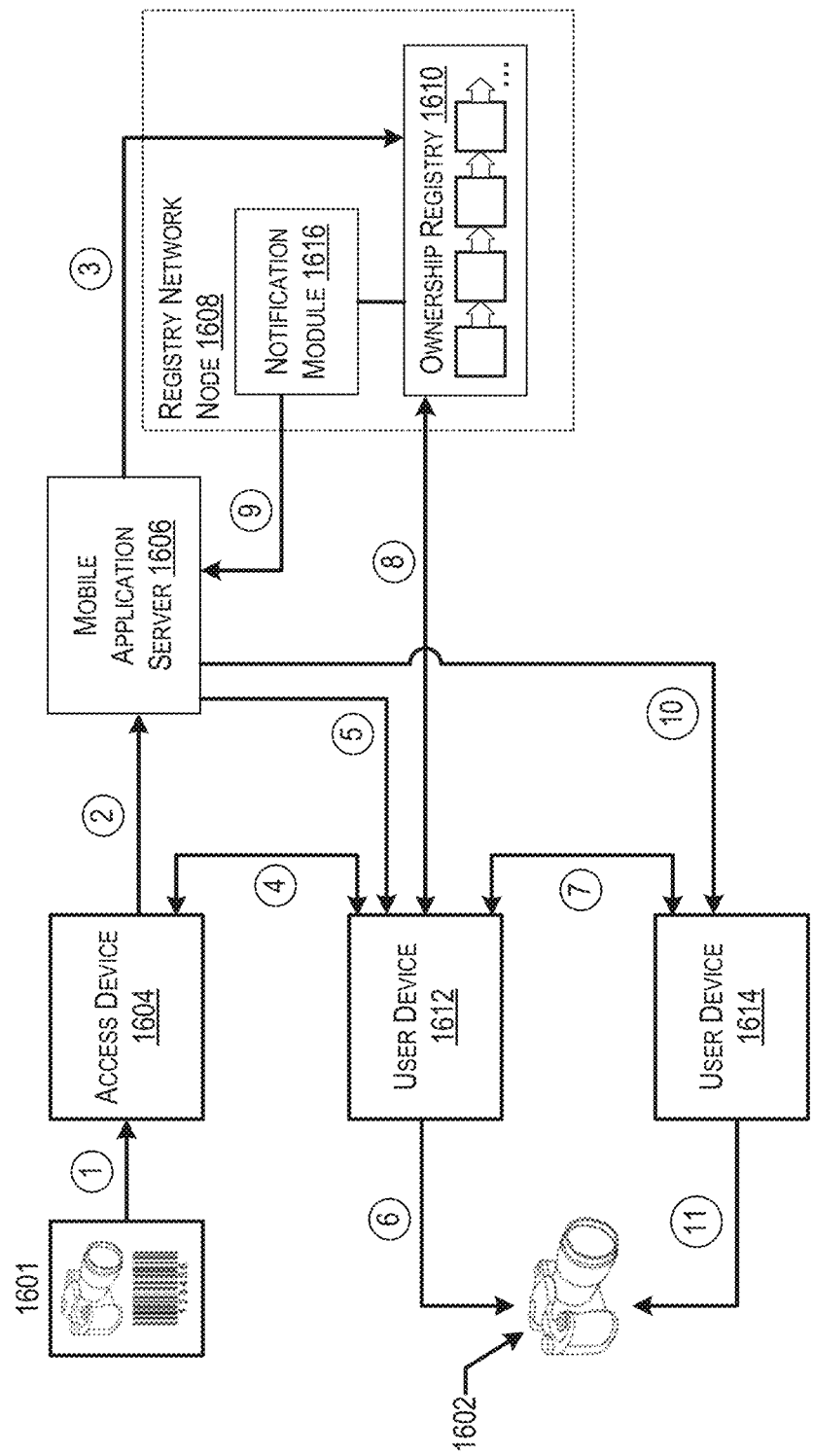
FIG. 16 depicts a process for transferring a device key between accounts in accordance with at least some embodiments.

FIG. 16 depicts a process for transferring a device key between accounts in accordance with at least some embodiments. Some or all of the process 1600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 1600 of FIG. 16 may be performed by at least some of the components described in relation to FIG. 13. The code may be stored on a computer-readable storage medium, for example, in the form of a computer program including a plurality of instructions executable by one or more processors. The computer-readable storage medium may be non-transitory.

As depicted in step 1, the process 1600 may involve receiving (e.g., via electronic, magnetic, or optical scanning) an indication 1601 (e.g., a serial number, UPC code, device identifier, bar code, QR code and/or image information) of an electronic device 1602 at an access device 1604. For example, a user may present an electronic device 1602 for purchase at the access device 1604 (e.g., a point-of-sale (POS) device), and the access device 1604 may determine (via scanning or otherwise) from the indication 1601 which electronic device 1602 is being purchased. The access device 1604, upon receiving the indication 1601 of the electronic device 1602 may conduct a transaction in relation to the electronic device 1602 to transfer an ownership interest in the electronic device 1602 to the user.

Upon completing the transaction to transfer an ownership interest in the electronic device 1602 to the user, the access device 1604 may convey an indication of that transaction to a mobile application server 1606 at step 2. In some embodiments, the access device 1604 may provide a device identifier for the electronic device 1602 as well as information related to the purchaser of the electronic device 1602. The mobile application server 1606, upon receiving this information, may identify a device key associated with the electronic device. In some embodiments, the mobile application server 1606 may provide the device key to the access device 1604 or another user device in vicinity of the access device 1604. In these embodiments, the access device 1604 may be configured to establish a connection with the electronic device 1602 to unlock it using the provided device key.

As depicted at step 3, the mobile application server 1606 may cause a registry network node 1608 to append a transaction record to an ownership registry 1610 indicating the transfer of ownership in the electronic device 1602. In some embodiments, the mobile application server 1606 may create an initial transaction record for the electronic device 1602. In these embodiments, the existence of such a transaction record may be indicative of a valid sale of the electronic device.

A user device 1612 associated with the purchaser of the electronic device may then be provided with a device key associated with the electronic device 1602. In some embodiments, as depicted at step 4, the device key may be provided to the user device 1612 by the access device 1604. For example, the device key may be encoded within a machine-readable code which is printed on a receipt by the access device 1604. In some embodiments, as depicted at step 5, the device key may be provided to the user device 1612 by the mobile application server 1606. For example, the access device 1604 may provide information about the purchaser of the electronic device 1602 to the mobile application server 1606. The mobile application server 1606 may then identify an account associated with the user based on the provided information. The mobile application server 1606 may then provide the device key to the user device 1612 via contact information stored in relation to the identified account. Upon receiving the device key, the user device 1612 is able to provide commands to the electronic device 1602 using the device key at step 6.

Process 1600 may continue when the user associated with user device 1612 decides to transfer to a second user his or her ability to issue commands to the electronic device 1602. In some embodiments, the current user may collect information about the second user to be used in the transaction. This may involve an interaction at step 7 between the user device 1612 and a second user device 1614 operated by the second user in which information about the second user is obtained by the user device 1612.

As depicted at step 8, the user device 1612 may cause a new transaction record to be appended to the ownership registry 1610 at step 8. In some embodiments, the transaction record may include an indication of the second user (and potentially a public cryptographic key associated with the second user). The transaction record may also include an electronic signature of the user associated with the user device 1612 which can be used to verify the authenticity of the transaction record. In some embodiments, upon receiving the transaction record, the registry network node 1608 may append the transaction record to the ownership registry upon verifying its authenticity.

Once the ownership registry 1610 has been updated to include the new transaction record, a notification module 1616 which monitors the ownership registry may notify the mobile application server 1606 of the transaction at step 9. The mobile application server 1606, upon being notified of the new transaction, may identify an account associated with the second user, and subsequently a user device 1614 associated with that account. The mobile application server 1606 may then provide the device key associated with the electronic device 1602 to the user device 1614 at step 10. Upon receiving the device key, the user device 1614 is able to provide commands to the electronic device 1602 using the device key at step 11.

Figure 17:
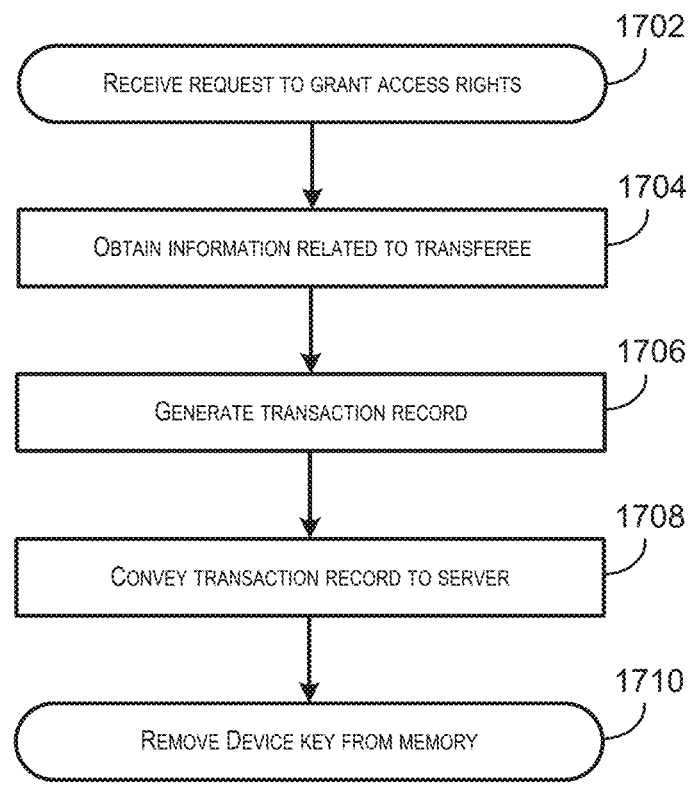
FIG. 17 depicts a flow diagram illustrating a process for granting access rights for an electronic device from a first user device to a second user device in accordance with at least some embodiments.

FIG. 17 depicts a flow diagram illustrating a process for granting access rights for an electronic device from a first user device to a second user device in accordance with at least some embodiments. The process 1700 of FIG. 17 may be performed by at least the user device 106 described with respect to FIG. 13. More particularly, process 1700 of FIG. 17 is depicted as being performed by a user device currently associated with the electronic device.

Process 1700 may begin at 1702 when a request is received at a first user device (e.g., a transferor user device) to grant access rights to an electronic device which is currently associated with the first user device.

At 1704, the process 1700 may involve obtaining information related to a second user (e.g., a transferee). The information related to the second user may include at least an identifier for the second user. In some embodiments, the information related to the second user may include a public cryptographic key associated with that second user or associated with an account maintained in relation to that second user. In some embodiments, the information associated with the second user may be received via manual input through a graphical user interface executed on the user device. In some embodiments, the information associated with the second user may be received from the second user device. For example, the information associated with the second user may be encoded within a machine-readable code by the second user device and may be received upon the user device scanning the machine-readable code. In a second example, the information associated with the second user may be transmitted from the second user device to the first user device using a wireless communication protocol.

At 1706, the process 1700 may involve generating a transaction record. In some embodiments, the transaction record may include at least a portion of the information related to the second user. In some embodiments, the transaction record may include at least an electronic signature generated using a private cryptographic key associated with the first user.

At 1708, the process 1700 may involve conveying the transaction record to a server. In some embodiments, the server may be a registry network node including a distributed database. In at least some of these embodiments the transaction record may be appended to a series of transaction records which represents an ownership registry. Such a series of transaction records may be a blockchain ledger. In some embodiments, the server may be a mobile application server which maintains accounts for a plurality of users. The second user device may be identified by virtue of being associated with an account maintained by a mobile application server in relation to the second user. In at least some of these embodiments, the mobile application server may record the transaction record within an ownership registry.

Prior to adding the transaction record to an ownership registry, the server may be caused to verify the transaction record. This may involve verifying that the first user device has authority to grant access rights for the electronic device as well as verifying the electronic signature. Verifying that the first user device has authority to grant access rights for the electronic device may involve determining that the operator of the first user device is a current owner of the electronic device. This may further involve identifying the latest transaction record in the ownership registry related to the electronic device and determining that it involves a transfer of ownership to the operator of the first user device. Verifying the electronic signature comprises applying a public cryptographic key associated with the first user to the electronic signature and comparing the result to the information associated with the second user included in the transaction record.

Upon verification of the transaction record, a device key associated with the electronic device may be caused to be provided to a second user device associated with the second user. The device key grants the access rights for the electronic device for the second user device.

At 1710, the process 1700 may optionally involve automatically removing the device key associated with the electronic device from a memory of the first user device. In some embodiments, this may be done upon receiving an indication that the transaction record has been successfully verified.

Figure 18:
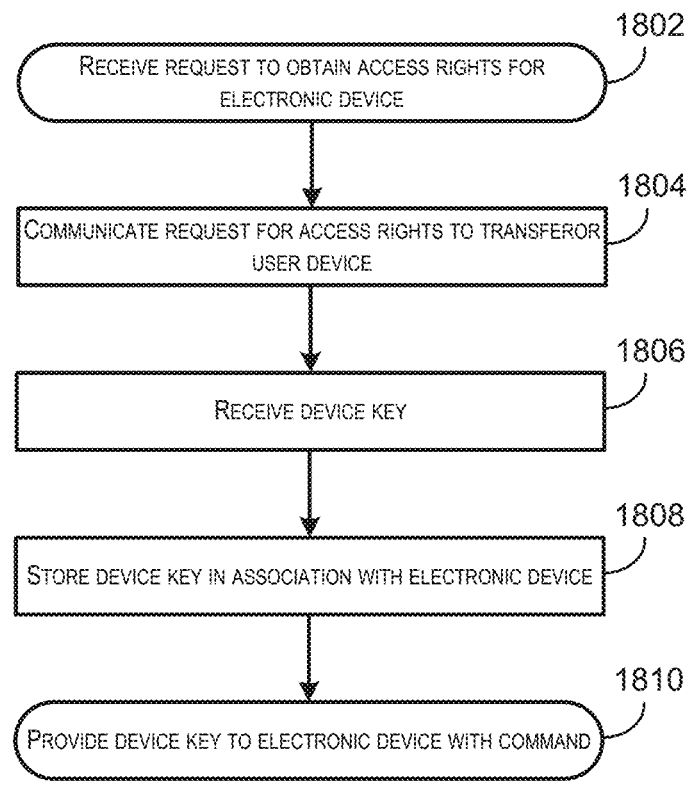
FIG. 18 depicts a flow diagram illustrating a process for obtaining access rights for an electronic device at a first user device from a second user device in accordance with at least some embodiments.

FIG. 18 depicts a flow diagram illustrating a process 1800 for obtaining access rights for an electronic device at a first user device from a second user device in accordance with at least some embodiments. The process 1800 of FIG. 18 may be performed by at least the user device 106 described with respect to FIG. 13. More particularly, process 1800 of FIG. 18 is depicted as being performed by a user device which seeks to obtain access rights for the electronic device.

Process 1800 may begin at 1802 when a request is received at a transferee user device to obtain access rights for an electronic device. In some embodiments, the request may be received from a user of the user device via a graphical user interface. For example, upon entering wireless communication range of an electronic device, the transferee user device may detect the electronic device. The user may be made capable of selecting an option to purchase or rent the electronic device via a graphical user interface executed on the transferee user device and a request to purchase or rent may be received by the transferee user device upon a user making such a selection.

At 1804, the process 1800 may involve communicating a request for access rights to a transferor user device. In some embodiments, the request is communicated directly between the transferee user device and the transferor user device. In some embodiments, the request is communicated first by the transferee user device to a mobile application server, and the mobile application server then forwards the request to the transferor user device upon identifying the transferor user device as being currently associated with the electronic device.

At 1806, the process 1800 may involve receiving a device key associated with the electronic device. In some embodiments, the device key may be included within an encrypted packet of data, the encrypted packet of data being accessible by the electronic device. In other words, the transferee user device may be prevented from accessing the device key stored in the encrypted packet. In some embodiments, the encrypted packet of data may include at least one dynamic data element. For example, the at least one dynamic data element may be a counter value which is increased or decreased with each grant of access rights. In this example, commands accompanied by an encrypted packet that include a counter value less than or greater than a current counter value stored in the electronic device may not be executed even if the encrypted packet includes a valid device key. In another example, the at least one dynamic data element may include a device identifier for the transferee user device. In this example, commands issued by a user device whose identifier does not match the device identifier for the transferee user device may not be executed even if the encrypted packet includes a valid device key.

At 1808, the process 1800 may involve storing the received device key in local memory. In some embodiments, the user device may have stored in local memory a number of different device keys, with each device key mapped to a corresponding electronic device (e.g., via an electronic device identifier).

At 1810, the process 1800 may involve, upon receiving instructions to issue a command to the electronic device, providing the command to the electronic device after confirming to the electronic device that the user device has the corresponding device key, or by providing the corresponding device key along with the command. As described elsewhere, the device key may be provided to the electronic device within an encrypted packet which can be decrypted by the electronic device using a cryptographic key stored in memory of the electronic device.

Embodiments of the disclosure provide for a number of technical advantages over conventional systems. In particular, embodiments of the described system enable access rights for an electronic device (enabled via a device key) to be transferred between accounts automatically and with minimal effort on behalf of either the transferor or the transferee. Additionally, each party to the transaction is able to remain relatively anonymous to the other party while ensuring that the transfer of access rights can be conducted in a secure manner. The system also ensures that access rights are granted quickly and without the risk that a user will fail to provide those access rights. Additionally, some embodiments also prevent a previous owner from keeping access rights to the electronic device after having sold the electronic device, which can also prevent the previous owner from effectively re-selling the previous sold electronic device to another party. The system provides a clear chain of title that can be used to verify both current ownership and that an electronic device has not been unlawfully obtained.

Furthermore, in some embodiments of the system described herein, a transfer of access rights to an electronic device between users can occur without those two users needing to meet up. For example, a user in the vicinity of the electronic device may detect the electronic device via a short-range communication protocol in his or her user device. Upon detecting the presence of such an electronic device, the user may decide to initiate a purchase or rental of the electronic device by submitting a request to a remote server. The remote server can then forward the request to the current owner of the electronic device and that user can grant or deny the request without ever needing to meet with the requestor.

Figure 19:
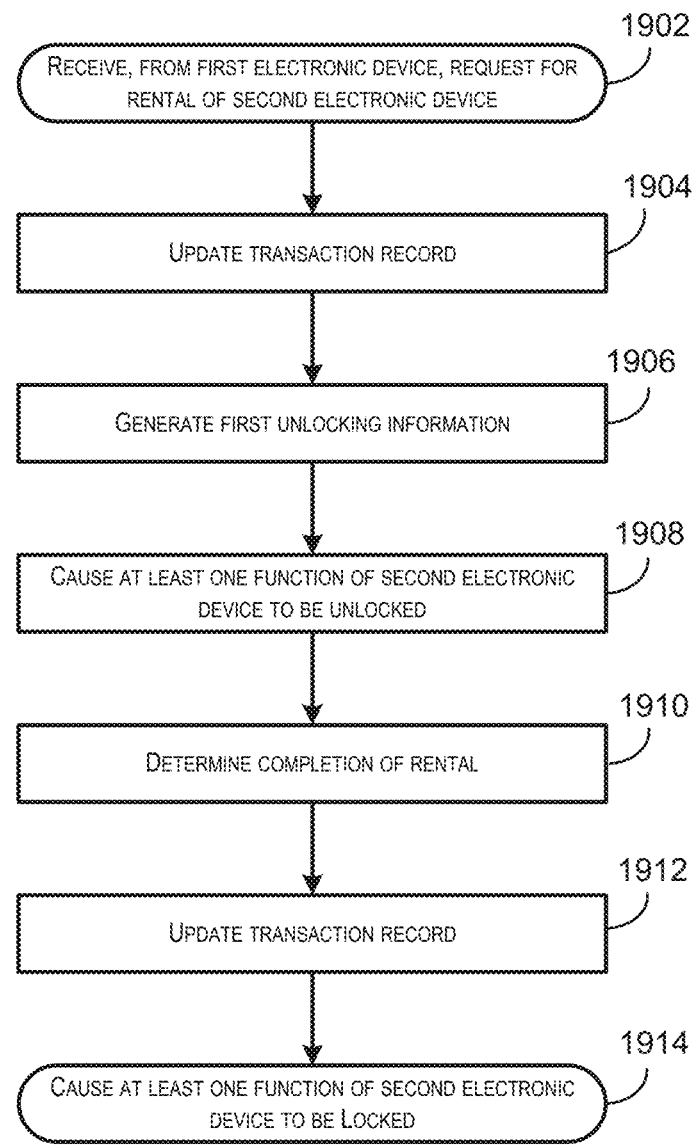
FIG. 19 depicts a flow diagram illustrating a process for an electronic device rental in accordance with at least some embodiments.

FIG. 19 depicts a flow diagram illustrating a process 1900 for an electronic device rental in accordance with at least some embodiments. The process 1900 of FIG. 19 may be performed by at least a system that includes a mobile application server 108 and a registry network node 1302 as described with respect to FIG. 13. More particularly, process 1900 of FIG. 19 is depicted as being performed to manage access rights related to a rental of an electronic device.

Process 1900 may begin at 1902 when a request is received, from a first electronic device, for a rental of a second electronic device when at least one function of the second electronic device is in a located locked state. In some embodiments, the first electronic device is a user device 106 operated by a user to request the rental. An example of how this request can be placed via a graphical user interface of the user device 104 is illustrated in FIG. 7.

At 1904, the process 1900 may update a transaction record to include information related to a rental transaction. In some embodiments, access rights of the first electronic device are verified and a blockchain ledger is updated to include the information about the access rights, the second electronic device, the rental, the first electronic device, and/or the user of the first electronic device. Payment information, including a deposit that identifies a payment instrument and a deposit value to be applied to the payment instrument, can also be received and included in the blockchain ledger. In an example, a PoS protocol is used to stake the deposit.

At 1906, the process 1900 may generate first unlocking information based on the request and on information associated with the second electronic device. In some embodiments, based on information about the second electronic device (e.g., a UPC, an extended UPC, and/or a serial number) and information about the rental (e.g., rental date and time), the mobile application server 108 may determine and/or generate a device key (which on its own can be mutable) and/or a dynamic data element (which on its own can also be mutable, such as a rental date and time). The first unlocking information may include the device key and/or the dynamic data element. The mobile application server 108 may also encrypt the first unlocking information with a public encryption key of the second electronic device.

At 1908, the process 1900 may cause the at least one function to be unlocked by at least sending the first unlocking information to the first electronic device. The at least one function is unlocked if the first unlocking information corresponds to and second unlocking information determined by the second electronic device. In some embodiments, the mobile application server 108 sends the first unlocking information to only the first electronic device. In turn, the first electronic device sends this first unlocking information to the second electronic device. In response, the second electronic device determines from its memory and/or generates on-the-fly the second unlocking information for comparison to the first unlocking information to determine the correspondence. Upon determining the correspondence, the second electronic device can be unlocked. In other embodiments, the mobile application server 108 sends the first unlocking information to the first electronic device and the second electronic device. The second electronic device stores the received information as the second unlocking information. The first electronic device sends its received first unlocking information to the second electronic device that then compares it with the stored second unlocking information to determine the correspondence.

At 1910, the process 1900 may determine a completion of the rental. In some embodiments, the user can send, by operating the first electronic device, a request indicating that the rental has ended and that the second electronic device has been returned. The mobile server application 108 may receive this request and, among other things, trigger the registry network node 202 to update the transaction record.

At 1912, the process 1900 may update the transaction record. In some embodiments, the registry network node may update the blockchain ledger to indicate that the user no longer has access rights. The update may also indicate a condition of the second electronic device and a return of the deposit value to the user.

At 1914, the process 1900 may cause the at least one function of the second electronic device to be locked. In some embodiments, the mobile application server 108 may send, to the second electronic device, locking instructions and/or new unlocking information. Additionally or alternatively, the previously sent unlocking information can include an expiration date and time. Upon the second electronic device determining that the rental has expired based on the expiration date and time, the second electronic device can automatically deactivate.

Figure 20:
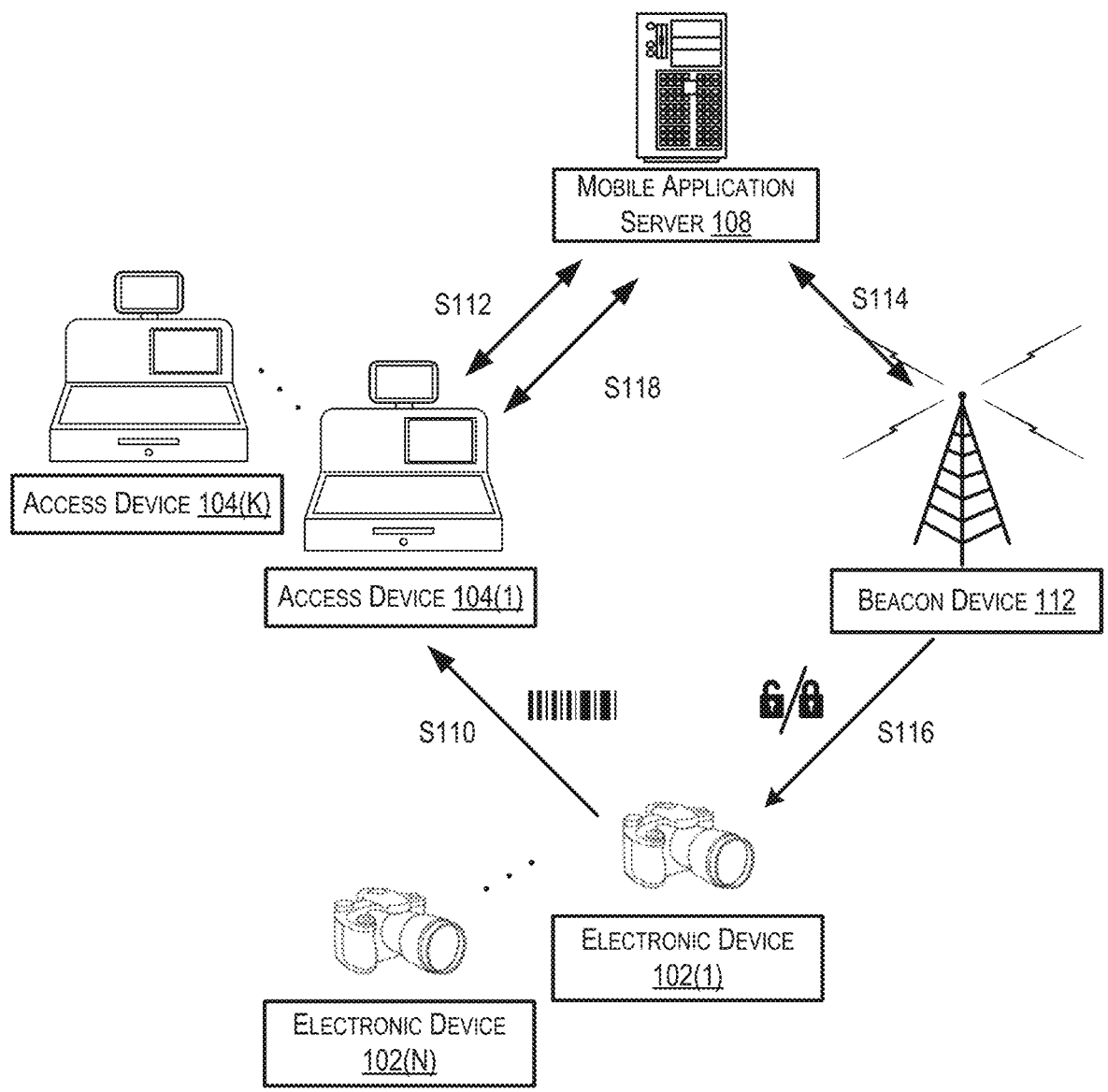
FIG. 20 depicts a simplified block diagram for a benefit denial system for an electronic device in accordance with at least some embodiments.

FIG. 20 depicts a simplified block diagram for a benefit denial system for an electronic device in accordance with at least some embodiments. As illustrated, the benefit denial system includes a plurality of electronic devices 102(1), . . . , 102(N), a plurality of access devices 104(1), . . . , (K), a mobile application server 108, and a beacon device 112. The plurality of electronic device 102(1), . . . , 102(N) may be located within a retail establishment for purchase (or, similarly, for rental). The plurality of access devices 104(1), . . . , (K) and the beacon device 112 may also be located within the retail establishment.

Each access device 104 can communicate with an electronic device 102, the beacon device 112, and the mobile application server 108, where the communications may use different communication mechanisms. For instance, the communication with the electronic device 102 can use BLUETOOTH, BLE, RFID technology, or can simply be a barcode or QR code scan of a label attached to the electronic device 102 (or a container that includes the electronic device 102). The communication with the beacon device 112 can be over a wired Ethernet connection, a wireless WiFi connection, a BLUETOOTH connection, a BLE connection, or some type of short range communications. The communication with the mobile application server 108 can generally occur over a data network, such as a public network (e.g., the Internet) and/or a private network (e.g., an Intranet) and can rely on a TCP/IP communication protocol.

Similarly, the beacon device 112 can communicate with an electronic device 102, each access device 104, and the mobile application server 108, where the communications may also use different communication mechanisms. For instance, the communication with the electronic device 102 can use BLUETOOTH, BLE, or some type of short range wireless communications. The communication with an access device 104 can be over a wired Ethernet connection, a wireless WiFi connection, a BLUETOOTH connection, a BLE connection, or some type of short range communications. The communication with the mobile application server 108 can generally occur over the data network and can rely on a TCP/IP communication protocol.

By way of illustrating interactions between various components of the benefit denial system, consider the following scenario. A user may enter the retail and user may select an electronic device 102 for purchase and may bring the electronic device 102 to a POS terminal (e.g., the access device 104) to complete the purchase. Upon receiving payment and before completing the purchase transaction (e.g., at the POS terminal), unlocking information may be used to unlock the electronic device 102. Upon the electronic device 102 being unlocked, the purchase transaction can be completed by, for instance, printing a receipt and/or displaying a message about the completion at the POS terminal.

In one potential scenario, the access device 104 may receive an extended UPC of the electronic device 102 at step S110. For instance, the scan of the extended UPC is performed, or one or other communication mechanism illustrated herein above is used to send the extended UPC from the electronic device 102 to the access device 104. At step S112, the access device 104 can send the extended UPC to the mobile application server 108. Upon determining a serial number of the electronic device 102 (or a portion of the serial number) based on the extended UPC and determining that the serial number (or portion thereof) corresponds to a product offered at the retail establishment, the mobile application server 108 instructs the access device 104 to proceed with payment processing and receives a confirmation that the payment has been processed, also illustrated at step S112. Upon determining that the payment has been completed, at step S114, the mobile application server 108 can instruct the beacon device 112 to unlock the electronic device 102 (or at least a function thereof) and can receive back from the beacon device 112 an indication of a successful activation. At step S116, the beacon device 112 can activate the electronic device 102 to then send the indication of the successful activation to the mobile application server 108. The activation can include, for instance, sending first unlocking information to the electronic device 102 such that the electronic device 102 can compare it to second unlocking information stored in its memory or generated on-the-fly. Thereafter, at step S118, the mobile application server 108 can instruct the access device 104 to complete the transaction and can receive back from the access device 104 an indication of the transaction completion.

In the above illustration, the extended UPC code is illustrated as including a serial number associated with a single electronic device. However, the embodiments of the present disclosure are not limited as such. Instead, the serial number can be associated with multiple electronic devices 102 (e.g., a bundled package that includes these electronic devices 102). As such, based on the UPC code, the mobile application server 108 can extract the serial number, determine the electronic devices 102 that are associated with the serial number, determine whether each of such electronic devices 102 requires activation, and, for the ones requiring activations, determining the corresponding unlocking information.

Figure 21:
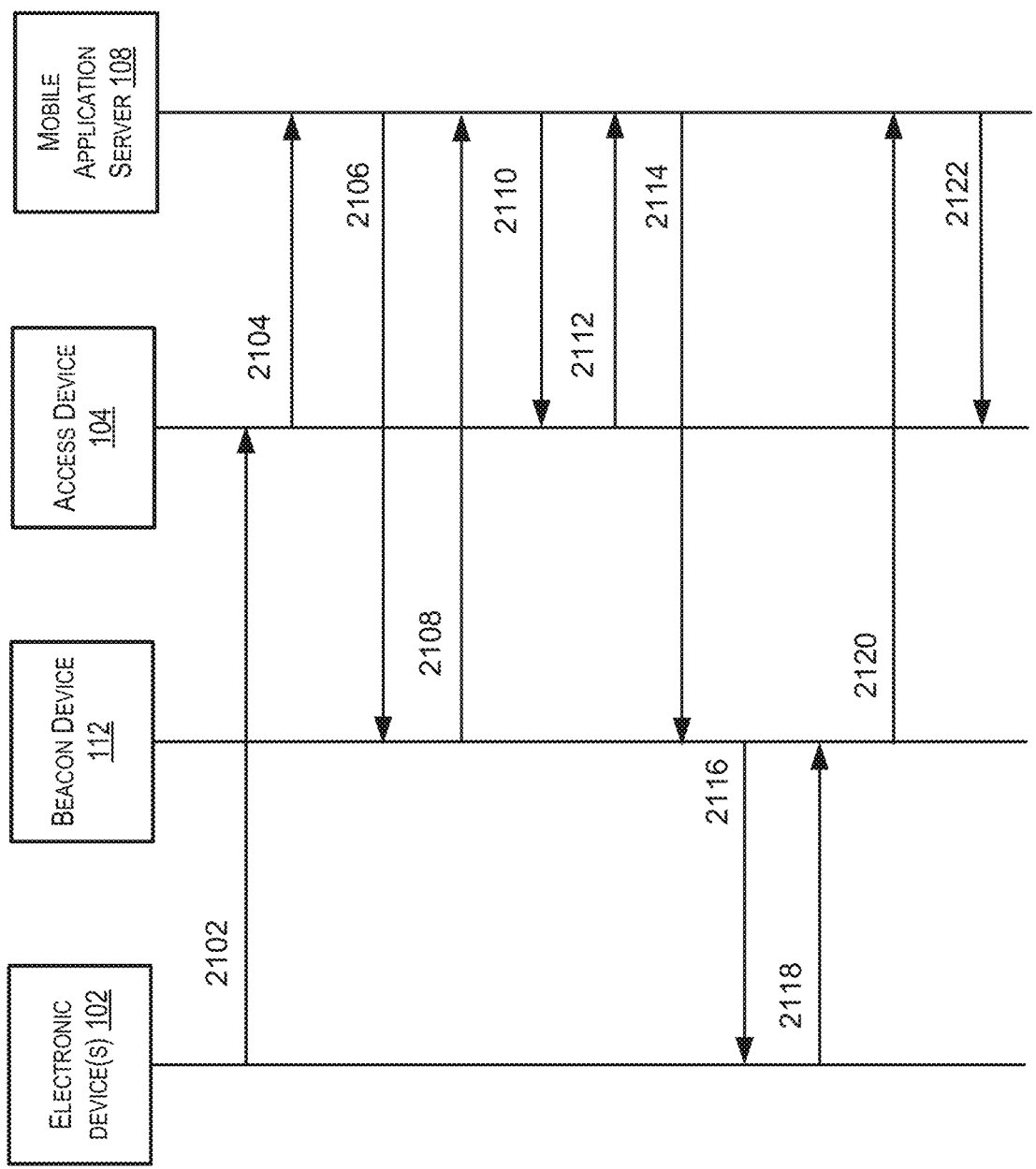
FIG. 21 depicts a process for transmitting and using a device key to issue commands to an electronic device in accordance with at least some embodiments.

FIG. 21 depicts a process 2100 for transmitting and using a device key to issue commands to an electronic device 102 in accordance with at least some embodiments. Some or all of the process 2100 may be performed under the control of one or more computer systems configured with executable instructions and may be implemented as code (e.g., executable instructions, one or more computer programs or one or more applications). In accordance with embodiments of the disclosure, the process 2100 of FIG. 21 may be performed by components of the benefit denial system of FIG. 20 including at least an electronic device 102, an access device 104, a mobile application server 108, and a beacon device 112. The code may be stored on a computer-readable storage medium, for example, in the form of a computer program including a plurality of instructions executable by one or more processors. The computer-readable storage medium may be non-transitory.

The process 2100 may begin at 2102, when an extended UPC is provided from a product to the access device 104 (e.g., by scanning of the UPC code). The product can include a single electronic device 102 or multiple electronic devices 102 that are part of a bundled package. In some embodiments, an operator of the access device 104 may scan the extended UPC, where this extended UPC may be attached to the product or to a container (e.g., a box or package) that includes the product. In some embodiments, the access device 104 may be configured to send the extended UPC to the mobile application server 108 at 2104. In turn, the mobile application server 108 may extract, from the extended UPC, a serial number(s) (or portion thereof) associated with the product (e.g., with the single electronic device 102 or with the multiple electronic devices that form the bundled package) and may request, at 2106, the beacon device 112 to determine whether each electronic device 102 of the product is detected. The mobile application server 108 can also generate and store local data including a store ID, a cashier ID, a transaction ID, the serial number(s) (or portion thereof), UPC, a time, and a date. The request may include the extracted serial number (or portion thereof) (or multiple serial numbers, or portions thereof, in the case of the bundled package).

The request may trigger the beacon device 112 to perform a scan (e.g., a BLUETOOTH scan or a BLE scan). Upon receiving an advertising packet(s) (e.g., a BLUETOOTH advertising beacon or a BLE advertising beacon) from the electronic device 102, the beacon device 112 may extract, from the advertising packet(s), an identifier of each electronic device 102 (e.g., a serial number or a portion thereof) and can compare this identifier to the extracted serial number(s) (or portions thereof) that it received from the mobile application server 108. In an example, the request may trigger the beacon device 112 to perform a scan, search, and match function. This function can include scanning advertising packets, filtering out only manufacture code of the product, searching for electronic tool(s) matching the serial number(s) (or portion(s) thereof) in the extended UPC, and returning the search result which can contain the media access control (MAC) address(es) (or network address(es)) of such electronic devices.

The beacon device 112 sends, at 2108, a search result indicating an outcome of the comparison. The search result can be positive, indicating that the product (each electronic device 102 thereof) is detected if a match exists. Otherwise, the search result is negative, indicating that the electronic device 102 is not detected (or that not all of the electronic devices 102 of the product are detected). In the case of a negative search result, the mobile application server 108 can send, at 2110, instructions to the access device 104 to stop the transaction involving the electronic device 102. For instance, the instructions can be displayed to the operator and can include information to remove the electronic device 102 from a cart. In some embodiments, the search result may simply indicate the detected electronic device(s) 102 (e.g., their MAC addresses). In such embodiments, the mobile application server 108 can examine the search result and determine if each electronic device 102 of the product was found. If the product is properly found, the access device 104 is notified to proceed with payment. Otherwise, the access device 104 is notified that the product (e.g., the electronic device 102 or the bundled package as the case may be) should be removed. The mobile application server 108 can also append search results to the local data.

Assuming a positive search result, the mobile application server 108 can send, at 2110, instructions to the access device 104 to proceed with payment. The instructions cause the access device 104 (e.g., a POS terminal) to send information about a payment instrument to a clearing house or financial institution and receive confirmation that the payment has been processed, and/or to receive cash payment. Upon the payment being completed, the access device 104 sends, at 2112, an indication of the payment result to the mobile application server 108. In turn, the mobile application server 108 determines that an activation of the product is to be performed. For instance, the serial number(s) is (are) (or portions thereof) associated with information indicating that each electronic device 102 is a type of device only operable in an unlocked state and that this electronic device 102 is currently in a locked state. This information can be accessible to the mobile application server 108 and can be queried using the serial number(s) (or portions thereof).

To activate the electronic device, in some embodiments, the mobile application server 108 is configured to send, at 2114, an activation request to the beacon device 112. Different types of information can be included in the activation request. In an example of a first type of information, the activation request includes unlocking information (e.g., a mutable device key and/or a dynamic data element). In this example, the beacon device 112 can use the unlocking information to directly activate the electronic device 102. In an example of a second type of information, the activation request includes an identifier of the electronic device 102 (e.g., a unique identifier such as a MAC address). In this example, the beacon device 112 can use the identifier to indirectly activate the electronic device 102. In particular, based on the identifier, the beacon device 112 can write unlocking information to the electronic device 102 and send this information to the mobile application server 108. Thereafter, the mobile application server 108 can pass this unlocking information to a user device 106 (not illustrated in FIG. 21) for subsequent communication between the user device 106 and the electronic device 102 in order to complete the activation.

The activation can also include the beacon device 112 sending, at 2116, activation information to each electronic device 102 of the product. Referring back to the direct activation, the activation information can include the unlocking information. As such, the electronic device 102 can receive this unlocking information for comparison to second unlocking information pre-stored in the memory of the electronic device 102 or generated on-the-fly by the electronic device 102. If a correspondence is determined, the electronic device 102 returns, at 2118, a confirmation of the activation and/or an indication that the received unlocking information has been validated. Referring back to the indirect activation, the activation information can request a random key for a password (or some other type of unlocking information) from the electronic device 102. In turn, the beacon device 112 can generate a password (or some other type of unlocking information) based on the key and can write the password to the memory of the electronic device 102. Upon a successful write, the electronic device 102 can send, at 2118, a confirmation and/or a validation that the activation is complete. In both types of activation, the beacon device 112 can use the identifier (e.g., the MAC address) to connect to the electronic device 102 (e.g., to establish a communication session using BLUETOOTH or BLE), read a current ownership status of the electronic device 102 (e.g., that the electronic device 102 has not been assigned an owner yet, is not stolen, or some type of antitheft status), update the ownership status (e.g., by writing a sold status in the memory of the electronic device 102), and then disconnect from the electronic device 102. When the product includes multiple electronic devices 102, the information exchange between beacon device 112 and the electronic devices 102 can be sequential, whereby the beacon device 112 activates a single electronic device 102 at a time. Alternatively, the information exchange can be in parallel, whereby the beacon device 112 activates multiple electronic devices 102 simultaneously.

Upon completing the activation procedure with the product, in some embodiments, the beacon device 112 is configured to send, at 2120, an activation result to the mobile application server 108. If the activation failed, the activation result indicates a negative activation. If the activation succeeded, the activation result indicates a positive activation. In this case, and referring back to the indirect activation, the activation result can also include the key and/or the password (or the other type of unlocking information) that was written to the memory of the electronic device 102. In the case of multiple electronic devices 102 included in the product, the activation result can be specific to each electronic device 102.

Depending on the activation result, the mobile application server 108 may send, at 2122, transaction instructions to the access device 104. If the activation result is negative, the transaction instructions indicate the activation failure and request a retry with the same or another product. Such transaction instructions can be displayed at the access device 104, such that the operator can perform the retrial. If the activation result is positive, the transaction instructions indicate the activation success. This type of transaction instructions can trigger the access device 104 to print a receipt indicating that the transaction is complete and/or to display a message about a successful activation. Further, the mobile application server 108 can log the local data and the activation result in a data log. In some embodiments, the data log includes a block chain ledger.

In the case of an indirect activation, the receipt and/or message can include the password(s) (or the other type of unlocking information) such that the user purchasing the electronic device 102 can operate their user device 106 to input the password(s) (or the other type of unlocking information) in order for the user device 106 to unlock the product. Alternatively, the receipt and/or the message may merely indicate that the activation was successful and, in response, the user can operate their user device 106 to request the password(s) (or the other type of unlocking information) from the mobile application server 108 in order to unlock the product.

Figure 22:
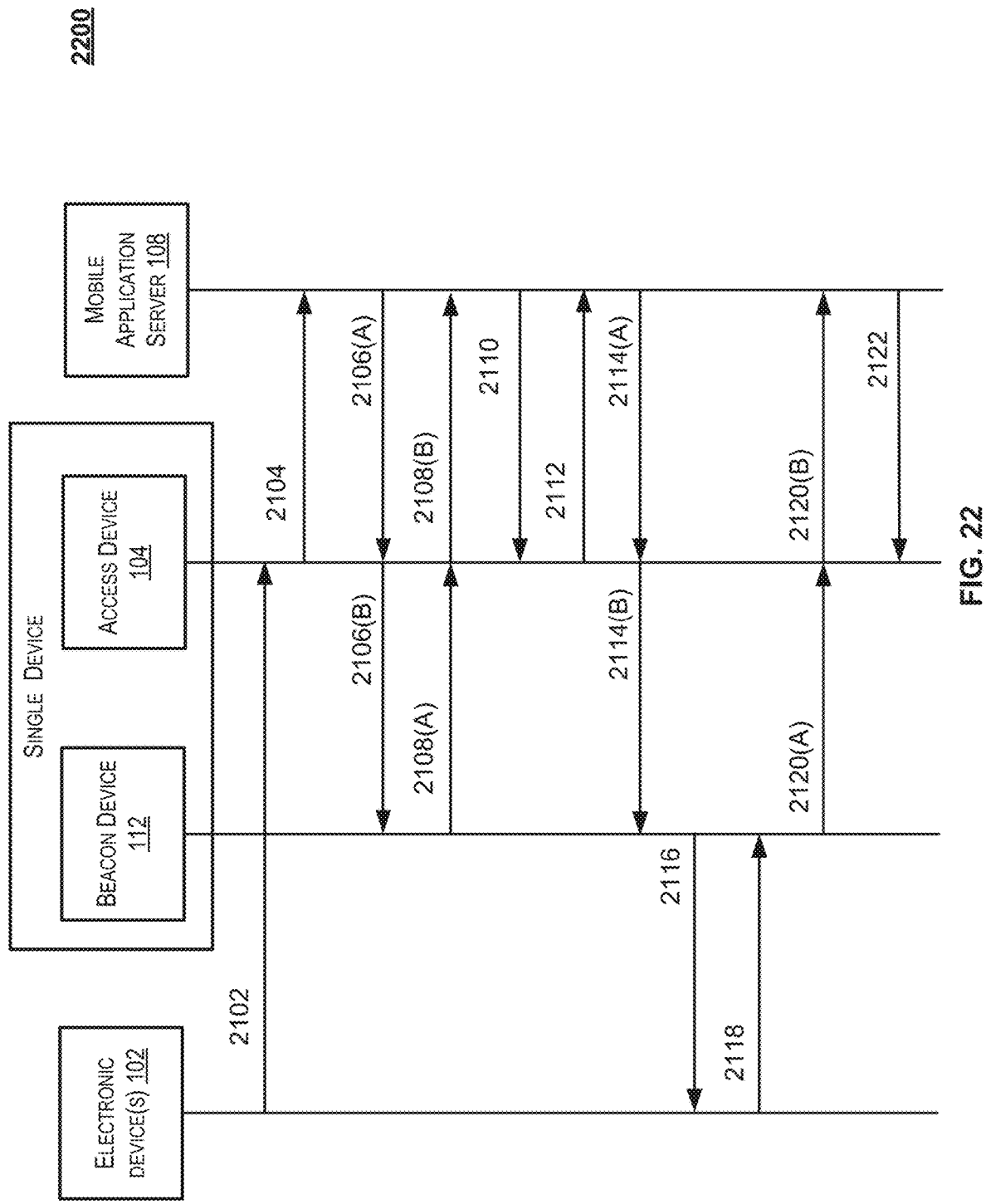
FIG. 22 depicts another process for transmitting and using a device key to issue commands to an electronic device in accordance with at least some embodiments.

FIG. 22 depicts another process 2200 for transmitting and using a device key to issue commands to an electronic device in accordance with at least some embodiments. The process 2200 is similar to the process 2100 of FIG. 21 as indicated with the same element numbering. Similarities are not repeated herein in the interest of brevity but likewise apply to the process 2200. Unlike the system used to perform the process 2100 of FIG. 21, in the system used to perform the process 2200, the beacon device 112 and the access device 104 are integrated into a single device. In this integration, the beacon device 112 is configured, among other things, as a communication interface to electronic devices 102, whereas the access device 104 is configured as a communication interface with the mobile application server 108. As such, information exchange with an electronic device 102 that a user is purchasing typically occurs via the beacon device 112, whereas information exchange with the mobile application server 108 occurs via the access device 104.

As illustrated, rather than the mobile application server 108 directly requesting the beacon device 112 to determine whether the product is detected, the request is sent, at 2106(A), to the access device 104 that then passes it, at 2106(B), to the beacon device 112. Similarly, rather than the beacon device 112 directly sending a search result to the mobile application server 108, the search result is passed, at 2108(A), to the access device 104 that then sends it, at 2108(B), to the mobile application server 108. In addition, the mobile application server 108 sends, at 2114(A), an activation request to the access device 104 that then passes it, at 2114(B), to the beacon device 112. The beacon device 112 then, at 2116, causes the electronic device 102 to be activated (using any of the techniques described above in connection with FIG. 21), and the electronic device responds, at 2118, to the beacon device 112 with an indication of whether the activation was successful (using any of the techniques described above in connection with FIG. 21). As far as an activation result, the beacon device 112 passes, at 2120(A), the activation result to the access device 104 that then sends it, at 2120(B), to the mobile application server 108.

Figure 23:
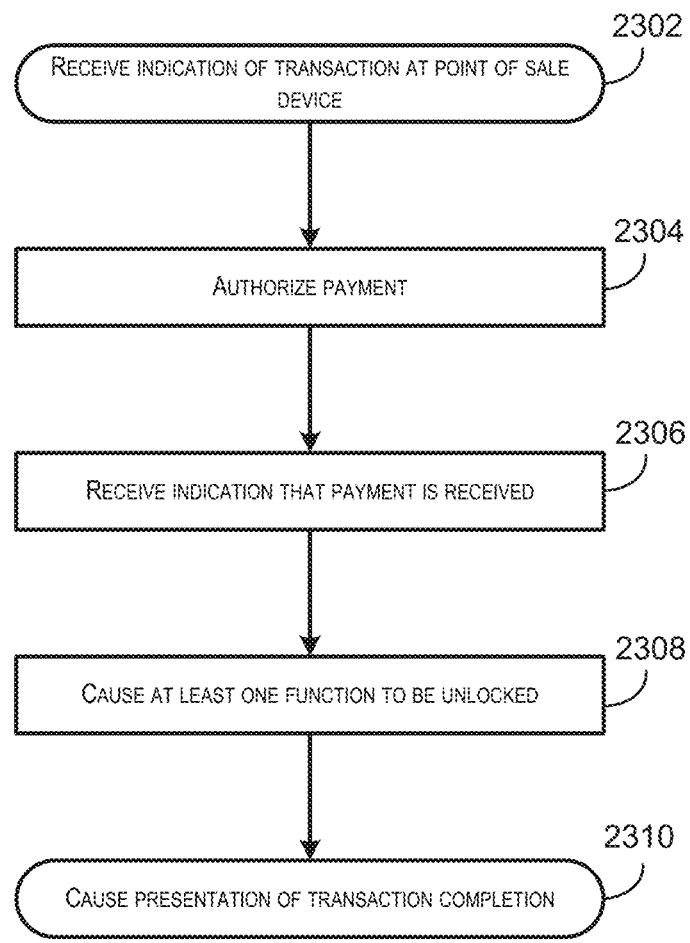
FIG. 23 depicts a flow diagram illustrating a process for transmitting and using a device key to issue commands to an electronic device in accordance with at least some embodiments.

FIG. 23 depicts a flow diagram illustrating a process for transmitting and using a device key to issue commands to an electronic device 102 in accordance with at least some embodiments. The process 2300 of FIG. 23 may be performed by at least a benefit denial system as described with respect to FIG. 20, including a mobile application server 108. In the interest of clarity of explanation, a single electronic device is described as being activated. However, the process 2300 similarly applies to activating a product, where the product may include a bundle of electronic devices 102. In this case, an extended UPC of the product can be associated with the electronic devices 102 that are to be activated per the process 1300.

Process 2300 may begin at 2302 when an indication of a transaction at a point of sale device for a sale of an electronic device is received while, at least one function of the electronic device is in a locked state that can be unlocked based on unlocking information. In some embodiments, the transaction is a purchase of the electronic device. The indication can be received from the point of sale device and can include a UPC or an extended UPC. The unlocking information can be a device key, a dynamic data element, or other type of unlocking information (e.g., a password generated from a random key as described herein in FIG. 21).

At 2304, the process 2300 may authorize payment for the sale. In some embodiments, the mobile application server 108 determines, based on the indication, a serial number of the electronic device and requests a beacon device interfacing or integrated with the point of sale device to detect the electronic device. Based on a scan function of the beacon device, the beacon device sends a search result back to the mobile application server 108. The search result can indicate that the electronic device is detected or can include a detected device identifier such that the mobile application server 108 can determine that the electronic device is detected. Based on this detection, the mobile application server 108 may instruct the point of sale device to proceed with the processing of the payment.

At 2306, the process 2300 may receive an indication that the payment is received. In some embodiments, upon completion of the payment processing, the point of sale device may send the indication that the payment is received to the mobile application server 108.

At 2308, the process 2300 may cause the at least one function to be unlocked based on the unlocking information. In some embodiments, the mobile application server 108 sends an activation request to the beacon device. The activation request can include the unlocking information. Alternatively, the activation request can trigger the beacon device to generate the unlocking information (e.g., as a password based on a key received from the electronic device) and such unlocking information or the seed thereof (e.g., the key) can be sent to the mobile application server 108. In both examples, the unlocking information is usable by the electronic device to activate the at least one function.

At 2310, the process 2300 may cause the point of sale device to present an indication that the transaction is completed based on the at least one function being unlocked. In some embodiments, the mobile application server 108 receives an activation result from the beacon device, where this activation result indicates that the activation is completed. Based on the activation result, the mobile application server 108 sends transaction information to the point of sale device, where the transaction information causes the point of sale device to print a receipt indicating the transaction completion, display a message indicating the transaction completion, and/or perform another action indicating the transaction completion to the operator of the point of sale device and/or the purchaser of the electronic device.

Embodiments of the disclosure provide for a number of technical advantages over conventional systems. For example, embodiments of the invention can enable owners of an electronic device to lock and unlock that electronic device in a manner which deprives any unauthorized user of the benefit of the electronic device. When such an electronic device is locked, it remains locked until it is unlocked using the secret device key. The result is that devices which are stolen while locked will be virtually worthless to any would-be thief. By reducing the value of the electronic device to a potential thief, the disclosed system discourages theft of electronic devices. In the case that thieves are aware that a particular resource provider locks all electronic devices until a legitimate purchase is made, those thieves are likely to steal from other resource providers.

Additionally, the system enables new functionality to be implemented in existing electronic devices. Workers can lock or unlock their tools upon entering/exiting a job site, which can lead to fewer accidents caused by unintentional tool activations. Owners of a tool can rent out or lend out their tools knowing that the tool will lock upon expiration of the rental period, ensuring that a failure to return the tool will not benefit the lendee. One skilled in the art would recognize a number of additional benefits gained from the system described herein.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An electronic device comprising:
   a functional component for performing at least one function of the electronic device;
   a first power source adapted to be coupled to the functional component to power the at least one function of the electronic device; and
   a benefit denial element comprising:
       a communication element for communicating with a second electronic device to receive a command and information indicative of whether the second electronic device has access to second unlocking information;
       a memory adapted to store computer-readable instructions;
       a processor configured to execute the computer-readable instructions, wherein execution of the computer-readable instructions by the processor, configures the benefit denial element to:
           determine first unlocking information of the benefit denial element, and
           selectively disable or enable the at least one function of the electronic device in accordance with a received command upon determining that the second electronic device has access to the second unlocking information and that the second unlocking information corresponds to the first unlocking information; and
       a system on a chip (SoC), wherein the SoC comprises the functional component, the benefit denial element, and an interface between the functional component and the benefit denial element.

2. The electronic device of claim 1, wherein the first unlocking information comprises a first key, wherein the second unlocking information comprises a second key, and wherein determining that the second unlocking information corresponds to the first unlocking information comprises determining a match between the second key and the first key.

3. The electronic device of claim 1, wherein the second unlocking information comprises a dynamic data element.

4. The electronic device of claim 3, wherein the dynamic data element comprises at least one of: a device identifier of the second electronic device, ownership data, or a date.

5. The electronic device of claim 1, wherein the execution of the computer-readable instructions by the processor, further configures the benefit denial element to:
   store the first unlocking information in the memory;
   receive an updated unlocking information; and
   store, in the memory, the updated unlocking information in lieu of or in addition to the first unlocking information.

6. The electronic device of claim 1, wherein the benefit denial element is configured to selectively disable or enable the at least one function by at least selectively sending a disable command or an enable command to the functional component.

7. The electronic device of claim 1, wherein the functional component is configured to disable the at least one function upon a determination that no communication exists with the benefit denial element over the interface.

8. The electronic device of claim 1, wherein the benefit denial element is configured to selectively disable or enable the at least one function by at least selectively decoupling or coupling the first power source to the functional component.

9. The electronic device of claim 1, further comprising:
   a second power source configured to power the benefit denial element even if the first power source is not coupled to the functional component or is otherwise prevented from powering the functional component.

10. The electronic device of claim 9, wherein the second power source is configured to draw power from the first power source.

11. The electronic device of claim 9, wherein the benefit denial element is further configured to:
    determine that the at least one function is in an unlocked state based on the determining that the second electronic device has access to the second unlocking information and that the second unlocking information corresponds to the first unlocking information; and
    set, based on the unlocking state, a power source of the benefit denial element to the first power source instead of the second power source.

12. The electronic device of claim 9, wherein the second power source is configured to receive power inductively from an external power source and transfer power to the benefit denial element.

13. An electronic device comprising:
    a functional component for performing at least one function of the electronic device;
    a first power source adapted to be coupled to the functional component to power the at least one function of the electronic device; and
    a benefit denial element comprising:
        a communication element for communicating with a second electronic device to receive a command and information indicative of whether the second electronic device has access to second unlocking information;
        a memory adapted to store computer-readable instructions;
        a second power source integrated in or on a housing of the electronic device and configured to power the benefit denial element even if the first power source is not coupled to the functional component or is otherwise prevented from powering the functional component; and
        a processor configured to execute the computer-readable instructions, wherein execution of the computer-readable instructions by the processor, configures the benefit denial element to:
            store first unlocking information in the memory;
            determine the first unlocking information of the benefit denial element,
            selectively disable or enable the at least one function of the electronic device in accordance with a received command upon determining that the second electronic device has access to the second unlocking information and that the second unlocking information corresponds to the first unlocking information;
            receive an updated unlocking information; and
            store, in the memory, the updated unlocking information in lieu of or in addition to the first unlocking information.

14. The electronic device of claim 13, wherein the second power source is configured to receive power inductively from an external power source and transfer power to the benefit denial element.

15. The electronic device of claim 13, wherein the first unlocking information comprises a first key, wherein the second unlocking information comprises a second key, and wherein determining that the second unlocking information corresponds to the first unlocking information comprises determining a match between the second key and the first key.

16. The electronic device of claim 13, wherein the second unlocking information comprises a dynamic data element.

17. The electronic device of claim 16, wherein the dynamic data element comprises at least one of: a device identifier of the second electronic device, ownership data, or a date.

18. The electronic device of claim 13, wherein the benefit denial element is configured to selectively disable or enable the at least one function by at least selectively sending a disable command or an enable command to the functional component.

19. The electronic device of claim 13, wherein the benefit denial element is configured to selectively disable or enable the at least one function by at least selectively decoupling or coupling the first power source to the functional component.

* * * * *